(12) United States Patent
Yamamoto

(10) Patent No.: US 9,963,378 B2
(45) Date of Patent: *May 8, 2018

(54) GLASS FOR CHEMICAL STRENGTHENING AND CHEMICAL STRENGTHENED GLASS, AND MANUFACTURING METHOD OF GLASS FOR CHEMICAL STRENGTHENING

(71) Applicant: Asahi Glass Company, Limited, Tokyo (JP)

(72) Inventor: Hiroyuki Yamamoto, Shizuoka-ken (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 14/634,122

(22) Filed: Feb. 27, 2015

(65) Prior Publication Data

US 2015/0166401 A1    Jun. 18, 2015

Related U.S. Application Data

(63) Continuation of application No. PCT/JP2013/074850, filed on Sep. 13, 2013.

(30) Foreign Application Priority Data

Sep. 14, 2012   (JP) .................................. 2012-203596

(51) Int. Cl.
| | |
|---|---|
| *C03C 3/087* | (2006.01) |
| *C03C 4/08* | (2006.01) |
| *C03C 3/085* | (2006.01) |
| *C03C 3/091* | (2006.01) |
| *C03C 3/095* | (2006.01) |
| *C03C 4/02* | (2006.01) |
| *C03C 21/00* | (2006.01) |
| *C03C 3/093* | (2006.01) |
| *C03C 4/18* | (2006.01) |
| *C03C 4/16* | (2006.01) |

(52) U.S. Cl.
CPC .............. *C03C 3/085* (2013.01); *C03C 3/087* (2013.01); *C03C 3/091* (2013.01); *C03C 3/093* (2013.01); *C03C 3/095* (2013.01); *C03C 4/02* (2013.01); *C03C 4/16* (2013.01); *C03C 4/18* (2013.01); *C03C 21/002* (2013.01); *C03C 2204/00* (2013.01); *Y10T 428/315* (2015.01)

(58) Field of Classification Search
CPC ......... C03C 3/085; C03C 3/087; C03C 3/083; C03C 3/091; C03C 3/093; C03C 3/095; C03C 4/02; C03C 4/08; C03C 4/082; C03C 4/085

See application file for complete search history.

(56) References Cited

U.S. PATENT DOCUMENTS

| | | | | |
|---|---|---|---|---|
| 5,057,134 A | * | 10/1991 | Suzuki ..................... | C03C 3/087 65/30.13 |
| 5,837,629 A | * | 11/1998 | Combes ................... | C03C 3/087 501/57 |
| 8,153,270 B2 | | 4/2012 | Akieda et al. | |
| 2005/0170944 A1 | * | 8/2005 | Arbab ..................... | C03C 3/087 501/64 |
| 2006/0240969 A1 | * | 10/2006 | Teyssedre ................. | C03C 4/02 501/71 |
| 2007/0191208 A1 | * | 8/2007 | Teyssedre ................. | C03C 4/02 501/71 |
| 2008/0214380 A1 | * | 9/2008 | Abensour ................ | C03C 3/087 501/41 |
| 2011/0071012 A1 | | 3/2011 | Kondo et al. | |
| 2012/0083401 A1 | | 4/2012 | Koyama et al. | |
| 2013/0203584 A1 | * | 8/2013 | Arai ........................ | C03C 3/087 501/70 |

(Continued)

FOREIGN PATENT DOCUMENTS

| | | |
|---|---|---|
| CN | 102020418 | 4/2011 |
| JP | 45-16112 | 6/1970 |

(Continued)

OTHER PUBLICATIONS

Combined Chinese Office Action and Search Report dated Nov. 22, 2016 in Chinese Patent Application No. 201380047911.3 (with partial English language translation and English translation of categories of cited documents).

Acta Physica Sinica, China Academic Journal Electronic Publishing House, vol. 34, No. 2, Feb. 1985, pp. 259-262.

International Preliminary Report on Patentability and Written Opinion dated Mar. 26, 2015 in PCT/JP2013/074850 (submitting English translation only).

(Continued)

*Primary Examiner* — Elizabeth A. Bolden

(74) *Attorney, Agent, or Firm* — Oblon, McClelland, Maier & Neustadt, L.L.P.

(57) ABSTRACT

There is provided a glass for chemical strengthening having a black color tone and excelling in characteristics preferred for the purposes of housing or decoration of an electronic device, that is, defoaming quality, strength, and light transmittance characteristics. A glass for chemical strengthening contains, in mole percentage based on following oxides, 55% to 80% of $SiO_2$, 0.25% to 16% of $Al_2O_3$, 0% to 12% of $B_2O_3$, 5% to 20% of $Na_2O$, 0% to 15% of $K_2O$, 0% to 15% of MgO, 0% to 15% of CaO, 0% to 25% of $\Sigma RO$ (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

18 Claims, No Drawings

(56) References Cited

U.S. PATENT DOCUMENTS

| | | | | |
|---|---|---|---|---|
| 2013/0306900 A1* | 11/2013 | Shimada | ............... | C03C 3/087 252/62 |
| 2014/0017499 A1 | 1/2014 | Yamamoto | | |
| 2014/0162863 A1* | 6/2014 | Costin | ................ | C03C 3/095 501/63 |
| 2014/0291592 A1* | 10/2014 | Shimada | ............... | C03C 3/078 252/586 |
| 2014/0291593 A1* | 10/2014 | Shimada | ............... | C03C 4/085 252/586 |
| 2015/0166400 A1* | 6/2015 | Yamamoto | ............ | C03C 3/085 428/410 |
| 2015/0166403 A1* | 6/2015 | Yamamoto | ............ | C03C 3/083 428/410 |
| 2016/0031747 A1* | 2/2016 | Yamamoto | ............ | C03C 3/085 428/426 |
| 2016/0229735 A1* | 8/2016 | Akada | .................. | C03C 3/087 |

FOREIGN PATENT DOCUMENTS

| | | | | |
|---|---|---|---|---|
| JP | 2009-61730 | 3/2009 | | |
| JP | 2011-084456 | 4/2011 | | |
| JP | 2011-213576 | 10/2011 | | |
| JP | 2012-148955 | 8/2012 | | |
| WO | 2011/114821 A1 | 9/2011 | | |
| WO | WO 2012057232 A1 * | 5/2012 | ............ | C03C 3/087 |
| WO | WO 2012102176 A1 * | 8/2012 | ............ | C03C 3/087 |
| WO | WO 2013111879 A1 * | 8/2013 | ............ | C03C 3/078 |
| WO | WO 2013111881 A1 * | 8/2013 | ............ | C03C 4/085 |
| WO | WO 2014089302 A1 * | 6/2014 | ............ | C03C 3/095 |

OTHER PUBLICATIONS

International Search Report issued in International Application No. PCT/JP2013/074850, dated Nov. 19, 2013.
Office Action dated Feb. 14, 2017, Japanese Application No. 2014-535604, with English translation.

* cited by examiner

GLASS FOR CHEMICAL STRENGTHENING AND CHEMICAL STRENGTHENED GLASS, AND MANUFACTURING METHOD OF GLASS FOR CHEMICAL STRENGTHENING

CROSS-REFERENCE TO RELATED APPLICATIONS

This application is a continuation of prior International Application No. PCT/JP2013/074850 filed on Sep. 13, 2013, which is based upon and claims the benefit of priority from Japanese Patent Application No. 2012-203596 filed on Sep. 14, 2012; the entire contents of all of which are incorporated herein by reference.

FIELD

The present invention relates to a glass for chemical strengthening used for a housing or decoration of an electronic device, for example, a communication device or an information device which are portably usable, and to a manufacturing method thereof. In this description, the "glass for chemical strengthening" refers to a glass on whose surface a compressive stress layer can be formed by chemical strengthening and to a glass before undergoing the chemical strengthening. Further, the "chemical strengthened glass" refers to a glass having undergone the chemical strengthening and having a compressive stress layer formed on its surface by the chemical strengthening.

BACKGROUND

For a housing or decoration of an electronic device such as a portable phone, an appropriate material is selected and used from materials such as resin and metal in consideration of various factors such as decorativeness, scratch resistance, workability, and cost.

In recent years, there have been attempts to use, as a material for housing, a glass that has not been used hitherto. According to Patent Reference 1 (Japanese Patent Application Laid-open No. 2009-061730), by forming the housing itself from a glass in an electronic device such as a portable phone, it is possible to exhibit a unique decorative effect with transparency.

The housing or decoration of an electronic device for portable use such as a portable phone is required to have high strength in consideration of breakage by an impact of dropping when in use or contact scratches due to long-term use.

As a method to increase strength of the glass, a method of forming a compressive stress layer on a glass surface is generally known. Representative methods to form the compressive stress layer on a glass surface are an air-cooling tempering method (physical tempering method) and a chemical strengthening method. The air-cooling tempering method (physical tempering method) is performed by rapidly cooling such as air cooling or the like a glass plate surface heated to a temperature near a softening point. On the other hand, the chemical strengthening method is to replace alkali metal ions (typically, Li ions, Na ions) having a smaller ion radius existing on the glass plate surface with alkali ions (typically, Na ions or K ions for Li ions, or K ions for Na ions) having a larger ion radius by ion exchange at temperatures lower than or equal to a glass transition point.

For example, in general, the glass for decoration as described above is often used with a thickness of 2 mm or less. When the air-cooling tempering method is employed for such a thin glass plate, it is difficult to assure a temperature difference between the surface and the inside, and hence it is difficult to form the compressive stress layer. Thus, in the glass after being tempered, the intended high strength characteristic cannot be obtained.

Further, in the air-cooling tempering, due to variation in cooling temperature, there is a great concern that the flatness of the glass plate is impaired. The concern that the flatness is impaired is large in a thin glass plate in particular, and there is a possibility of impairing texture aimed by the present invention. From these points, it is preferred that the glass plate be tempered by the latter chemical strengthening method.

Further, in the housing or decoration of an electronic device such as a portable phone, a black glass is widely used which does not strongly emphasize the presence of the device itself, and by which firmness and luxuriousness can be obtained simultaneously.

A glass described in Patent Reference 2 (Japanese Examined Patent Application Publication No. S45-016112) has been known as a glass that can be chemically strengthened and exhibits a black color. The glass described in Patent Reference 2 is an aluminosilicate glass containing a high concentration of iron oxide.

In the example disclosed in above Patent Reference 2, arsenous acid is used as a refining agent. The arsenous acid is an environment-affecting substance whose inverse effects to the environment are concerned not only in manufacturing processes but through the lifecycle of the product.

Accordingly, the inventors of the present invention heated and melted a glass material of the composition disclosed in the example of Patent Reference 2 without adding the arsenous acid, and found that only a glass can be obtained which hardly release bubbles, that is, has a poor refining ability, and hence has many remaining bubbles. Specifically, after a molten glass was casted in a block shape and was sliced into a plate shape and the surface thereof was polished, it was recognized that a large number of pockmark-like dents (hereinafter referred to as open bubbles) formed by bubbles being cut in the glass is exposed on the polished surface.

For the purposes of housing or decoration of an electronic device as described above, a glass in which open bubbles exist cannot be used due to the demand for improving appearance quality, and thus causes a problem of largely reducing the production yield. There is also a concern that the open bubbles become an origin of crack and decrease the strength.

Moreover, the housing of an electronic device may be shaped and used not only in a flat plate shape but also in a concave or convex shape. Thus, a glass which is easily press-formed is demanded.

For the purpose of confirming that it has strength of a certain degree or more in quality management, a compressive stress amount of the chemical strengthened glass is also measured.

However, when the glass has a black color, if it is measured with an existing surface stress meter, there is a problem that the measurement light is absorbed by the glass and the measurement of compressive stress amount cannot be performed. Accordingly, it is demanded that even such a glass having a black color tone passes a certain amount or more of light having a wavelength out of the visible range.

It is an object of the present invention to provide a glass for chemical strengthening excelling in characteristics preferred for the purposes of housing or decoration of an electronic device, that is, bubble quality, strength, and light transmission characteristics.

SUMMARY

The present invention provides a glass for chemical strengthening (which may hereinafter be referred to as a glass for chemical strengthening of the present invention) containing, in mole percentage based on following oxides, 55% to 80% of $SiO_2$, 0.25% to 16% of $Al_2O_3$, 0% to 12% of $B_2O_3$, 5% to 20% of $Na_2O$, 0% to 15% of $K_2O$, 0% to 15% of MgO, 0% to 15% of CaO, 0% to 25% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

Further, there is provided the glass for chemical strengthening containing, in mole percentage based on following oxides, 55% to 80% of $SiO_2$, 3% to 16% of $Al_2O_3$, 0% to 12% of $B_2O_3$, 5% to 20% of $Na_2O$, 0% to 15% of $K_2O$, 0% to 15% of MgO, 0% to 3% of CaO, 0% to 18% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

Further, there is provided the glass for chemical strengthening containing, in mole percentage based on following oxides, 55% to 80% of $SiO_2$, 0.25% to 5% of $Al_2O_3$, 0% to 12% of $B_2O_3$, 5% to 20% of $Na_2O$, 0% to 8% of $K_2O$, 0% to 15% of MgO, 5% to 15% of CaO, 5% to 25% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

Further, the glass for chemical strengthening of the present invention is provided, wherein the coloring component in the glass is constituted of, in mole percentage based on oxides, 0.01% to 6% of $Fe_2O_3$, 0% to 6% of $Co_3O_4$, 0% to 6% of NiO, 0% to 6% of MnO, 0% to 6% of $Cr_2O_3$, and 0% to 6% of $V_2O_5$.

Further, the glass for chemical strengthening of the present invention is provided, containing 0.005% to 2% of a color correcting component (at least one metal oxide selected from the group consisting of oxides of Ti, Ce, Er, Nd, and Se).

Further, the glass for chemical strengthening of the present invention is provided, wherein the coloring component in the glass is constituted of, in mole percentage based on oxides, 1.5% to 6% of $Fe_2O_3$, and 0.1% to 1% of $Co_3O_4$.

Further, the glass for chemical strengthening of the present invention is provided, wherein a content of $Fe_2O_3$ is 0.005% or more and less than 1.5%. Further, the glass for chemical strengthening of the present invention is provided, wherein a content of NiO is less than 0.05%.

Further, the glass for chemical strengthening of the present invention is provided, wherein a content ratio of $Co_3O_4$/$Fe_2O_3$ is 0.01 to 0.5.

Further, the glass for chemical strengthening of the present invention is provided, containing 0.005% to 1% of $SnO_2$.

Further, the glass for chemical strengthening of the present invention is provided, containing 0.05% to 3% of CuO.

Further, the glass for chemical strengthening of the present invention is provided, wherein a minimum value of an absorption coefficient at wavelengths of 380 nm to 780 nm is 1 $min^{-1}$ or more.

Further, the glass for chemical strengthening of the present invention is provided, wherein a relative value of an absorption coefficient at a wavelength of 550 nm to an absorption coefficient at a wavelength of 600 nm calculated from a spectral transmittance curve of the glass, and a relative value of an absorption coefficient at a wavelength of 450 nm to an absorption coefficient at a wavelength of 600 nm calculated from a spectral transmittance curve of the glass are both in a range of 0.7 to 1.2.

Further, the glass for chemical strengthening of the present invention is provided, wherein variation amounts ΔT (550/600) and ΔT (450/600) of relative values of absorption coefficients represented by following expressions (1) and (2) are 5% or less in absolute value.

$$\Delta T(550/600)(\%) = [\{A(550/600) - B(550/600)\}/A(550/600)] \times 100 \quad (1)$$

$$\Delta T(450/600)(\%) = [\{A(450/600) - B(450/600)\}/A(450/600)] \times 100 \quad (2)$$

(In the above expression (1), A(550/600) is a relative value of an absorption coefficient at a wavelength of 550 nm to an absorption coefficient at a wavelength of 600 nm calculated from a spectral transmittance curve of the glass after irradiation with light of a 400 W high-pressure mercury lamp for 100 hours, and B(550/600) is a relative value of an absorption coefficient at a wavelength of 550 nm to an absorption coefficient at a wavelength of 600 nm calculated from a spectral transmittance curve of the glass before the light irradiation. In the above expression (2), A(450/600) is a relative value of an absorption coefficient at a wavelength of 450 nm to an absorption coefficient at a wavelength of 600 nm calculated from a spectral transmittance curve of the glass after irradiation with light of a 400 W high-pressure mercury lamp for 100 hours, and B(450/600) is a relative value of an absorption coefficient at a wavelength of 450 nm to an absorption coefficient at a wavelength of 600 nm calculated from a spectral transmittance curve of the glass before the light irradiation.)

Further, the glass for chemical strengthening of the present invention is provided, wherein an absolute value of a difference Δa* between chromaticity a* of reflected light by a D65 light source and chromaticity a* of reflected light by an F2 light source in an L*a*b* color system, which difference is expressed by following expression (I), and an absolute value of a difference Δb* between chromaticity b* of reflected light by the D65 light source and chromaticity b* of reflected light by the F2 light source in the L*a*b* color system, which difference is expressed by following expression (II), are both 2 or less.

$$\Delta a^* = a^* \text{ value } (D65 \text{ light source}) - a^* \text{ value } (F2 \text{ light source}) \quad (I)$$

$$\Delta b^* = b^* \text{ value } (D65 \text{ light source}) - b^* \text{ value } (F2 \text{ light source}) \quad (II)$$

Further, the glass for chemical strengthening of the present invention is provided, wherein when an indentation is formed by using a Vickers indenter in a mirror-finished surface of a glass plate having a thickness of 1 mm made of the glass for chemical strengthening, a load of the Vickers indenter that causes a crack occurrence rate of 50% is 150 gf or more.

Further, the present invention provides a chemical strengthened glass obtained by chemical strengthening the above-described glass for chemical strengthening of the present invention, wherein a depth of a surface compressive stress layer formed in a surface of the chemical strengthened glass by the chemical strengthening is 5 μm or more, and a surface compressive stress of the surface compressive stress layer is 300 MPa or more.

Further, the present invention provides the above-described chemical strengthened glass, wherein an absolute value of a difference Δa* between chromaticity a* of reflected light by a D65 light source and chromaticity a* of reflected light by an F2 light source in an L*a*b* color system, which difference is expressed by following expression (I), and an absolute value of a difference Δb* between chromaticity b* of reflected light by the D65 light source and chromaticity b* of reflected light by the F2 light source in the L*a*b* color system, which difference is expressed by following expression (II), are both 2 or less.

$$\Delta a^* = a^* \text{ value } (D65 \text{ light source}) - a^* \text{ value } (F2 \text{ light source}) \quad (I)$$

$$\Delta b^* = b^* \text{ value } (D65 \text{ light source}) - b^* \text{ value } (F2 \text{ light source}) \quad (II)$$

Further, the present invention provides a manufacturing method of a glass for chemical strengthening, the method including blending plural kinds of chemical compound materials to make a glass material, heating and melting the glass material, and thereafter defoaming and cooling the glass material, to thereby manufacture a glass for chemical strengthening containing, in mole percentage based on following oxides, 55% to 80% of $SiO_2$, 0.25% to 16% of $Al_2O_3$, 0% to 12% of $B_2O_3$, 5% to 20% of $Na_2O$, 0% to 15% of $K_2O$, 0% to 15% of MgO, 0% to 15% of CaO, 0% to 25% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

Further, the present invention provides the manufacturing method of a glass for chemical strengthening, the method including blending plural kinds of chemical compound materials to make a glass material, heating and melting the glass material, and thereafter defoaming and cooling the glass material, to thereby manufacture a glass for chemical strengthening containing, in mole percentage based on following oxides, 55% to 80% of $SiO_2$, 3% to 16% of $Al_2O_3$, 0% to 12% of $B_2O_3$, 5% to 20% of $Na_2O$, 0% to 15% of $K_2O$, 0% to 15% of MgO, 0% to 3% of CaO, 0% to 18% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

Further, the present invention provides the manufacturing method of a glass for chemical strengthening, the method including blending plural kinds of chemical compound materials to make a glass material, heating and melting the glass material, and thereafter defoaming and cooling the glass material, to thereby manufacture a glass for chemical strengthening containing, in mole percentage based on following oxides, 55% to 80% of $SiO_2$, 0.25% to 5% of $Al_2O_3$, 0% to 12% of $B_2O_3$, 5% to 20% of $Na_2O$, 0% to 8% of $K_2O$, 0% to 15% of MgO, 5% to 15% of CaO, 5% to 25% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

According to the present invention, a glass having excellent bubble quality can be obtained stably while lowering its environmental load. Further, a glass for chemical strengthening preferred for refining with sulfate can be obtained. The glass of the present invention is also able to be chemically strengthened, and can be used preferably for purposes that require a small thickness and high strength, for example, decorative purposes. Further, in the glass for chemical strengthening of the present invention, breakage due to a crack does not easily occur, and hence a glass having high strength can be made. The glass of the present invention also excels in press formability, and can be processed in a desired shape required for housing purposes or the like at low cost.

DETAILED DESCRIPTION

Hereinafter, preferred embodiments of a glass for chemical strengthening of the present invention will be described. Note that the present invention is not limited to the following embodiments.

A glass for chemical strengthening of the present invention contains 0.1% to 7% of an above-described coloring component (at least one metal oxide selected from the group consisting of oxides of Co, Mn, Fe, Ni, Cu, Cr, V, and Bi). Thus, it becomes possible to obtain a black base colored glass.

Further, a glass for housing purposes may be shaped and used, for example, not only in a flat plate shape but also in a concave or convex shape. In this case, a glass formed in a flat plate shape, a block shape, or the like is reheated and press-formed in a molten state, or a molten glass is poured into a press mold and press formed, to be formed in a desired shape.

When the glass is press-formed, it is preferred that the formation temperature of the glass be low during press formation. Generally, when the formation temperature of the glass during press formation is high, a superalloy or ceramics must be used for the mold, but they are poor in workability and also expensive, and hence are not preferable. When the formation temperature of the glass during press formation is high, the progress of degradation of the mold is also accelerated because the mold is used under high temperature. Further, since the glass is made into a soften state at high temperature, a large amount of energy is needed.

The glass for chemical strengthening of the present invention contains, in mole percentage based on oxides, 0.1% to 7% of a coloring component (at least one metal oxide selected from the group consisting of oxides of Co, Mn, Fe, Ni, Cu, Cr, V, and Bi) in the glass, and this allows to lower Tg (glass transition point), which is an indicator of the formation temperature of the glass during press formation. Thus, a glass excellent in press formability can be made, which is suitable for press forming into an appropriate shape such as a concave or convex shape.

In view of obtaining an excellent press formability as well as a desired light blocking effect in the black base color glass, the content of the coloring component (at least one metal oxide selected from the group consisting of oxides of Co, Mn, Fe, Ni, Cu, Cr, V, and Bi) is preferably 0.5% to 6%, more preferably 1% to 5.5%.

As the coloring component being at least one metal oxide selected from the group consisting of oxides of Co, Mn, Fe, Ni, Cu, Cr, V, and Bi, specifically, for example, $Co_3O_4$, MnO, $MnO_2$, $Fe_2O_3$, NiO, CuO, $Cu_2O$, $Cr_2O_3$, $V_2O_5$, $Bi_2O_3$ are used preferably.

Regarding these coloring components, it will suffice to contain one of them when the total content is 0.1% to 7%, but when each content is less than 0.01%, an effect as a coloring component cannot be obtained sufficiently. Preferably, its content is 0.1% or more, more preferably 0.2% or more. Further, when each content is more than 6%, the glass becomes unstable and devitrification occurs. Preferably, its content is 5% or less, more preferably, 4% or less.

It is preferred that the coloring component in the glass be constituted of, in mole percentage based on oxides, 0.01% to 6% of $Fe_2O_3$, 0% to 6% of $Co_3O_4$, 0% to 6% of NiO, 0% to 6% of MnO, 0% to 6% of $Cr_2O_3$, and 0% to 6% of $V_2O_5$.

That is, with the $Fe_2O_3$ being an essential component, appropriate components selected from $Co_3O_4$, NiO, MnO, $Cr_2O_3$, $V_2O_5$ may be combined and used. When the content of $Fe_2O_3$ is less than 0.01%, it is possible that a desired light blocking effect cannot be obtained. On the other hand, when the content of $Fe_2O_3$ is more than 6%, the glass may become unstable. Further, regarding the other components, namely, $Co_3O_4$, NiO, MnO, $Cr_2O_3$, $V_2O_5$, when each content is more than 6%, the glass may become unstable.

Note that in this specification, the contents of coloring component and color correcting component indicate a converted content given that each component existing in the glass exists as the represented oxide. For example, "containing 0.01% to 6% of $Fe_2O_3$" means an Fe content given that Fe existing in the glass exists entirely in the form of $Fe_2O_3$, that is, the $Fe_2O_3$-converted content of Fe is 0.01% to 6%.

For the glass for chemical strengthening of the present invention, it is possible to preferably use as the coloring component, for example: (i) a combination of $Fe_2O_3$ and at least one component selected from the group consisting of $Co_3O_4$, MnO, $MnO_2$, CuO, $Cu_2O$, $Cr_2O_3$, $V_2O_5$, and $Bi_2O_3$, (ii) a combination of $Fe_2O_3$ and at least one component selected from the group consisting of MnO, $MnO_2$, NiO, CuO, $Cu_2O$, $Cr_2O_3$, $V_2O_5$, and $Bi_2O_3$, and (iii) a combination of $Co_3O_4$ and at least one component selected from the group consisting of MnO, $MnO_2$, NiO, CuO, $Cu_2O$, $Cr_2O_3$, $V_2O_5$, and $Bi_2O_3$.

To make the absorption coefficients at wavelengths of 380 nm to 780 nm be 1 $mm^{-1}$ or more, it is preferred to make the absorption coefficients for light at these wavelengths be averagely high by combining plural coloring components. For example, in glasses for chemical strengthening of a first embodiment and a second embodiment, which will be described in detail below, by containing a combination of 1.5% to 6% of $Fe_2O_3$ and 0.1% to 1% of $Co_3O_4$ as coloring components in the glass, a glass can be made which sufficiently absorbs light in the visible range of wavelengths from 380 nm to 780 nm and meanwhile averagely absorbs light in the visible range. That is, when it is attempted to obtain a glass exhibiting a black color, depending on the type and blending amount of coloring components, a black color exhibiting brown or blue may be generated due to the existence of a wavelength range with a low absorption characteristic in the visible range of wavelengths from 380 nm to 780 nm. In this respect, having the above-described coloring components allows to represent what is called a jet-black color.

As ones by which such an absorption characteristic can be obtained, combinations of blending amounts of coloring components other than the above-described ones include a combination of 0.01% to 4% of $Fe_2O_3$, 0.2% to 3% of $Co_3O_4$, and 1.5% to 6% of NiO, a combination of 0.01% to 6% of $Fe_2O_3$ and 0.05% to 5% of NiO, a combination of 0.01% to 4% of $Fe_2O_3$, 0.05% to 2% of $Co_3O_4$, 0.05% to 2% of NiO, and 0.05% to 2% of $Cr_2O_3$, and a combination of 0.01% to 4% of $Fe_2O_3$, 0.05% to 2% of $Co_3O_4$, 0.05% to 2% of NiO, and 0.05% to 2% of MnO.

Further, as ones by which such an absorption characteristic can be obtained, combinations of blending amounts of coloring components when at least either $Fe_2O_3$ or $Co_3O_4$ among the coloring components is not used include a combination of 0.01% to 6% of $Fe_2O_3$ and 0.05% to 6% of $MnO_2$, a combination of 0.01% to 6% of $Fe_2O_3$ and 0.05% to 6% of $Cr_2O_3$, a combination of 0.01% to 6% of $Fe_2O_3$ and 0.05% to 6% of $V_2O_5$, a combination of 0.05% to 6% of $Co_3O_4$ and 0.05% to 6% of NiO, a combination of 0.05% to 6% of $Co_3O_4$ and 0.05% to 6% of $MnO_2$, a combination of 0.05% to 6% of $Co_3O_4$ and 0.05% to 6% of $Cr_2O_3$, a combination of 0.05% to 6% of $Co_3O_4$ and 0.05% to 6% of $V_2O_5$, a combination of 0.05% to 6% of NiO and 0.05% to 6% of $MnO_2$, a combination of 0.05% to 6% of NiO and 0.05% to 6% of $Cr_2O_3$, a combination of 0.05% to 6% of NiO and 0.05% to 6% of $V_2O_5$, a combination of 0.05% to 6% of $MnO_2$ and 0.05% to 6% of $Cr_2O_3$, a combination of 0.05% to 6% of $MnO_2$ and 0.05% to 6% of $V_2O_5$, and a combination of 0.05% to 6% of $Cr_2O_3$ and 0.05% to 6% of $V_2O_5$.

Further, as ones by which such an absorption characteristic can be obtained, combinations of blending amounts of coloring components when at least either $Fe_2O_3$ or $Co_3O_4$ among the coloring components is not used include a combination of 0.01% to 6% of $Fe_2O_3$, 0.01% to 6% of NiO, and 0.01% to 6% of $MnO_2$, a combination of 0.01% to 6% of $Fe_2O_3$, 0.01% to 6% of NiO, and 0.01% to 6% of $Cr_2O_3$, a combination of 0.01% to 6% of $Fe_2O_3$, 0.01% to 6% of NiO, and 0.01% to 6% of $V_2O_5$, a combination of 0.01% to 6% of $Fe_2O_3$, 0.01% to 6% of $MnO_2$, and 0.01% to 6% of $Cr_2O_3$, a combination of 0.01% to 6% of $Fe_2O_3$, 0.01% to 6% of $MnO_2$, and 0.01% to 6% of $V_2O_5$, a combination of 0.01% to 6% of $Fe_2O_3$, 0.01% to 6% of $Cr_2O_3$, and 0.01% to 6% of $V_2O_5$, a combination of 0.01% to 6% of $Co_3O_4$, 0.01% to 6% of NiO, and 0.01% to 6% of $MnO_2$, a combination of 0.01% to 6% of $Co_3O_4$, 0.01% to 6% of NiO, and 0.01% to 6% of $Cr_2O_3$, a combination of 0.01% to 6% of $Co_3O_4$, 0.01% to 6% of NiO, and 0.01% to 6% of $V_2O_5$, a combination of 0.01% to 6% of $Co_3O_4$, 0.01% to 6% of $MnO_2$, and 0.01% to 6% of $Cr_2O_3$, a combination of 0.01% to 6% of $Co_3O_4$, 0.01% to 6% of $MnO_2$, and 0.01% to 6% of $V_2O_5$, and a combination of 0.01% to 6% of $Co_3O_4$, 0.01% to 6% of $Cr_2O_3$, and 0.01% to 6% of $V_2O_5$.

Further, as ones by which such an absorption characteristic can be obtained, combinations of blending amounts of coloring components when at least either $Fe_2O_3$ or $Co_3O_4$ among the coloring components is not used include a combination of 0.01% to 6% of $Fe_2O_3$, 0.01% to 6% of NiO, 0.01% to 6% of $MnO_2$, and 0.01% to 6% of $Cr_2O_3$, a combination of 0.01% to 6% of $Fe_2O_3$, 0.01% to 6% of $MnO_2$, 0.01% to 6% of $Cr_2O_3$, and 0.01% to 6% of $V_2O_5$, a combination of 0.01% to 6% of $Fe_2O_3$, 0.01% to 6% of NiO, 0.01% to 6% of $MnO_2$, and 0.01% to 6% of $V_2O_5$, a combination of 0.01% to 6% of $Fe_2O_3$, 0.01% to 6% of NiO, 0.01% to 6% of $Cr_2O_3$, and 0.01% to 6% of $V_2O_5$, a combination of 0.01% to 6% of $Co_3O_4$, 0.01% to 6% of NiO, 0.01% to 6% of $MnO_2$, and 0.01% to 6% of $Cr_2O_3$, a combination of 0.01% to 6% of $Co_3O_4$, 0.01% to 6% of $MnO_2$, 0.01% to 6% of $Cr_2O_3$, and 0.01% to 6% of $V_2O_5$, a combination of 0.01% to 6% of $Co_3O_4$, 0.01% to 6% of NiO, 0.01% to 6% of $MnO_2$, and 0.01% to 6% of $V_2O_5$, and a combination of 0.01% to 6% of $Co_3O_4$, 0.01% to 6% of NiO, 0.01% to 6% of $Cr_2O_3$, and 0.01% to 6% of $V_2O_5$.

Further, as ones by which such an absorption characteristic can be obtained, combinations of blending amounts of coloring components when at least either $Fe_2O_3$ or $Co_3O_4$ among the coloring components is not used include a combination of 0.01% to 6% of $Fe_2O_3$, 0.01% to 6% of NiO, 0.01% to 6% of $MnO_2$, 0.01% to 6% of $Cr_2O_3$, and 0.01% to 6% of $V_2O_5$, and a combination of 0.01% to 6% of $Co_3O_4$, 0.01% to 6% of NiO, 0.01% to 6% of $MnO_2$, 0.01% to 6% of $Cr_2O_3$, and 0.01% to 6% of $V_2O_5$.

Further, by combining coloring components in the glass, a glass can be made that has transparency of certain wavelengths of ultraviolet light, infrared light, or the like while sufficiently absorbing light in the visible range at wavelengths of 380 nm to 780 nm. For example, a glass containing the above-described combination of $Fe_2O_3$, $Co_3O_4$, NiO, MnO, $Cr_2O_3$, and $V_2O_5$ as coloring components can has transparency of ultraviolet light at wavelengths of 300 nm to 380 nm as well as infrared light at wavelengths of 800 nm to 950 nm. Further, a glass containing the above-described combination of $Fe_2O_3$ and $Co_3O_4$ as coloring components can has transparency of infrared light at wavelengths of 800 nm to 950 nm. For example, the infrared light at wavelengths of 800 nm to 950 nm is utilized in an infrared communication device used in data communication of a portable phone or a portable game device. Accordingly, giving an infrared light transmitting characteristic to a glass by blending the above-described combination of coloring components allows that, when the glass is applied to housing purposes for example, it can be applied without providing an opening for the infrared light communication device in the housing.

On the other hand, in order to obtain a chemical strengthened glass having sufficient strength, it is necessary to form a compressive stress layer down to a predetermined depth by chemical strengthening. For example, in glasses for chemical strengthening in a first embodiment and a second embodiment which will be described below, by making the content of $Fe_2O_3$ be 0.005% or more and less than 1.5% in mole percentage based on oxides, it can be made as a glass for chemical strengthening in which ion exchange in a glass surface by the chemical strengthening easily proceeds, and a surface compressive stress layer having a sufficient depth can be formed.

Further, the glass after being chemically strengthened has a surface compressive stress layer and an inner tensile stress layer, but it is known that when a minute foreign matter, particularly a nickel sulfide (NiS), exists in this tensile stress layer, this NiS spreads from an a phase to a β phase over time, and the glass after being chemically strengthened is damaged by a volume change at that time. Such damage may naturally occur, although it is quite rare, without an operation of a particularly large external force. Accordingly, it is preferred to suppress generation of foreign matters such as the nickel sulfide (NiS) in the glass.

Note that regarding the NiS, it is considered that nickel existing in the molten glass by being blended as a coloring material or mixed from an alloy such as stainless steel combines with $S^{2-}$ to form the NiS. The temperature range for generating the NiS is unclear but is presumed to be a temperature range of 800° C. to 1200° C. since it is conceivably 800° C. or more from the temperature range for generating the above-described $S^{2-}$ and temperatures for generating industrial nickel sulfides are about 1000° C. Further, when it becomes a high temperature of 1300° C. or more, it is conceivable that the NiS formed once melts again or disperses in the glass and disappears. This melting rate or dispersion rate is presumed to be larger as the temperature becomes higher.

For example, in the glasses for chemical strengthening in the first embodiment and the second embodiment which will be described in detail below, by making the content of NiO be less than 0.05% in mole percentage based on oxides, it can be made as a glass for chemical strengthening in which foreign matters such as the NiS are difficult to be generated, and occurrence of breakage in the glass after chemical strengthening is suppressed.

It is preferred that the glass for chemical strengthening of the present invention contain, as a color correcting component, 0.005% to 2% of at least one metal oxide selected from the group consisting of oxides of Ti, Ce, Er, Nd, and Se.

As the color correcting component (at least one metal oxide selected from the group consisting of oxides of Ti, Ce, Er, Nd, and Se), specifically, for example $TiO_2$, $CeO_2$, $Er_2O_3$, $Nd_2O_3$, and $SeO_2$ are used preferably.

By containing, as the color correcting component, 0.005% or more in total of metal oxides of Ti, Ce, Er, Nd, and Se, the difference in absorption characteristic of light within the wavelength range of the visible range can be reduced, and a glass having a black color tone of what is called jet black which does not exhibit brown or blue color can be obtained. Further, by making the above-described content of color correcting components be 2% or less, it is possible to suppress the glass from becoming unstable which causes devitrification. The above-described total content of color correcting components is more preferably 0.01% to 1.8%, furthermore preferably 0.1% to 1.5%.

As the glass for chemical strengthening of the present invention, one can be exemplified which contains, together with the above-described coloring components, in mole percentage based on following oxides, 55% to 80% of $SiO_2$, 0.25% to 16% of $Al_2O_3$, 0% to 12% of $B_2O_3$, 5% to 20% of $Na_2O$, 0% to 15% of $K_2O$, 0% to 15% of MgO, 0% to 15% of CaO, and 0% to 25% of ΣRO (where R represents Mg, Ca, Sr, Ba, or Zn). Note that ΣRO means the sum of all the RO components, that is, "MgO+CaO+SrO+BaO+ZnO".

Hereinafter, compositions of glasses other than coloring components of the glass for chemical strengthening of the present invention will be described using a content expressed in mole percentage unless otherwise stated.

$SiO_2$ is a component that forms a network of the glass and hence is essential. When its content is less than 55%, stability as a glass decreases, or weather resistance decreases. Preferably, its content is 60% or more. More preferably, its content is 65% or more. When the content of $SiO_2$ is more than 80%, viscosity of the glass increases, and meltability of the glass decreases significantly. Preferably, its content is 75% or less, typically 70% or less.

$Al_2O_3$ is a component that improves weather resistance and chemical strengthening characteristic of the glass and is essential. When its content is less than 0.25%, the weather resistance decreases. Preferably, its content is 0.3% or more, typically 0.5% or more. When the content of $Al_2O_3$ is more than 16%, viscosity of the glass becomes high and uniform melting becomes difficult. Preferably, its content is 14% or less, typically 12% or less.

$B_2O_3$ is a component that improves weather resistance of the glass, and is not essential but can be contained as necessary. When $B_2O_3$ is contained, if its content is less than 4%, it is possible that a significant effect cannot be obtained regarding improvement of the weather resistance. Preferably, its content is 5% or more, typically 6% or more. When the content of $B_2O_3$ is more than 12%, it is possible that striae due to volatilization occur and the yield decreases. Preferably, its content is 11% or less, typically 10% or less.

$Na_2O$ is a component that improves meltability of the glass, and is essential because it causes a surface compressive stress layer to be formed by ion exchange. When its content is less than 5%, the meltability is poor and it is also difficult to form a desired surface compressive stress layer by ion exchange. Preferably, its content is 7% or more, typically 8% or more.

The weather resistance decreases when the content of $Na_2O$ is more than 20%. Preferably, its content is 18% or less, typically 16% or less.

$K_2O$ is a component that improves meltability of the glass, and has an operation to increase ion exchange speed in chemical strengthening. Thus, this component is not essential but is preferred to be contained. When $K_2O$ is contained, if its content is less than 0.01%, it is possible that a significant effect cannot be obtained regarding improvement of meltability, or that a significant effect cannot be obtained regarding ion exchange speed improvement. Typically, its content is 0.3% or more. When the content of $K_2O$ is more than 15%, weather resistance decreases. Preferably, its content is 12% or less, typically 10% or less.

MgO is a component that improves meltability of the glass, and is not essential but can be contained as necessary. When MgO is contained, if its content is less than 3%, it is possible that a significant effect cannot be obtained regarding improvement of meltability. Typically, its content is 4% or more. When the content of MgO is more than 15%, weather resistance decreases. Preferably, its content is 13% or less, typically 12% or less.

CaO is a component that improves meltability of the glass and is not essential but can be contained as necessary. When CaO is contained, if its content is less than 0.01%, a significant effect cannot be obtained regarding improvement of meltability. Typically, its content is 0.1% or more. When the content of CaO is more than 15%, the chemical strengthening characteristic decreases. Preferably, its content is 12% or less, typically 10% or less. Practically, it is preferred not to be contained.

RO (where R represents Mg, Ca, Sr, Ba, or Zn) is a component that improves meltability and is not essential, but any one or more of them can be contained as necessary. In this case, it is possible that the meltability decreases when the total content $\Sigma RO$ (where R represents Mg, Ca, Sr, Ba, or Zn), i.e. the content of RO, is less than 1%. Preferably, its content is 3% or more, typically 5% or more. When $\Sigma RO$ (where R represents Mg, Ca, Sr, Ba, or Zn) is more than 25%, weather resistance decreases. Preferably, it is 20% or less, more preferably 18% or less, typically 16% or less.

$ZrO_2$ is a component that increases ion exchange speed and is not essential, but can be contained as necessary. When $ZrO_2$ is contained, its content is preferably in the range of 5% or less, more preferably in the range of 4% or less, furthermore preferably in the range of 3% or less. When the content of $ZrO_2$ is more than 5%, meltability worsens and there may be cases where it remains as a non-melted matter in the glass. Typically, $ZrO_2$ is not contained.

There are two embodiments (first embodiment and second embodiment) which will be described below as preferred embodiments for the glass for chemical strengthening of the present invention.

A glass for chemical strengthening of a first embodiment will be described. The glass of the first embodiment relates to a glass for chemical strengthening, and the composition thereof will be described using a content expressed in mole percentage unless otherwise particularly stated.

The glass for chemical strengthening of the first embodiment contains, in mole percentage based on following oxides, 55% to 80% of $SiO_2$, 3% to 16% of $Al_2O_3$, 0% to 12% of $B_2O_3$, 5% to 20% of $Na_2O$, 0% to 15% of $K_2O$, 0% to 15% of MgO, 0% to 3% of CaO, 0% to 18% of $\Sigma RO$ (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

$SiO_2$ is a component that forms a network of the glass and hence is essential. When its content is less than 55%, stability as a glass decreases, or weather resistance decreases. Preferably, its content is 58% or more. More preferably, its content is 60% or more. When the content of $SiO_2$ is more than 80%, viscosity of the glass increases, and meltability decreases significantly. Preferably, its content is 75% or less, typically 70% or less.

$Al_2O_3$ is a component that improves weather resistance and chemical strengthening characteristic of the glass and is essential. When its content is less than 3%, the weather resistance decreases. Preferably, its content is 4% or more, typically 5% or more. When the content of $Al_2O_3$ is more than 16%, viscosity of the glass becomes high and uniform melting becomes difficult. Preferably, its content is 15% or less, more preferably 14% or less, typically 12% or less.

$B_2O_3$ is a component that improves weather resistance of the glass, and is not essential but can be contained as necessary. When $B_2O_3$ is contained, if its content is less than 4%, it is possible that a significant effect cannot be obtained regarding improvement of the weather resistance. Preferably, its content is 5% or more, typically 6% or more. When the content of $B_2O_3$ is more than 12%, its content is possible that striae due to volatilization occur and the yield decreases. Preferably, its content is 11% or less, typically 10% or less.

$Na_2O$ is a component that improves meltability of the glass, and is essential because it causes a surface compressive stress layer to be formed by ion exchange. When its content is less than 5%, the meltability is poor and it is also difficult to form a desired surface compressive stress layer by ion exchange. Preferably, its content is 7% or more, typically 8% or more. When the content of $Na_2O$ is more than 20%, weather resistance decreases. Preferably, its content is 16% or less, typically 15% or less.

$K_2O$ is a component that improves meltability, and has an operation to increase ion exchange speed in chemical strengthening. Thus, this component is not essential but is preferred to be contained. When $K_2O$ is contained, if its content is less than 0.01%, it is possible that a significant effect cannot be obtained regarding improvement of meltability, or that a significant effect cannot be obtained regarding ion exchange speed improvement. Typically, its content is 0.3% or more. When the content of $K_2O$ is more than 15%, weather resistance decreases. Preferably, its content is 10% or less, typically 8% or less.

MgO is a component that improves meltability, and is not essential but can be contained as necessary. When MgO is contained, if its content is less than 3%, it is possible that a significant effect cannot be obtained regarding improvement of meltability. Typically, its content is 4% or more. When the content of MgO is more than 15%, weather resistance decreases. Preferably, its content is 13% or less, typically 12% or less.

CaO is a component that improves meltability and can be contained as necessary. When CaO is contained, if its content is less than 0.01%, a significant effect cannot be obtained regarding improvement of meltability. Typically, its content is 0.1% or more. When the content of CaO is more than 3%, the chemical strengthening characteristic decreases. Preferably, its content is 1% or less, typically 0.5% or less. Practically, CaO is preferred not to be contained.

RO (where R represents Mg, Ca, Sr, Ba, or Zn) is a component that improves meltability and is not essential, but any one or more of them can be contained as necessary. In this case, it is possible that the meltability decreases when the total content $\Sigma RO$ is less than 1%. Preferably, its content is 3% or more, typically 5% or more. When $\Sigma RO$ is more than 18%, weather resistance decreases. Preferably, its content is 15% or less, more preferably 13% or less, typically 11% or less.

$ZrO_2$ is a component that increases ion exchange speed and is not essential, but can be contained as necessary. When $ZrO_2$ is contained, its content is preferably in the range of 5% or less, more preferably in the range of 4% or less, furthermore preferably in the range of 3% or less. When the content of $ZrO_2$ is more than 5%, meltability worsens and there may be cases where it remains as a non-melted matter in the glass. Typically, $ZrO_2$ is not contained.

The coloring component is constituted of at least one metal oxide selected from the group consisting of oxides of Co, Mn, Fe, Ni, Cu, Cr, V, and Bi as described above, and is an essential component. Regarding these coloring components, it will suffice to contain one of them when the total content is 0.1% to 7%, but when each content is less than 0.01%, an effect as a coloring component cannot be obtained sufficiently. Preferably, its content is 0.1% or more, more preferably 0.2% or more. Further, when each content is more than 6%, the glass becomes unstable and devitrification occurs. Preferably, its content is 5% or less, more preferably, 4% or less.

$Fe_2O_3$ is a component for coloring a glass with a deep color and is preferred to be used in the present invention. When $Fe_2O_3$ is contained, if the total iron content represented by $Fe_2O_3$ is less than 1.5%, it is possible that a desired black glass cannot be obtained. Preferably, its content is 2% or more, more preferably 3% or more. When the content of $Fe_2O_3$ is more than 6%, the glass becomes unstable and devitrification occurs. Preferably, its content is 5% or less, more preferably 4% or less.

It is preferred that, among the total iron, the ratio of divalent iron content (iron redox) converted by $Fe_2O_3$ be 10% to 50%, particularly 15% to 40%. Most preferably, the iron redox is 20% to 30%. When the iron redox is less than 10%, decomposition of $SO_3$ does not proceed when $SO_3$ is contained, and it is possible that an expected refining effect cannot be obtained. When the iron redox is more than 50%, decomposition of $SO_3$ proceeds too much before refining, and it is possible that the expected refining effect cannot be obtained, or that it becomes a source of bubbles and increases the number of bubbles.

In this specification, the content of the total iron converted into $Fe_2O_3$ represents the content of $Fe_2O_3$. Regarding the iron redox, the ratio of bivalent iron converted into $Fe_2O_3$ among the total iron converted into $Fe_2O_3$ by a Mossbauer spectroscopy can be represented by percentage. Specifically, evaluation is performed with a transmission optical system in which a radiation source ($^{57}Co$), a glass sample (a glass flat plate having a thickness of 3 mm to 7 mm which is cut from the above-described glass block, grinded, and mirror polished), and a detector (45431 made by LND, Inc.) are disposed on a straight line. The radiation source is moved with respect to an axial direction of the optical system, so as to cause an energy change of γ ray by a Doppler effect. Then, a Mossbauer absorption spectrum obtained at room temperature is used to calculate the ratio of bivalent iron to the total iron and the ratio of trivalent iron to the total iron, and the ratio of bivalent Fe to the total iron is taken as the iron redox.

Further, in the glass for chemical strengthening of this embodiment, the total iron content represented by $Fe_2O_3$ may be 0.005% or more and less than 1.5%.

By making the content of $Fe_2O_3$ be less than 1.5%, ion exchange with $Na_2O$ in a glass surface layer and $K_2O$ in a molten salt in the chemical strengthening easily proceeds, and a surface compressive stress layer can be formed down to a sufficient depth. Preferably, its content is 1.2% or less, more preferably 1.0% or less. On the other hand, when the content of $Fe_2O_3$ is less than 0.005%, a desired black glass cannot be obtained. Preferably, its content is 0.01% or more, more preferably 0.012% or more.

$Co_3O_4$ is a coloring component and exhibits a defoaming effect while coexisting with iron, and hence is a component preferred to be used in the present invention. Specifically, 02 bubbles discharged when trivalent iron becomes bivalent iron in a high-temperature state are absorbed when cobalt is oxidized. Consequently the 02 bubbles are reduced, and thus the defoaming effect is obtained.

Moreover, $Co_3O_4$ is a component that further increases the refining operation when being allowed to coexist with $SO_3$. Specifically, for example, when a sodium sulfate ($Na_2SO_4$) is used as a refining agent, defoaming from the glass improves by allowing the reaction $SO_3 \rightarrow SO_2 + \frac{1}{2}O_2$ to proceed, and thus the oxygen partial pressure in the glass is preferred to be low. By co-adding cobalt to a glass containing iron, release of oxygen occurring due to reduction of iron can be suppressed by oxidation of cobalt, and thus decomposition of $SO_3$ is accelerated. Thus, it is possible to produce a glass with a small bubble defect.

Further, in a glass containing a relatively large amount of alkali metal for chemical strengthening, basicity of the glass increases, $SO_3$ does not decompose easily, and the refining effect decreases. In this manner, in one containing iron in the glass for chemical strengthening in which $SO_3$ does not decompose easily, cobalt accelerates decomposition of $SO_3$, and hence is effective in particular for acceleration of a defoaming effect. In order for such a refining operation to occur, the content of $Co_3O_4$ is 0.1% or more, preferably 0.2% or more, typically 0.3% or more. When its content is more than 1%, the glass becomes unstable and devitrification occurs. Preferably, its content is 0.8% or less, more preferably 0.6% or less.

When the mole ratio of the content of $Co_3O_4$ and the content of $Fe_2O_3$, that is, the content ratio of $Co_3O_4/Fe_2O_3$ is less than 0.01, it is possible that the above-described defoaming effect cannot be obtained. Preferably, the content ratio of $Co_3O_4/Fe_2O_3$ is 0.05 or more, typically 0.1 or more. When the content ratio of $Co_3O_4/Fe_2O_3$ is more than 0.5, it inversely becomes a source of bubbles, and it is possible that melting down of the glass becomes slow or the number of bubbles increases. Thus, a countermeasure such as using a separate refining agent, or the like needs to be taken. Preferably, the content ratio of $Co_3O_4/Fe_2O_3$ is 0.3 or less, more preferably 0.2 or less.

NiO is a coloring component for coloring a glass with a desired black color, and is a component which is preferred to be used in the present invention. When NiO is contained, it is possible that the effect as a coloring component cannot be obtained sufficiently if its content is less than 0.05%. Preferably, its content is 0.1% or more, more preferably 0.2% or more. When the content of NiO is more than 6%, brightness of the color tone of the glass becomes excessively high, and a desired black color tone cannot be obtained. Further, the glass becomes unstable and devitrification occurs. Preferably, its content is 5% or less, more preferably 4% or less.

Further, in the glass for chemical strengthening of this embodiment, the content of NiO may be less than 0.05%. When the content of NiO is 0.05% or more, it is possible that generation of foreign matters such as the NiS which causes glass breakage after chemical strengthening is not suppressed. Preferably, its content is 0.03% or less, more preferably 0.02% or less.

CuO is a coloring component and is not essential but can be contained as necessary. Further, CuO is a component exhibiting an effect to lower metamerism (metameric stimuli) when it is contained in a glass and is not essential but can be contained as necessary.

The metamerism is an index indicating the degree of a change of a color tone or an outer color due to color of outside light and can be defined by using the L*a*b* color system standardized by CIE (Commission Internationale de l'Eclairage). The lower the metamerism, the smaller the degree of the change of the color tone or the outer color due to the color of the outside light. For example, when the metamerism of the glass is high, the color tone becomes greatly different due to an external light source, and the color tone of the glass indoors and the color tone of the glass outdoors differ greatly.

By containing CuO, in the glass for chemical strengthening of the present invention, it is possible to easily obtain one in which an absolute value of $\Delta a^*$ defined by the following expression (I) and an absolute value of $\Delta b^*$ defined by the following expression (II) are both 2 or less. This can reduce the difference between a reflected color tone of the glass indoors and a reflected color tone of the glass outdoors.

(i) a difference $\Delta a^*$ between chromaticity $a^*$ of reflected light by a D65 light source and chromaticity $a^*$ of reflected light by an F2 light source in an L*a*b* color system $$\Delta a^* = a^* \text{ value } (D65 \text{ light source}) - a^* \text{ value } (F2 \text{ light source}) \quad (I)$$

(ii) a difference $\Delta b^*$ between chromaticity $b^*$ of reflected light by a D65 light source and chromaticity $b^*$ of reflected light by an F2 light source in an L*a*b* color system $$\Delta b^* = b^* \text{ value } (D65 \text{ light source}) - b^* \text{ value } (F2 \text{ light source}) \quad (II)$$

When CuO is contained, if its content is less than 0.05%, it is possible that a significant effect cannot be obtained regarding adjustment of color tone or suppression of metamerism. Preferably, its content is 0.2% or more, typically, 0.5% or more. When the content of CuO is more than 3%, it is possible that the glass becomes unstable and devitrification occurs. Preferably, its content is 2.5% or less, typically 2% or less.

Note that regarding $Fe_2O_3$, when it is contained in the glass, there is an effect to reduce the metamerism similarly to CuO. The content of $Fe_2O_3$ by which the significant effect regarding the metamerism can be obtained is preferably 0.05% to 2%, typically 0.3% to 1.5%.

MnO, $MnO_2$, $Cu_2O$, $Cr_2O_3$, $V_2O_5$, and $Bi_2O_3$ are coloring components and are not essential, but at least one of these coloring components can be contained as necessary. When these coloring components are contained, the effect as a coloring component cannot be obtained sufficiently if each content is less than 0.01%. Preferably, its content is 0.1% or more, more preferably 0.2% or more. Further, when each content is more than 6%, the glass becomes unstable and devitrification occurs. Preferably, its content is 5% or less, more preferably, 4% or less.

A content ratio $(SiO_2+Al_2O_3+B_2O_3)/(\Sigma R'_2O+CaO+SrO+BaO+Fe_2O_3+Co_3O_4)$ represents the ratio of the total content of reticulate oxides forming the network of the glass and the total content of a main modified oxide. Note that $\Sigma R'_2O$ represents the sum of all $R'_2O$ components, that is, "$Na_2O+K_2O+Li_2O$". When this ratio is less than 3, it is possible that the probability of breakage when an indentation is made after the chemical strengthening becomes large. Preferably, the content ratio is 3.6 or more, typically 4 or more. When this ratio is more than 6, viscosity of the glass increases, and meltability of the glass decreases. Preferably, the content ratio is 5.5 or less, more preferably 5 or less.

$SO_3$ is a component that operates as a refining agent, and is not essential but can be contained as necessary. When $SO_3$ is contained, an expected refining operation cannot be obtained if its content is less than 0.005%. Preferably, its content is 0.01% or more, more preferably 0.02% or more. Most preferably, its content is 0.03% or more. Further, when its content is more than 0.5%, it inversely becomes a source of bubbles, and it is possible that melting down of the glass becomes slow or the number of bubbles increases. Preferably, its content is 0.3% or less, more preferably 0.2% or less. Most preferably, its content is 0.1% or less.

$SnO_2$ is a component that operates as a refining agent, and is not essential but can be contained as necessary. When $SnO_2$ is contained, an expected refining operation cannot be obtained if its content is less than 0.005%. Preferably, its content is 0.01% or more, more preferably 0.05% or more. Further, when its content is more than 1%, it inversely becomes a source of bubbles, and it is possible that melting down of the glass becomes slow or the number of bubbles increases. Preferably, its content is 0.8% or less, more preferably 0.5% or less. Most preferably, its content is 0.3% or less.

$TiO_2$ is a component that improves weather resistance, is a color correcting component adjusting the color tone of the glass, and is not essential but can be contained as necessary. When $TiO_2$ is contained, it is possible that a significant effect cannot be obtained regarding improvement of weather resistance if its content is less than 0.005%. It is also possible that the color correcting effect cannot be obtained sufficiently, and that exhibition of, for example, bluish black or brownish black color tone in a black base color glass cannot be prevented sufficiently. Preferably, its content is 0.01% or more, typically 0.1% or more. When the content of $TiO_2$ is more than 1%, it is possible that the glass becomes unstable and devitrification occurs. Preferably, its content is 0.8% or less, typically 0.6% or less.

$Li_2O$ is a component for improving meltability, and is not essential but can be contained as necessary. When $Li_2O$ is contained, it is possible that a significant effect cannot be obtained regarding improvement of meltability if its content is less than 1%. Preferably, its content is 3% or more, typically 6% or more. When the content of $Li_2O$ is more than 15%, it is possible that weather resistance decreases. Preferably, its content is 10% or less, typically 5% or less.

SrO is a component for improving meltability, and is not essential but can be contained as necessary. When SrO is contained, it is possible that a significant effect cannot be obtained regarding improvement of meltability if its content is less than 1%. Preferably, its content is 3% or more, typically 6% or more. When the content of SrO is more than 15%, it is possible that weather resistance and chemical strengthening characteristic decrease. Preferably, its content is 12% or less, typically 9% or less.

BaO is a component for improving meltability, and is not essential but can be contained as necessary. When BaO is contained, it is possible that a significant effect cannot be obtained regarding improvement of meltability if its content is less than 1%. Preferably, its content is 3% or more, typically 6% or more. When the content of BaO is more than 15%, it is possible that weather resistance and chemical strengthening characteristic decrease. Preferably, its content is 12% or less, typically 9% or less.

ZnO is a component for improving meltability, and is not essential but can be contained as necessary. When ZnO is contained, it is possible that a significant effect cannot be obtained regarding improvement of meltability if its content is less than 1%. Preferably, its content is 3% or more, typically 6% or more. When the content of ZnO is more than 15%, it is possible that weather resistance decreases. Preferably, its content is 12% or less, typically 9% or less.

$CeO_2$, $Er_2O_3$, $Nd_2O_3$, $SeO_2$ are color correcting components for adjusting the color tone of the glass and are not essential, but at least one of these color correcting components can be contained as necessary.
When these color correcting components are contained, if each content is less than 0.01% the effect to reduce a difference in absorption characteristic of light within the wavelength range of a visible range for correcting to a desired black color cannot be obtained sufficiently, and it is possible that exhibition of, for example, bluish black or brownish black color tone cannot be prevented sufficiently. Each content of these color correcting components is preferably 0.05% or more, typically 0.1% or more. When each content of the color correcting components is more than 2%, it is possible that the glass becomes unstable and devitrification occurs.

Note that the type and amount of the above-described color correcting components can be appropriately selected and used depending on the composition of the parent component of each glass.

As the above-described color correcting components, it is preferred that the total content of $TiO_2$, $CeO_2$, $Er_2O_3$, $Nd_2O_3$, and $SeO_2$ be 0.005% to 2%. By making the total content of $TiO_2$, $CeO_2$, $Er_2O_3$, $Nd_2O_3$, and $SeO_2$ be 0.005% or more, a difference in absorption characteristic of light within the wavelength range of a visible range can be reduced, and a glass having a color tone of what is called jet black which does not exhibit brown or blue color can be obtained. Further, by making the above-described content of color correcting components be 2% or less, it is possible to suppress the glass from becoming unstable which causes devitrification. The above-described total content of color correcting components is more preferably 0.01% to 1.8%, furthermore preferably 0.05% to 1.5%.

As the glass of the above-described first embodiment, for example, one containing, in mole percentage based on following oxides, 60% to 80% of $SiO_2$, 3% to 15% of $Al_2O_3$, 5% to 15% of $Na_2O$, 0% to 4% of $K_2O$, 0% to 15% of MgO, 0% to 3% of CaO, 0% to 18% of ΣRO (where R represents Mg, Ca, Sr, Ba, or Zn), 1.5% to 6% of $Fe_2O_3$, and 0.1% to 1% of $Co_3O_4$ or one containing, in mole percentage based on following oxides, 55% to 75% of $SiO_2$, 8% to 16% of $Al_2O_3$, 4% to 12% of $B_2O_3$, 7% to 16% of $Na_2O$, 0% to 4% of $K_2O$, 0% to 3% of MgO, 0% to 3% of CaO, 0% to 5% of ΣRO (where R represents Mg, Ca, Sr, Ba, or Zn), 1.5% to 6% of $Fe_2O_3$, and 0.1% to 1% of $Co_3O_4$ can be preferably used.

Next, a glass for chemical strengthening of a second embodiment will be described. Regarding the glass for chemical strengthening of the second embodiment of the present invention below, the composition will be described using a content expressed in mole percentage unless otherwise particularly stated.

The glass for chemical strengthening of the second embodiment contains, in mole percentage based on following oxides, 55% to 80% of $SiO_2$, 0.25% to 5% of $Al_2O_3$, 0% to 12% of $B_2O_3$, 5% to 20% of $Na_2O$, 0% to 8% of $K_2O$, 0% to 15% of MgO, 5% to 15% of CaO, 5% to 25% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi).

$SiO_2$ is a component that forms a network of the glass and hence is essential. When its content is less than 55%, stability as a glass decreases, or weather resistance decreases. Preferably, its content is 58% or more. More preferably, its content is 60% or more. When the content of $SiO_2$ is more than 80%, viscosity of the glass increases, and meltability decreases significantly. Preferably, its content is 75% or less, typically 70% or less.

$Al_2O_3$ is a component that improves weather resistance and chemical strengthening characteristic of the glass and is essential. When its content is less than 0.25%, the weather resistance decreases. Preferably, its content is 0.3% or more, typically 0.5% or more. When the content of $Al_2O_3$ is more than 5%, viscosity of the glass becomes high and uniform melting becomes difficult. Preferably, its content is 4.5% or less, typically 4% or less.

$B_2O_3$ is a component that improves weather resistance of the glass, and is not essential but can be contained as necessary. When $B_2O_3$ is contained, if its content is less than 4%, it is possible that a significant effect cannot be obtained regarding improvement of the weather resistance. Preferably, its content is 5% or more, typically 6% or more. When $B_2O_3$ is more than 12%, it is possible that striae due to volatilization occur and the yield decreases. Preferably, its content is 11% or less, typically 10% or less.

$Na_2O$ is a component that improves meltability of the glass, and is essential because it causes a surface compressive stress layer to be formed by ion exchange. When its content is less than 5%, the meltability is poor and it is also difficult to form a desired surface compressive stress layer by ion exchange. Preferably, its content is 7% or more, typically 8% or more. When the content of $Na_2O$ is more than 20%, weather resistance decreases. Preferably, its content is 18% or less, typically 16% or less.

$K_2O$ is a component that improves meltability, and has an operation to increase ion exchange speed in chemical strengthening. Thus, this component is not essential but is preferred to be contained. When $K_2O$ is contained, if its content is less than 0.01%, it is possible that a significant effect cannot be obtained regarding improvement of meltability, or that a significant effect cannot be obtained regarding ion exchange speed improvement. Typically, its content is 0.3% or more. When the content of $K_2O$ is more than 8%, weather resistance decreases. Preferably, its content is 7% or less, typically 6% or less.

MgO is a component that improves meltability, and is not essential but can be contained as necessary. When MgO is contained, if its content is less than 3%, it is possible that a significant effect cannot be obtained regarding improvement of meltability. Typically, its content is 4% or more. When the content of MgO is more than 15%, weather resistance decreases. Preferably, its content is 13% or less, typically 12% or less.

CaO is a component that improves meltability and is necessary. When its content is less than 5%, it is possible that a significant effect cannot be obtained regarding improvement of meltability. Typically, its content is 6% or more. When the content of CaO is more than 15%, the chemical strengthening characteristic decreases. Preferably, its content is 14% or less, typically 13% or less.

RO (where R represents Mg, Ca, Sr, Ba, or Zn) is a component that improves meltability and CaO is essential. MgO, SrO, BaO, and ZnO are not essential, but any one or more of them can be contained as necessary. In this case, it is possible that the meltability decreases when the total content ΣRO is less than 5%. Preferably, its content is 6% or more. When ΣRO is more than 25%, weather resistance decreases. Preferably, its content is 20% or less, more preferably 18% or less, typically 16% or less.

$ZrO_2$ is a component that increases ion exchange speed and is not essential, but can be contained as necessary. When $ZrO_2$ is contained, its content is preferably in the range of 5% or less, more preferably in the range of 4% or less, furthermore preferably in the range of 3% or less. When the content of $ZrO_2$ is more than 5%, meltability worsens and there may be cases where it remains as a non-melted matter in the glass. Typically, $ZrO_2$ is not contained.

The coloring component is constituted of at least one metal oxide selected from the group consisting of oxides of Co, Mn, Fe, Ni, Cu, Cr, V, and Bi as described above, and is an essential component. Regarding these coloring components, it will suffice to contain one of them when the total content is 0.1% to 7%, but when each content is less than 0.01%, an effect as a coloring component cannot be obtained sufficiently. Preferably, its content is 0.1% or more, more preferably 0.2% or more. Further, when each content is more than 6%, the glass becomes unstable and devitrification occurs. Preferably, its content is 5% or less, more preferably, 4% or less.

$Fe_2O_3$ is a component for coloring a glass with a deep color and is preferred to be used in the present invention. When $Fe_2O_3$ is contained, if the total iron content represented by $Fe_2O_3$ is less than 1.5%, a desired black glass cannot be obtained. Preferably, its content is 2% or more, more preferably 3% or more. When the content of $Fe_2O_3$ is more than 6%, the glass becomes unstable and devitrification occurs. Preferably, its content is 5% or less, more preferably 4% or less.

It is preferred that, among the total iron, the ratio of divalent iron content (iron redox) converted by $Fe_2O_3$ be 10% to 50%, particularly 15% to 40%. Most preferably, iron redox is 20% to 30%. When the iron redox is less than 10%, decomposition of $SO_3$ does not proceed when it is contained, and it is possible that an expected refining effect cannot be obtained. When iron redox is more than 50%, decomposition of $SO_3$ proceeds too much before refining, and it is possible that the expected refining effect cannot be obtained, or that it becomes a source of bubbles and increases the number of bubbles.

Note that in this specification, the content of the total iron converted into $Fe_2O_3$ represents the content of $Fe_2O_3$. Regarding the iron redox, the ratio of bivalent iron converted into $Fe_2O_3$ among the total iron converted into $Fe_2O_3$ by a Mossbauer spectroscopy can be represented by percentage. Specifically, evaluation is performed with a transmission optical system in which a radiation source ($^{57}Co$), a glass sample (a glass flat plate having a thickness of 3 mm to 7 mm which is cut from the above-described glass block, grinded, and mirror polished), and a detector (45431 made by LND, Inc.) are disposed on a straight line. The radiation source is moved with respect to an axial direction of the optical system, so as to cause an energy change of γ ray by a Doppler effect.

Then, a Mossbauer absorption spectrum obtained at room temperature is used to calculate the ratio of bivalent iron to the total iron and the ratio of trivalent iron to the total iron, and the ratio of bivalent Fe to the total iron is taken as the iron redox.

Further, in the glass for chemical strengthening of this embodiment, the total iron content represented by $Fe_2O_3$ may be 0.005% or more and less than 1.5%. By making the content of $Fe_2O_3$ be less than 1.5%, ion exchange with $Na_2O$ in a glass surface layer and $K_2O$ in a molten salt by the chemical strengthening easily proceeds, and a surface compressive stress layer can be formed down to a sufficient depth. Preferably, its content is 1.2% or less, more preferably 1.0% or less. On the other hand, when the content of $Fe_2O_3$ is less than 0.005%, a desired black glass cannot be obtained. Preferably, its content is 0.01% or more, more preferably 0.012% or more.

$Co_3O_4$ is a coloring component and exhibits a bubble eliminating effect while coexisting with iron, and hence is a component preferred to be used in the present invention. Specifically, $O_2$ bubbles discharged when trivalent iron becomes bivalent iron in a high-temperature state are absorbed when cobalt is oxidized. Consequently the $O_2$ bubbles are reduced, and thus the defoaming effect is obtained.

Moreover, $Co_3O_4$ is a component that further increases the fining operation when being allowed to coexist with $SO_3$. Specifically, for example, when a sodium sulfate ($Na_2SO_4$) is used as a refining agent, defoaming from the glass improves by allowing the reaction $SO_3 \rightarrow SO_2 + \frac{1}{2}O_2$ to proceed, and thus the oxygen partial pressure in the glass is preferred to be low. By co-adding cobalt to a glass containing iron, release of oxygen occurring due to reduction of iron can be suppressed by oxidation of cobalt, and thus decomposition of $SO_3$ is accelerated. Thus, it is possible to produce a glass with a small bubble defect.

Further, in a glass containing a relatively large amount of alkali metal for chemical strengthening, basicity of the glass increases, $SO_3$ does not decompose easily, and the refining effect decreases. In this manner, in one containing iron in the glass for chemical strengthening in which $SO_3$ does not decompose easily, addition of cobalt accelerates decomposition of $SO_3$, and hence is effective in particular for acceleration of a defoaming effect. In order for such a refining operation to occur, the content of $Co_3O_4$ is 0.1% or more, preferably 0.2% or more, typically 0.3% or more. When its content is more than 1%, the glass becomes unstable and devitrification occurs. Preferably, its content is 0.8% or less, more preferably 0.6% or less.

When the mole ratio of the content of $Co_3O_4$ and the content of $Fe_2O_3$, that is, the content ratio of $Co_3O_4/Fe_2O_3$ is less than 0.01, it is possible that the above-described defoaming effect cannot be obtained. Preferably, the content ratio of $Co_3O_4/Fe_2O_3$ is 0.05 or more, typically 0.1 or more. When the content ratio of $Co_3O_4/Fe_2O_3$ is more than 0.5, it inversely becomes a source of bubbles, and it is possible that melting down of the glass becomes slow or the number of bubbles increases. Thus, a countermeasure such as using a separate refining agent, or the like needs to be taken. Preferably, the content ratio of $Co_3O_4/Fe_2O_3$ is 0.3 or less, more preferably 0.2 or less.

NiO is a coloring component for coloring a glass with a desired black color, and is a component which is preferred to be used in the present invention. When NiO is contained, the effect as a coloring component cannot be obtained sufficiently if its content is less than 0.05%. Preferably, its content is 0.1% or more, more preferably 0.2% or more. When the content of NiO is more than 6%, brightness of the color tone of the glass becomes excessively high, and a desired black color tone cannot be obtained. Further, the glass becomes unstable and devitrification occurs. Preferably, its content is 5% or less, more preferably 4% or less.

Further, in the glass for chemical strengthening of this embodiment, the content of NiO may be less than 0.05%. When the content of NiO is 0.05% or more, it is possible that generation of foreign matters such as the NiS which causes glass breakage after chemical strengthening is not suppressed. Preferably, its content is 0.03% or less, more preferably 0.02% or less.

CuO is a coloring component and is not essential but can be contained as necessary. Further, CuO is a component exhibiting an effect to lower metamerism (metameric stimuli) when it is contained in a glass and is not essential but can be contained as necessary.

The metamerism is an index indicating the degree of a change of a color tone or an outer color due to color of outside light and can be defined by using the L*a*b* color system standardized by CIE (Commission Internationale de l'Eclairage). The lower the metamerism, the smaller the degree of the change of the color tone or the outer color due to the color of the outside light. For example, when the metamerism of the glass is high, the color tone becomes greatly different due to an external light source, and the color tone of the glass indoors and the color tone of the glass outdoors differ greatly.

By containing CuO, in the glass for chemical strengthening of the present invention, it is possible to easily obtain one in which an absolute value of Δa* defined by the following expression (I) and an absolute value of Δb* defined by the following expression (II) are both 2 or less. This can reduce the difference between a reflected color tone of the glass indoors and a reflected color tone of the glass outdoors.

(i) a difference Δa* between chromaticity a* of reflected light by a D65 light source and chromaticity a* of reflected light by an F2 light source in an L*a*b* color system $$\Delta a^* = a^* \text{ value } (D65 \text{ light source}) - a^* \text{ value } (F2 \text{ light source})$$ (I)

(ii) a difference Δb* between chromaticity b* of reflected light by a D65 light source and chromaticity b* of reflected light by an F2 light source in an L*a*b* color system $$\Delta b^* = b^* \text{ value } (D65 \text{ light source}) - b^* \text{ value } (F2 \text{ light source})$$ (II)

When CuO is contained, if its content is less than 0.05%, it is possible that a significant effect cannot be obtained regarding adjustment of color tone or suppression of metamerism. Preferably, its content is 0.2% or more, typically, 0.5% or more. When the content of CuO is more than 3%, it is possible that the glass becomes unstable and devitrification occurs. Preferably, its content is 2.5% or less, typically 2% or less.

Note that regarding $Fe_2O_3$, when it is contained in the glass, there is an effect to reduce the metamerism (metameric stimuli) similarly to CuO. The content of $Fe_2O_3$ by which the significant effect regarding the metamerism can be obtained is preferably 0.05% to 2%, typically 0.3% to 1.5%.

MnO, $MnO_2$, $Cu_2O$, $Cr_2O_3$, $V_2O_5$, and $Bi_2O_3$ are coloring components and are not essential, but at least one of these coloring components can be contained as necessary. When these coloring components are contained, the effect as a coloring component cannot be obtained sufficiently if each content is less than 0.01%. Preferably, its content is 0.1% or more, more preferably 0.2% or more. Further, when each content is more than 6%, the glass becomes unstable and devitrification occurs. Preferably, its content is 5% or less, more preferably, 4% or less.

A content ratio $(SiO_2+Al_2O_3+B_2O_3)/(\Sigma R'_2O+CaO+SrO+BaO+Fe_2O_3+Co_3O_4)$ represents the ratio of the total content of reticulate oxides forming the network of the glass and the total content of a main modified oxide. Note that ER'20 represents the sum of all $R'_2O$ components, that is, "$Na_2O+K_2O+Li_2O$". When this ratio is less than 3, it is possible that the probability of breakage when an indentation is made after the chemical strengthening becomes large. Preferably, the content ratio is 3.6 or more, typically 4 or more. When this ratio is more than 6, viscosity of the glass increases, and meltability of the glass decreases. Preferably, the content ratio is 5.5 or less, more preferably 5 or less.

$SO_3$ is a component that operates as a refining agent, and is not essential but can be contained as necessary. When $SO_3$ is contained, an expected refining operation cannot be obtained if its content is less than 0.005%. Preferably, its content is 0.01% or more, more preferably 0.02% or more. Most preferably, its content is 0.03% or more. Further, when its content is more than 0.5%, it inversely becomes a source of bubbles, and it is possible that melting down of the glass becomes slow or the number of bubbles increases. Preferably, its content is 0.3% or less, more preferably 0.2% or less. Most preferably, its content is 0.1% or less.

$SnO_2$ is a component that operates as a refining agent, and is not essential but can be contained as necessary. When $SnO_2$ is contained, an expected refining operation cannot be obtained if its content is less than 0.005%. Preferably, its content is 0.01% or more, more preferably 0.05% or more. Further, when its content is more than 1%, it inversely becomes a source of bubbles, and it is possible that melting down of the glass becomes slow or the number of bubbles increases. Preferably, its content is 0.8% or less, more preferably 0.5% or less. Most preferably, its content is 0.3% or less.

$TiO_2$ is a component that improves weather resistance, is a color correcting component adjusting the color tone of the glass, and is not essential but can be contained as necessary. When $TiO_2$ is contained, it is possible that a significant effect cannot be obtained regarding improvement of weather resistance if its content is less than 0.005%. It is also possible that the color correcting effect cannot be obtained sufficiently, and that exhibition of, for example, bluish black or brownish black color tone in a black base color glass cannot be prevented sufficiently. Preferably, its content is 0.01% or more, typically 0.1% or more. When the content of $TiO_2$ is more than 1%, it is possible that the glass becomes unstable and devitrification occurs. Preferably, its content is 0.8% or less, typically 0.6% or less.

$Li_2O$ is a component for improving meltability, and is not essential but can be contained as necessary. When $Li_2O$ is contained, it is possible that a significant effect cannot be obtained regarding improvement of meltability if its content is less than 1%. Preferably, its content is 3% or more, typically 6% or more. When the content of $Li_2O$ is more than 15%, it is possible that weather resistance decreases. Preferably, its content is 10% or less, typically 5% or less.

SrO is a component for improving meltability, and is not essential but can be contained as necessary. When SrO is contained, it is possible that a significant effect cannot be obtained regarding improvement of meltability if its content is less than 1%. Preferably, its content is 3% or more, typically 6% or more. When the content of SrO is more than 15%, it is possible that weather resistance and chemical strengthening characteristic decrease. Preferably, its content is 12% or less, typically 9% or less.

BaO is a component for improving meltability, and is not essential but can be contained as necessary. When BaO is contained, it is possible that a significant effect cannot be obtained regarding improvement of meltability if its content is less than 1%. Preferably, its content is 3% or more, typically 6% or more. When the content of BaO is more than 15%, it is possible that weather resistance and chemical strengthening characteristic decrease. Preferably, its content is 12% or less, typically 9% or less.

ZnO is a component for improving meltability, and is not essential but can be contained as necessary. When ZnO is contained, it is possible that a significant effect cannot be obtained regarding improvement of meltability if its content is less than 1%. Preferably, its content is 3% or more, typically 6% or more. When the content of ZnO is more than 15%, it is possible that weather resistance decreases. Preferably, its content is 12% or less, typically 9% or less.

$CeO_2$, $Er_2O_3$, $Nd_2O_3$, $SeO_2$ are color correcting components for adjusting the color tone of the glass and are not essential, but at least one of these color correcting components can be contained as necessary.

When these color correcting components are contained, if each content is less than 0.01% the effect to reduce a difference in absorption characteristic of light within the wavelength range of a visible range for correcting to a desired black color cannot be obtained sufficiently, and it is possible that exhibition of, for example, bluish black or brownish black color tone cannot be prevented sufficiently. Each content of these color correcting components is preferably 0.05% or more, typically 0.1% or more. When each content of the color correcting components is more than 2%, it is possible that the glass becomes unstable and devitrification occurs.

Note that the type and amount of the above-described color correcting components can be appropriately selected and used depending on the composition of the parent component of each glass.

As the above-described color correcting components, it is preferred that the total content of $TiO_2$, $CeO_2$, $Er_2O_3$, $Nd_2O_3$, and $SeO_2$ be 0.005% to 2%. By making the total content of $TiO_2$, $CeO_2$, $Er_2O_3$, $Nd_2O_3$, and $SeO_2$ be 0.005% or more, a difference in absorption characteristic of light within the wavelength range of a visible range can be reduced, and a glass having a color tone of what is called jet black which does not exhibit brown or blue color can be obtained. Further, by making the above-described content of color correcting components be 2% or less, it is possible to suppress the glass from becoming unstable which causes devitrification. The above-described total content of color correcting components is more preferably 0.01% to 1.8%, furthermore preferably 0.05% to 1.5%.

In both the first embodiment and the second embodiment of the present invention, the coloring component of the glass is essentially iron, but as described above, at least one metal oxide selected from the group consisting of oxides of Mn, Ni, Cu, Cr, V, and Bi may be contained within the range not impairing the object of the present invention. When such a component is contained, the total content of these components is preferably 5% or less, typically 4% or less.

In both the first embodiment and the second embodiment of the present invention, Co is a coloring component and is also a refining agent. As the refining agent of the glass, $SO_3$ or $SnO_2$ may be used as necessary, but $Sb_2O_3$, Cl, F, and another component may be contained within the range not impairing the object of the present invention. When such a component is contained, it is preferred that the total content of these components is 1% or less, typically 0.5% or less. Note that $As_2O_3$ is an environment-affecting substance with which inverse effects to the environment are concerned not only in manufacturing processes but through the lifecycle of the product, and hence is not contained.

In the glass for chemical strengthening of the present invention, when an indentation is formed by using a Vickers indenter in a mirror-finished surface of a glass plate having a thickness of 1 mm made of the glass for chemical strengthening, the push-in load of the Vickers indenter that causes an occurrence rate of crack to be 50% is preferred to be 150 gf or more. Note that the load of the Vickers indenter that causes the crack occurrence rate of 50% when an indentation is formed by using the Vickers indenter in a mirror-finished surface of the glass plate having a thickness of 1 mm is called a CIL value. The CIL value is preferably 175 gf or more, more preferably 200 gf or more, furthermore preferably 300 gf or more. When the CIL value is less than 150 gf, a scratch can be easily made during a manufacturing process before chemical strengthening or while shipping, or even when chemical strengthening is performed, desired strength may not be obtained.

Note that the method for chemically strengthening the glass for chemical strengthening is not particularly limited as long as it is able to exchange ions between $Na_2O$ of the glass surface and $K_2O$ in a molten salt, but typically a method which will be described later can be applied.

In the glass for chemical strengthening of the present invention, preferably, an absolute value of $\Delta a^*$ defined by the following expression (I) and an absolute value of $\Delta b^*$ defined by the following expression (II) are both 2 or less. This can reduce the metamerism (metameric stimuli) and decrease the difference between a reflected color tone of the glass indoors and a reflected color tone of the glass outdoors.

(i) a difference $\Delta a^*$ between chromaticity a* of reflected light by a D65 light source and chromaticity a* of reflected light by an F2 light source in an L*a*b* color system $$\Delta a^* = a^* \text{ value } (D65 \text{ light source}) - a^* \text{ value } (F2 \text{ light source}) \quad (I)$$

(ii) a difference $\Delta b^*$ between chromaticity b* of reflected light by a D65 light source and chromaticity b* of reflected light by an F2 light source in an L*a*b* color system $$\Delta b^* = b^* \text{ value } (D65 \text{ light source}) - b^* \text{ value } (F2 \text{ light source}) \quad (II)$$

The metamerism is an index indicating the degree of a change of a color tone or an outer color due to color of outside light and can be defined by using the L*a*b* color system standardized by CIE (Commission Internationale de l'Éclairage). The lower the metamerism, the smaller the degree of the change of the color tone or the outer color due to the color of the outside light. For example, when the metamerism of the glass is high, the color tone becomes greatly different due to an external light source, and the color tone of the glass indoors and the color tone of the glass outdoors differ greatly.

In order to reduce the metamerism, $\Delta a^*$ and $\Delta b^*$ in the glass for chemical strengthening are preferably both 1.5 or less in absolute value, more preferably both 1.2 or less in absolute value.

Further, in the glass for chemical strengthening of the present invention, the minimum value of the absorption coefficient at wavelengths of 380 nm to 780 nm is preferred to be 1 $mm^{-1}$ or more. The light source of a display device provided inside an electronic device is constituted of one emitting white light such as a light emitting diode, an organic EL, or CCFL. Thus, when the glass for chemical strengthening of the present invention is used as the housing of an electronic device, it is necessary to make the minimum value of the absorption coefficient at wavelengths of 380 nm to 780 nm be 1 $mm^{-1}$ or more so that the white light does not leak to the outside of the device via the glass. The white light is to be recognized as white color by combining light of plural wavelengths in the visible range using a fluorescent material. Accordingly, by making the minimum value of the absorption coefficient at the wavelengths of a visible range of the glass be 1 $mm^{-1}$ or more, the white light is absorbed solely by the glass without separately providing light blocking means, and thus a sufficient light blocking effect as a glass is obtained.

When the minimum value of the absorption coefficient at wavelengths of 380 nm to 780 nm of the glass is less than 1 $mm^{-1}$, even when it is a glass having a sufficient thickness for housing purposes, a desired light blocking effect cannot be obtained, and it is possible that light transmits the glass. Further, when the glass is formed in a concave shape or convex shape, light may transmit a position where the thickness is smallest. When the thickness of the glass is small, the minimum value of the absorption coefficient at wavelengths of 380 nm to 780 nm of the glass is preferred to be 2 $mm^{-1}$ or more, more preferably 3 $mm^{-1}$ or more, furthermore preferably 4 $min^{-1}$ or more.

The method for calculating the absorption coefficient in the present invention is as follows. Both surfaces of a glass plate are mirror polished, and a thickness t is measured. Spectral transmittance T of this glass plate is measured (for example, an ultraviolet-visible-near-infrared spectrophotometer V-570 made by JASCO Corporation is used). Then an absorption coefficient β is calculated using the relational expression $T=10^{-\beta t}$.

Further, in the glass for chemical strengthening of the present invention, a relative value of an absorption coefficient at a wavelength of 550 nm to an absorption coefficient at a wavelength of 600 nm (hereinafter, this relative value of the absorption coefficients may also be described as "the absorption coefficient at a wavelength of 550 nm/the absorption coefficient at a wavelength of 600 nm") calculated from a spectral transmittance curve and a relative value of an absorption coefficient at a wavelength of 450 nm to an absorption coefficient at a wavelength of 600 nm (hereinafter, this relative value of the absorption coefficients may also be described as "the absorption coefficient at a wavelength of 450 nm/the absorption coefficient at a wavelength of 600 nm") calculated from a spectral transmittance curve are both preferred to be within a range of 0.7 to 1.2. As described above, by selecting the predetermined ones as coloring components for the glass, a glass exhibiting a black color can be obtained. However, depending on the types and blending amounts of coloring components, although it is black, it may become brownish or bluish for example. To represent a black color which does not appear to be another color, namely, a jet black on a glass, a glass in which a variation in absorption coefficient in the wavelength of visible light is small, that is, a glass which averagely absorbs light in the visible range is preferred.

Thus, the range of the relative values of absorption coefficients is preferred to be within the range of 0.7 to 1.2. When this range is smaller than 0.7, it is possible that the glass becomes bluish black. On the other hand, when this range is larger than 1.2, it is possible that the glass becomes brownish or greenish black.

Note that regarding the relative values of the absorption coefficients, when the absorption coefficient at a wavelength of 450 nm/the absorption coefficient at a wavelength of 600 nm and the absorption coefficient at a wavelength of 550 nm/the absorption coefficient at a wavelength of 600 nm both fall within the above-described range, this means that a black glass which does not appear to be another color can be obtained.

Further, in the glass for chemical strengthening of the present invention, preferably, variation amounts ΔT (550/600) and ΔT (450/600) of relative values of absorption coefficients expressed by following expressions (1) and (2) are 5% or less in absolute value.

$$\Delta T(550/600)(\%)=[\{A(550/600)-B(550/600)\}/A(550/600)]\times 100 \quad (1)$$

$$\Delta T(450/600)(\%)=[\{A(450/600)-B(450/600)\}/A(450/600)]\times 100 \quad (2)$$

In the above expression (1), A(550/600) is a relative value of an absorption coefficient at a wavelength of 550 nm to an absorption coefficient at a wavelength of 600 nm, as calculated from a spectral transmittance curve of the glass after being irradiated with light of a 400 W high-pressure mercury lamp for 100 hours, and B(550/600) is a relative value of an absorption coefficient at a wavelength of 550 nm to an absorption coefficient at a wavelength of 600 nm, as calculated from a spectral transmittance curve of the glass before the light irradiation.

In the above expression (2), A(450/600) is a relative value of an absorption coefficient at a wavelength of 450 nm to an absorption coefficient at a wavelength of 600 nm, as calculated from a spectral transmittance curve of the glass after irradiation with light of a 400 W high-pressure mercury lamp for 100 hours, and B(450/600) is a relative value of an absorption coefficient at a wavelength of 450 nm to an absorption coefficient at a wavelength of 600 nm calculated from a spectral transmittance curve of the glass before the light irradiation.

Note that "B(550/600)" in the above expression (1) and "the absorption coefficient at a wavelength of 550 nm/the absorption coefficient at a wavelength of 600 nm" have the same meaning, and the "B(450/600)" in the above expression (2) and "the absorption coefficient at a wavelength of 450 nm/the absorption coefficient at a wavelength of 600 nm" have the same meaning.

By the variation amounts ΔT (550/600) and ΔT (450/600) of the relative values of the absorption coefficients ("the absorption coefficient at a wavelength of 550 nm/the absorption coefficient at a wavelength of 600 nm" and "the absorption coefficient at a wavelength of 450 nm/the absorption coefficient at a wavelength of 600 nm") expressed by the above-described expression (1) and expression (2) being both within the above-described range, variation in absorption characteristic with respect to light at a wavelength of the visible range before and after irradiation of light can be suppressed, and it can be made as a glass in which variation in color tone is suppressed for a long period.

Specifically, for example, in the above expression (1), A(550/600) is a relative value of an absorption coefficient at a wavelength of 550 nm to an absorption coefficient at a wavelength of 600 nm, as calculated from a spectral transmittance curve of the glass after being irradiated with light of a 400 W high pressure mercury lamp for 100 hours from a separation distance of 15 cm to a polished surface of a glass having a thickness of 0.8 mm, which is optically mirror polished on both surfaces, and B(550/600) is a relative value of an absorption coefficient at a wavelength of 550 nm to an absorption coefficient at a wavelength of 600 nm, as calculated from a spectral transmittance curve of the glass before the light irradiation.

In the above expression (2), A(450/600) is a relative value of an absorption coefficient at a wavelength of 450 nm to an absorption coefficient at a wavelength of 600 nm, as calculated from a spectral transmittance curve of the glass after irradiation with light of a 400 W high-pressure mercury lamp for 100 hours from a separation distance of 15 cm to a polished surface of a glass having a thickness of 0.8 mm, which is optically mirror polished on both surfaces, and B(450/600) is a relative value of an absorption coefficient at a wavelength of 450 nm to an absorption coefficient at a wavelength of 600 nm, as calculated from a spectral transmittance curve of the glass before the light irradiation.

Further, in the glass for chemical strengthening of the present invention, a minimum value of absorbance at wavelengths of 380 nm to 780 nm is preferred to be 0.7 or more. The light source of a display device provided inside an electronic device is constituted of one emitting white light such as a light emitting diode, an organic EL, or CCFL. Thus, when the glass for chemical strengthening of the present invention is used as the housing of an electronic device, it is necessary to make the minimum value of absorbance at wavelengths of 380 nm to 780 nm be 0.7 or more so that the white light does not leak to the outside of the device via the glass. The white light is to be recognized as white color by combining light of plural wavelengths in the visible range using a fluorescent material. Accordingly, by making the absorbance at the wavelengths of a visible range of the glass be 0.7 or more, the white light is absorbed solely by the glass without separately providing light blocking means, and thus a sufficient light blocking effect as a glass is obtained.

When the minimum value of the absorbance at wavelengths of 380 nm to 780 nm of the glass is less than 0.7, even when it is a glass having a sufficient thickness for housing purposes, a desired light blocking effect cannot be obtained, and it is possible that light transmits the glass. Further, when the glass is formed in a concave shape or convex shape, light may transmit a position where the thickness is smallest. The minimum value of the absorbance at wavelengths of 380 nm to 780 nm of the glass is preferred to be 0.9 or more, more preferably 1.2 or more, furthermore preferably 1.5 or more.

The method for calculating the absorbance in the present invention is as follows. Both surfaces of a glass plate are mirror polished, and a thickness t is measured. Spectral transmittance T of this glass plate is measured (for example, an ultraviolet-visible-near-infrared spectrophotometer V-570 made by JASCO Corporation is used). Then absorbance A is calculated using the relational expression $A = -\log_{10} T$.

Further, the glass for chemical strengthening of the present invention is preferred to have radio wave transparency. For example, in the case where the glass for chemical strengthening is applied as the housing of a portable phone or the like which includes a communication element in the device and performs transmission or reception of information using radio waves, when this glass for chemical strengthening has radio wave transparency, decrease in communication sensitivity due to the presence of the glass is suppressed. Regarding the radio wave transparency in the glass for chemical strengthening of the present invention, the maximum value of a dielectric loss tangent (tan δ) in the frequency range of 50 MHz to 3.0 GHz is preferred to be 0.02 or less. Preferably, the maximum value of tan δ is 0.015 or less, more preferably 0.01 or less.

The manufacturing method of the glass for chemical strengthening of the present invention is not particularly limited. For example, appropriate amounts of various materials are blended, heated to about 1500° C. to about 1600° C. and melted, thereafter made uniform by defoaming, stirring, or the like, and formed in a plate shape or the like by a known down-draw method, press method, or the like, or casted and formed in a block shape. Then, by cutting into a desired size after slow cooling, and polishing as necessary, the glass for chemical strengthening containing, in mole percentage based on following oxides, 55% to 80% of $SiO_2$, 0.25% to 16% of $Al_2O_3$, 0% to 12% of $B_2O_3$, 5% to 20% of $Na_2O$, 0% to 15% of $K_2O$, 0% to 15% of MgO, 0% to 15% of CaO, 0% to 25% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi) is manufactured.

The manufacturing method of the glass for chemical strengthening of the present invention allows manufacturing the glasses for chemical strengthening according to the above-described embodiments.

Specifically, for example, by the manufacturing method of the glass for chemical strengthening of the present invention, the glass for chemical strengthening according to the above-described first embodiment, that is, the glass for chemical strengthening containing, in mole percentage based on following oxides, 55% to 80% of $SiO_2$, 3% to 16% of $Al_2O_3$, 0% to 12% of $B_2O_3$, 5% to 20% of $Na_2O$, 0% to 15% of $K_2O$, 0% to 15% of MgO, 0% to 3% of CaO, 0% to 18% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi), can be manufactured. Further, by the manufacturing method of the glass for chemical strengthening of the present invention, the glass for chemical strengthening according to the above-described second embodiment, that is, the glass for chemical strengthening containing, in mole percentage based on following oxides, 55% to 80% of $SiO_2$, 0.25% to 5% of $Al_2O_3$, 0% to 12% of $B_2O_3$, 5% to 20% of $Na_2O$, 0% to 8% of $K_2O$, 0% to 15% of MgO, 5% to 15% of CaO, 5% to 25% of ΣRO (where R represents Mg, Ca, Sr, Ba, or Zn), and 0.1% to 7% of a coloring component (at least one metal oxide selected from the group consisting of oxides of Co, Mn, Fe, Ni, Cu, Cr, V, and Bi), can be manufactured.

The method for chemical strengthening is not particularly limited as long as it is able to exchange ions between $Na_2O$ of the glass surface layer and $K_2O$ in a molten salt. For example, there is a method to immerse a glass in a heated potassium nitrate ($KNO_3$) molten salt. The condition for forming a chemically strengthened layer (surface compressive stress layer) having a desired surface compressive stress on the glass surface is, typically, immersing a glass in a $KNO_3$ molten salt at 400° C. to 550° C. for 2 to 20 hours, although it differs depending on the thickness of the glass. Further, this $KNO_3$ molten salt may be one containing, for example, about 5% or less $NaNO_3$ besides the $KNO_3$.

The glass for chemical strengthening of the present invention is formed in a desired shape by the above-described manufacturing method. Further, to the glass for chemical strengthening of the present invention, for example after it is formed in the desired shape, the above-described method of chemical strengthening can be applied to produce a chemical strengthened glass. At this time, a depth of the surface compressive stress layer formed by the chemical strengthening is 5 μm to 70 μm.

That is, a chemical strengthened glass of the present invention is obtained by chemically strengthening the glass for chemical strengthening according to the above-described embodiments by the above-described method of chemical strengthening.

In the chemical strengthened glass of the present invention, a depth of the surface compressive stress layer formed in a surface of the chemical strengthened glass by the chemical strengthening is 5 μm to 70 μm. The depth of such a surface compressive stress layer is more preferably 6 μm to 70 μm. The reason of this is as follows.

In manufacturing of glasses used for decorative purposes, the surface of a glass may be polished, and the diameter of abrasive grain used for polishing in the final stage thereof is typically 2 μm to 6 μm. By such abrasive grain, in the glass surface, it is conceivable that a micro-crack of 5 μm at most is finally formed. To make the strength improving effect by chemical strengthening be effective, it is necessary that a surface compressive stress layer deeper than the micro-crack formed in the glass surface is formed. Accordingly, the depth of the surface compressive stress layer formed due to chemical strengthening is preferably 6 μm or more. Further, a scratch beyond the depth of the surface compressive stress layer being made when in use leads to breakage of the glass, and thus the surface compressive stress layer is preferred to be thick. Accordingly, the depth of the surface compressive stress layer is more preferably 10 μm or more, furthermore preferably 20 μm or more, typically 30 μm or more.

On a soda lime glass, by chemical strengthening by applying the above-described chemical strengthening method, the surface compressive stress of the surface compressive stress layer formed on the glass surface can be 300 MPa or more, but it is not easy to form the depth of the surface compressive stress layer to be 30 μm or more. The glass for chemical strengthening according to the first embodiment of the present invention allows to form the surface compressive stress layer having a depth of 30 μm or more by chemical strengthening.

On the other hand, when the surface compressive stress layer is too deep, the internal tensile stress becomes large, and the impact at the time of breakage becomes large. Specifically, when the internal tensile stress is large, it is known that the glass tends to be small pieces and scatters when it breaks, making it more hazardous. As a result of experiment by the present inventors, it was found that in a glass having a thickness of 2 mm or less, when the depth of the surface compressive stress layer is more than 70 μm, scattering at the time of breakage becomes significant. Therefore, in the glass for chemical strengthening of the present invention, the depth of the surface compressive stress layer is 70 μm or less. When it is used as a glass for decoration, although depending on its purpose, for example, when it is applied to a purpose such as a portable device having a high probability of receiving a contact scratch on its surface, it is conceivable to make the depth of the surface compressive stress layer thin in view of safety, as compared to an operating panel of a mounting type apparatus such as audiovisual apparatus or office automation apparatus. In this case, the depth of the surface compressive stress layer is more preferably 60 μm or less, furthermore preferably 50 μm or less, typically 40 μm or less.

Further, the glass for chemical strengthening of the present invention allows obtaining a chemical strengthened glass by performing chemical strengthening as described above. In the chemical strengthened glass of the present invention obtained in this manner, the surface compressive stress of the surface compressive stress layer formed on the glass surface is 300 MPa or more, more preferably 550 MPa or more, furthermore preferably 700 MPa or more. Further, the surface compressive stress of the surface compressive stress layer is preferably 1400 MPa or less, more preferably 1300 MPa or less. It is typically 1200 MPa or less.

The glass for chemical strengthening of the present invention allows forming the surface compressive stress layer having surface compressive stress of 300 MPa or more on the glass surface by performing chemical strengthening.

The chemical strengthened glass of the present invention is a glass obtained by chemical strengthening in which, preferably, an absolute value of $\Delta a^*$ defined by the following expression (I) and an absolute value of $\Delta b^*$ defined by the following expression (II) are both 2 or less. This can reduce the metamerism (metameric stimuli) and decrease the difference between a reflected color tone of the glass indoors and a reflected color tone of the glass outdoors.

(i) a difference $\Delta a^*$ between chromaticity $a^*$ of reflected light by a D65 light source and chromaticity $a^*$ of reflected light by an F2 light source in an $L^*a^*b^*$ color system $$\Delta a^* = a^* \text{ value (D65 light source)} - a^* \text{ value (F2 light source)} \quad (I)$$

(ii) a difference $\Delta b^*$ between chromaticity $b^*$ of reflected light by a D65 light source and chromaticity $b^*$ of reflected light by an F2 light source in an $L^*a^*b^*$ color system $$\Delta b^* = b^* \text{ value (D65 light source)} - b^* \text{ value (F2 light source)} \quad (II)$$

In order to reduce the metamerism, $\Delta a^*$ and $\Delta b^*$ in the chemical strengthened glass are preferably both 1.5 or less in absolute value, more preferably both 1.2 or less in absolute value.

In the foregoing, the examples of the glass for chemical strengthening of the present invention have been described, but the formation can be appropriately changed as necessary within a limit that does not go against the spirit of the present invention.

EXAMPLES

Hereinafter, the present invention will be described in detail based on examples, but the invention is not limited to these examples.

Regarding Examples 1 to 138 of Table 1 to Table 17 (Examples 1 to 88 and Examples 91 to 138 being working examples, and Example 89 and Example 90 being comparative examples), generally used glass materials such as oxides, hydroxides, carbonates, nitrate salts, and the like were selected appropriately and measured to be 100 ml as a glass so that they were in compositions expressed in mole percentage in the tables. Note that $SO_3$ described in the tables is residual $SO_3$ remaining in the glass after sodium sulfate ($Na_2SO_4$) is added to the glass materials and after the sodium sulfate is decomposed, and is a calculated value.

Next, this material mixture was put into a melting pot made of platinum, placed in a resistance-heating electric furnace at 1500° C. to 1600° C., and after heated for about 0.5 hour and the materials were melted down, it was melted for one hour to defoam.

Thereafter, it was poured into a mold material preheated to approximately 630° C., which is about 50 mm length, about 100 mm width, and about 20 mm high, and slowly cooled at the rate of about 1° C./min, thereby obtaining a glass block. This glass block was cut, and after the glass was cut out so that it has a size of 40 mm×40 mm and a thickness as shown in Tables 1 to 17, it was grinded and finally mirror polished on both surfaces, thereby obtaining a plate-shaped glass.

For the plate-shaped glass obtained, the minimum value of the absorption coefficient at wavelengths of 380 nm to 780 nm, relative values of absorption coefficients (an absorption coefficient at a wavelength of 550 nm/an absorption coefficient at a wavelength of 600 nm and an absorption coefficient at a wavelength of 450 nm/an absorption coefficient at a wavelength of 600 nm), a minimum value of absorbance at wavelengths of 380 nm to 780 nm, glass thickness t, and CIL value are described together in Tables 1 to 17. In Tables 1 to 17, "@550 nm/@600 nm" represents "the absorption coefficient at a wavelength of 550 nm/the absorption coefficient at a wavelength of 600 nm", and "@450 nm/@600 nm" represents "the absorption coefficient at a wavelength of 450 nm/the absorption coefficient at a wavelength of 600 nm".
Note that "-" in Tables 1 to 17 represents that it is not measured. Further, in Tables 1 to 17, regarding ones having a thickness of a glass described by "-", the cutting, grinding, and mirror polishing of the above-described glass block were performed so that the thickness after the mirror polishing becomes 0.8 mm.

TABLE 1

| [mol %] | Example 1 | Example 2 | Example 3 | Example 4 | Example 5 | Example 6 | Example 7 | Example 8 | Example 9 |
|---|---|---|---|---|---|---|---|---|---|
| $SiO_2$ | 61.8 | 61.8 | 61.8 | 70.1 | 69.1 | 66.0 | 61.8 | 61.6 | 61.9 |
| $B_2O_3$ | 0 | 0 | 0 | 0 | 0 | 0 | 6.7 | 9.2 | 0 |
| $Na_2O$ | 12.0 | 12.0 | 12.0 | 13.4 | 11.5 | 11.4 | 13.8 | 13.1 | 11.5 |
| $K_2O$ | 3.9 | 3.9 | 3.9 | 0 | 0 | 2.2 | 0.5 | 0.01 | 3.8 |
| MgO | 10.1 | 5.3 | 7.7 | 5.8 | 9.6 | 5.3 | 0.02 | 0.01 | 10.5 |
| CaO | 0 | 0 | 0 | 0 | 0 | 0.3 | 0.07 | 0.02 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.7 | 12.5 | 10.1 | 6.7 | 5.8 | 10.2 | 13.4 | 12.1 | 5.8 |
| $TiO_2$ | 0 | 0 | 0 | 0 | 0 | 0.6 | 0 | 0 | 0 |
| $ZrO_2$ | 0.5 | 0.5 | 0.5 | 0 | 0 | 0 | 0 | 0 | 2.4 |
| $CeO_2$ | 0 | 0 | 0 | 0 | 0 | 0 | 0 | 0 | 0 |
| $Co_3O_4$ | 0.38 | 0.38 | 0.38 | 0.38 | 0.38 | 0.38 | 0.38 | 0.38 | 0.38 |
| $Fe_2O_3$ | 3.2 | 3.2 | 3.2 | 3.2 | 3.2 | 3.2 | 3.2 | 3.2 | 3.2 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.38 | 0.38 | 0.38 | 0.37 | 0.37 | 0.38 | 0.37 | 0.37 | 0.37 |
| NiO | 0 | 0 | 0 | 0 | 0 | 0 | 0 | 0 | 0 |
| $MnO_2$ | 0 | 0 | 0 | 0 | 0 | 0 | 0 | 0 | 0 |
| CuO | 0 | 0 | 0 | 0 | 0 | 0 | 0 | 0 | 0 |
| $Co_3O_4/Fe_2O_3$ | 0.12 | 0.12 | 0.12 | 0.12 | 0.12 | 0.12 | 0.12 | 0.12 | 0.12 |
| $(SiO_2 + Al_2O_3 + B_2O_3)/(\Sigma R'_2O + CaO + SrO + BaO + Co_3O_4 + Fe_2O_3)$ | 3.57 | 3.81 | 3.69 | 4.52 | 4.97 | 4.36 | 4.56 | 4.96 | 3.59 |
| Absorption coefficient $[mm^{-1}]$ (Minimum value at wavelengths of 380 nm to 780 nm) | 1.120 | 4.870 | 1.280 | 1.260 | 1.490 | 3.050 | 4.920 | 4.920 | 1.140 |
| Relative value of absorption coefficient (@550 nm/@600 nm) | 0.76 | 0.97 | 0.81 | 0.78 | 0.82 | 1.02 | 1.00 | 1.00 | 3.07 |
| Relative value of absorption coefficient (@450 nm/@600 nm) | 0.73 | 0.99 | 0.88 | 0.64 | 0.80 | 1.07 | 1.01 | 0.99 | 3.07 |
| Plate thickness (mm) | 0.7 | 0.7 | 0.7 | 0.7 | 0.7 | 0.7 | 0.7 | 0.7 | 0.7 |
| Absorbance (Minimum value at wavelengths of 380 nm to 780 nm) | 0.78 | 3.41 | 0.90 | 0.88 | 1.04 | 2.14 | 3.44 | 3.44 | 0.80 |
| CIL value (gf) | 320 | 193 | 290 | 406 | 700 | 524 | 277 | 1000< | 92 |
| Potassium ion dispersion depth (μm) | 35 | 43 | 45 | 27 | 19 | 32 | 44 | 31 | 30 |

TABLE 2

| [mol %] | Example 10 | Example 11 | Example 12 | Example 13 | Example 14 | Example 15 | Example 16 | Example 17 | Example 18 |
|---|---|---|---|---|---|---|---|---|---|
| $SiO_2$ | 62.1 | 62.1 | 66.2 | 70.3 | 63.9 | 63.9 | 68.2 | 72.4 | 63.1 |
| $B_2O_3$ | 0 | 0 | 0 | 0 | 0 | 0 | 0 | 0 | 0 |
| $Na_2O$ | 12.1 | 11.6 | 11.5 | 13.5 | 12.4 | 11.9 | 11.8 | 13.9 | 12.3 |
| $K_2O$ | 3.8 | 3.8 | 2.2 | 0 | 4.0 | 4.0 | 2.3 | 0 | 3.9 |
| MgO | 10.1 | 10.6 | 5.3 | 5.8 | 10.4 | 10.9 | 5.5 | 6.0 | 10.3 |
| CaO | 0 | 0 | 0.3 | 0 | 0 | 0 | 0.4 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.7 | 5.8 | 10.2 | 6.7 | 8.0 | 6.0 | 10.5 | 7.0 | 7.9 |
| $TiO_2$ | 0 | 0 | 0.6 | 0 | 0 | 0 | 0.6 | 0 | 0 |
| $ZrO_2$ | 0.5 | 2.4 | 0 | 0 | 0.5 | 2.5 | 0 | 0 | 0.5 |
| $CeO_2$ | 0 | 0 | 0 | 0 | 0 | 0 | 0 | 0 | 0 |
| $Co_3O_4$ | 0 | 0 | 0 | 0 | 0.4 | 0.4 | 0.4 | 0.4 | 0.1 |
| $Fe_2O_3$ | 3.2 | 3.2 | 3.2 | 3.2 | 0 | 0 | 0 | 0 | 1.9 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.38 | 0.38 | 0.38 | 0.38 | 0.39 | 0.39 | 0.39 | 0.39 | 0.1 |
| NiO | 0 | 0 | 0 | 0 | 0 | 0 | 0 | 0 | 0 |
| $MnO_2$ | 0 | 0 | 0 | 0 | 0 | 0 | 0 | 0 | 0 |

TABLE 2-continued

| [mol %] | Example 10 | Example 11 | Example 12 | Example 13 | Example 14 | Example 15 | Example 16 | Example 17 | Example 18 |
|---|---|---|---|---|---|---|---|---|---|
| CuO | 0 | 0 | 0 | 0 | 0 | 0 | 0 | 0 | 0 |
| $Co_3O_4/Fe_2O_3$ | — | — | — | — | — | — | — | — | 0.05 |
| $(SiO_2 + Al_2O_3 + B_2O_3)/(\Sigma R'_2O + CaO + SrO + BaO + Co_3O_4 + Fe_2O_3)$ | 3.65 | 3.65 | 4.44 | 4.61 | 4.28 | 4.29 | 5.30 | 5.55 | 3.90 |
| Absorption coefficient [$mm^{-1}$] (Minimum value at wavelengths of 380 nm to 780 nm) | 1.060 | 1.140 | 1.830 | 1.280 | 0.080 | 0.090 | 0.060 | 0.070 | 0.486 |
| Relative value of absorption coefficient (@550 nm/@600 nm) | 1.15 | 1.16 | 1.09 | 1.12 | 0.61 | 0.58 | 0.50 | 0.67 | 0.637 |
| Relative value of absorption coefficient (@450 nm/@600 nm) | 2.21 | 2.19 | 1.23 | 1.74 | 0.17 | 0.18 | 0.16 | 0.15 | 0.641 |
| Plate thickness (mm) | 0.7 | 0.7 | 0.7 | 0.7 | 9.1 | 8.6 | 12.3 | 10.6 | 1.7 |
| Absorbance (Minimum value at wavelengths of 380 nm to 780 nm) | 0.74 | 0.80 | 1.28 | 0.90 | 0.73 | 0.77 | 0.74 | 0.74 | 0.82 |
| CIL value (gf) | 252 | 100 | 569 | 311 | 722 | 120 | 826 | 763 | — |
| Potassium ion dispersion depth (μm) | 35 | 31 | 33* | 28* | 47* | 40 | 43* | 38* | — |

TABLE 3

| [mol %] | Example 19 | Example 20 | Example 21 | Example 22 | Example 23 | Example 24 | Example 25 | Example 26 | Example 27 |
|---|---|---|---|---|---|---|---|---|---|
| $SiO_2$ | 63.8 | 64.0 | 63.4 | 63.5 | 63.5 | 62.6 | 63.2 | 63.7 | 63.8 |
| $B_2O_3$ | 0 | 0 | 0 | 0 | 0 | 0 | 0 | 0 | 0 |
| $Na_2O$ | 12.4 | 12.4 | 12.3 | 12.3 | 12.4 | 12.2 | 12.3 | 12.4 | 12.4 |
| $K_2O$ | 3.9 | 4.0 | 3.9 | 3.9 | 3.9 | 3.9 | 3.9 | 3.9 | 4.0 |
| MgO | 10.4 | 10.5 | 10.3 | 10.4 | 10.4 | 10.2 | 10.3 | 10.4 | 10.4 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.9 | 8.0 | 7.9 | 7.9 | 7.9 | 7.8 | 7.9 | 7.9 | 7.9 |
| $TiO_2$ | 0 | 0 | 0 | 0 | 0 | 0.24 | 0.25 | 0.5 | 0.25 |
| $ZrO_2$ | 0.5 | 0.5 | 0.5 | 0.5 | 0.5 | 0.4 | 0.4 | 0.5 | 0.4 |
| $CeO_2$ | 0 | 0 | 0 | 0 | 0 | 0 | 0 | 0 | 0 |
| $Co_3O_4$ | 0.07 | 0.07 | 0.04 | 0.04 | 0.04 | 0 | 0 | 0.06 | 0.05 |
| $Fe_2O_3$ | 0.015 | 0.02 | 1.13 | 1.14 | 1.14 | 0 | 0 | 0.01 | 0.018 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.75 | 0.5 | 0.3 | 0.2 | 0.1 | 0.64 | 0.65 | 0.5 | 0.65 |
| $MnO_2$ | 0 | 0 | 0 | 0 | 0 | 0 | 0 | 0 | 0 |
| CuO | 0 | 0 | 0 | 0 | 0 | 1.95 | 0.98 | 0 | 0 |
| $Co_3O_4/Fe_2O_3$ | 4.67 | 3.50 | 0.04 | 0.04 | 0.04 | — | — | 6.00 | 2.78 |
| $(SiO_2 + Al_2O_3 + B_2O_3)/(\Sigma R'_2O + CaO + SrO + BaO + Co_3O_4 + Fe_2O_3)$ | 4.36 | 4.36 | 4.09 | 4.09 | 4.09 | 4.36 | 4.38 | 4.36 | 4.36 |
| Absorption coefficient [$mm^{-1}$] (Minimum value at wavelengths of 380 nm to 780 nm) | 0.096 | 0.076 | 0.361 | 0.357 | 0.337 | 0.741 | 0.333 | 0.083 | 0.090 |
| Relative value of absorption coefficient (@550 nm/@600 nm) | 0.771 | 0.701 | 0.757 | 0.720 | 0.667 | 0.996 | 1.116 | 0.799 | 0.817 |
| Relative value of absorption coefficient (@450 nm/@600 nm) | 0.857 | 0.654 | 0.944 | 0.824 | 0.668 | 1.663 | 1.887 | 0.752 | 0.933 |
| Plate thickness (mm) | 7.3 | 9.2 | 2.9 | 3.1 | 2.1 | 1.6 | 2.9 | 8.4 | 7.8 |
| Absorbance (Minimum value at wavelengths of 380 nm to 780 nm) | 0.70 | 0.70 | 1.04 | 1.11 | 0.80 | 1.16 | 0.97 | 0.70 | 0.70 |
| CIL value (gf) | — | — | — | — | — | — | — | — | — |
| Potassium ion dispersion depth (μm) | — | — | — | — | — | — | — | — | — |

TABLE 4

| [mol %] | Example 28 | Example 29 | Example 30 | Example 31 | Example 32 | Example 33 | Example 34 | Example 35 | Example 36 |
|---|---|---|---|---|---|---|---|---|---|
| $SiO_2$ | 63.2 | 63.0 | 63.2 | 64.8 | 63.3 | 63.7 | 63.5 | 64.1 | 64.4 |
| $B_2O_3$ | 0 | 0 | 0 | 0 | 0 | 0 | 0 | 0 | 0 |
| $Na_2O$ | 12.3 | 12.2 | 12.3 | 13.8 | 12.3 | 12.8 | 12.3 | 13.6 | 13.7 |
| $K_2O$ | 3.9 | 3.9 | 3.9 | 3.9 | 3.9 | 3.9 | 4.0 | 3.9 | 3.9 |
| MgO | 10.3 | 10.3 | 10.3 | 7.4 | 10.3 | 9.3 | 10.4 | 7.3 | 7.3 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.9 | 7.9 | 7.9 | 7.9 | 7.9 | 7.9 | 7.9 | 7.8 | 7.8 |
| $TiO_2$ | 0.25 | 0.73 | 0.49 | 0.25 | 0.25 | 0.25 | 0.25 | 0.24 | 0.24 |
| $ZrO_2$ | 0.5 | 0.5 | 0.5 | 0.4 | 0.5 | 0.4 | 0.4 | 0.4 | 0.4 |
| $CeO_2$ | 0 | 0 | 0 | 0 | 0 | 0 | 0 | 0 | 0 |
| $Co_3O_4$ | 0.05 | 0.06 | 0.06 | 0.06 | 0.06 | 0.04 | 0.05 | 0.05 | 0.05 |
| $Fe_2O_3$ | 1.03 | 1.03 | 1.03 | 1.03 | 1.03 | 0.025 | 0.015 | 0.02 | 0.01 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.44 | 0.29 | 0.25 | 0.34 | 0.3 | 0.61 | 0.65 | 0.54 | 0.54 |
| $MnO_2$ | 0 | 0 | 0 | 0 | 0 | 0 | 0 | 0 | 0 |
| CuO | 0 | 0 | 0 | 0 | 0 | 0.98 | 0.49 | 1.95 | 1.47 |
| $Co_3O_4/Fe_2O_3$ | 0.05 | 0.06 | 0.06 | 0.06 | 0.06 | 1.60 | 3.33 | 2.50 | 5.00 |
| $(SiO_2 + Al_2O_3 + B_2O_3)/(\Sigma R'_2O + CaO + SrO + BaO + Co_3O_4 + Fe_2O_3)$ | 4.11 | 4.10 | 4.11 | 3.86 | 4.11 | 4.27 | 4.36 | 4.08 | 4.09 |
| Absorption coefficient [$mm^{-1}$] (Minimum value at wavelengths of 380 nm to 780 nm) | 0.350 | 0.342 | 0.331 | 0.340 | 0.322 | 0.308 | 0.184 | 0.492 | 0.373 |
| Relative value of absorption coefficient (@550 nm/@600 nm) | 0.794 | 0.725 | 0.702 | 0.738 | 0.703 | 0.791 | 0.807 | 0.757 | 0.769 |
| Relative value of absorption coefficient (@450 nm/@600 nm) | 0.966 | 0.842 | 0.753 | 0.634 | 0.773 | 0.874 | 0.956 | 0.666 | 0.670 |
| Plate thickness (mm) | 2.4 | 2.2 | 2.2 | 2.4 | 3.1 | 2.4 | 4.0 | 2.1 | 2.3 |
| Absorbance (Minimum value at wavelengths of 380 nm to 780 nm) | 0.84 | 0.76 | 0.73 | 0.80 | 0.99 | 0.74 | 0.73 | 1.03 | 0.87 |
| CIL value (gf) | — | — | — | — | — | — | — | — | — |
| Potassium ion dispersion depth (μm) | — | — | — | — | — | — | — | — | — |

TABLE 5

| [mol %] | Example 37 | Example 38 | Example 39 | Example 40 | Example 41 | Example 42 | Example 43 | Example 44 | Example 45 |
|---|---|---|---|---|---|---|---|---|---|
| $SiO_2$ | 65.0 | 64.8 | 63.2 | 64.7 | 64.1 | 63.4 | 63.7 | 63.1 | 63.4 |
| $B_2O_3$ | 0 | 0 | 0 | 0 | 0 | 0 | 0 | 0 | 0 |
| $Na_2O$ | 13.8 | 13.8 | 12.3 | 13.8 | 13.6 | 12.5 | 12.8 | 12.3 | 12.3 |
| $K_2O$ | 3.9 | 3.9 | 4.0 | 3.9 | 3.9 | 3.9 | 3.9 | 3.9 | 4.0 |
| MgO | 7.4 | 7.4 | 10.3 | 7.4 | 7.3 | 9.8 | 9.3 | 10.1 | 10.4 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.9 | 7.9 | 7.9 | 7.9 | 7.8 | 7.9 | 7.9 | 7.8 | 7.9 |
| $TiO_2$ | 0.25 | 0.25 | 0.25 | 0.25 | 0.24 | 0.25 | 0.25 | 0.25 | 0.25 |
| $ZrO_2$ | 0.4 | 0.4 | 0.4 | 0.4 | 0.4 | 0.4 | 0.4 | 0.5 | 0.5 |
| $CeO_2$ | 0 | 0 | 0 | 0 | 0 | 0 | 0 | 0.98 | 0.49 |
| $Co_3O_4$ | 0.05 | 0.05 | 0.05 | 0.05 | 0.05 | 0.05 | 0.04 | 0.05 | 0.05 |
| $Fe_2O_3$ | 0.025 | 0.021 | 0.016 | 0.015 | 0.022 | 0.01 | 0 | 0.012 | 0.012 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.55 | 0.55 | 0.64 | 0.64 | 0.54 | 0.63 | 0.62 | 0.64 | 0.65 |
| $MnO_2$ | 0 | 0 | 0 | 0 | 0 | 0 | 0 | 0 | 0 |
| CuO | 0.59 | 0.79 | 0.98 | 0.98 | 1.95 | 0.98 | 0.98 | 0 | 0 |
| $Co_3O_4/Fe_2O_3$ | 2.00 | 2.38 | 3.13 | 3.33 | 2.27 | 5.00 | — | 4.17 | 4.17 |
| $(SiO_2 + Al_2O_3 + B_2O_3)/(\Sigma R'_2O + CaO + SrO + BaO + Co_3O_4 + Fe_2O_3)$ | 4.08 | 4.08 | 4.35 | 4.09 | 4.08 | 4.32 | 4.27 | 4.36 | 4.36 |

TABLE 5-continued

| [mol %] | Example 37 | Example 38 | Example 39 | Example 40 | Example 41 | Example 42 | Example 43 | Example 44 | Example 45 |
|---|---|---|---|---|---|---|---|---|---|
| Absorption coefficient [mm$^{-1}$] (Minimum value at wavelengths of 380 nm to 780 nm) | 0.149 | 0.188 | 0.349 | 0.247 | 0.543 | 0.325 | 0.307 | 0.125 | 0.121 |
| Relative value of absorption coefficient (@550 nm/@600 nm) | 0.784 | 0.779 | 0.771 | 0.797 | 0.745 | 0.779 | 0.801 | 0.821 | 0.816 |
| Relative value of absorption coefficient (@450 nm/@600 nm) | 0.632 | 0.626 | 0.901 | 0.696 | 0.649 | 0.888 | 0.902 | 1.046 | 1.014 |
| Plate thickness (mm) | 5.0 | 3.8 | 3.4 | 3.6 | 2.1 | 2.3 | 3.3 | 5.7 | 6.2 |
| Absorbance (Minimum value at wavelengths of 380 nm to 780 nm) | 0.75 | 0.72 | 1.20 | 0.89 | 1.14 | 0.75 | 1.02 | 0.71 | 0.75 |
| CIL value (gf) | — | — | — | — | — | — | — | — | — |
| Potassium ion dispersion depth (μm) | — | — | — | — | — | — | — | — | — |

TABLE 6

| [mol %] | Example 46 | Example 47 | Example 48 | Example 49 | Example 50 | Example 51 | Example 52 | Example 53 | Example 54 |
|---|---|---|---|---|---|---|---|---|---|
| SiO$_2$ | 63.6 | 63.7 | 63.0 | 63.0 | 63.1 | 63.2 | 63.1 | 63.2 | 63.3 |
| B$_2$O$_3$ | 0 | 0 | 0 | 0 | 0 | 0 | 0 | 0 | 0 |
| Na$_2$O | 12.4 | 12.4 | 12.3 | 12.2 | 12.3 | 12.3 | 12.3 | 12.3 | 12.3 |
| K$_2$O | 4.0 | 4.0 | 3.9 | 3.9 | 3.9 | 3.9 | 3.9 | 3.9 | 3.9 |
| MgO | 10.4 | 10.4 | 10.3 | 10.3 | 10.3 | 10.3 | 10.3 | 10.3 | 10.3 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| Al$_2$O$_3$ | 7.9 | 7.9 | 7.8 | 7.8 | 7.9 | 7.9 | 7.9 | 7.9 | 7.9 |
| TiO$_2$ | 0.25 | 0.25 | 0.25 | 0.24 | 0.25 | 0.25 | 0.25 | 0.25 | 0.25 |
| ZrO$_2$ | 0.5 | 0.5 | 0.5 | 0.5 | 0.5 | 0.5 | 0.5 | 0.5 | 0.5 |
| CeO$_2$ | 0.25 | 0.1 | 0 | 0 | 0 | 0 | 0 | 0 | 0 |
| Co$_3$O$_4$ | 0.05 | 0.05 | 0.06 | 0.06 | 0.06 | 0.06 | 0.06 | 0.06 | 0.06 |
| Fe$_2$O$_3$ | 0.02 | 0.014 | 1.03 | 1.03 | 1.03 | 1.03 | 1.03 | 1.03 | 1.03 |
| Er$_2$O$_3$ | 0 | 0 | 0.39 | 0 | 0 | 0 | 0 | 0 | 0 |
| Nd$_2$O$_3$ | 0 | 0 | 0 | 0.49 | 0.25 | 0.12 | 0 | 0 | 0 |
| SO$_3$ | 0.1 | 0.1 | 0.1 | 0.1 | 0.1 | 0.1 | 0.1 | 0.1 | 0.1 |
| NiO | 0.65 | 0.65 | 0.34 | 0.34 | 0.34 | 0.34 | 0.34 | 0.34 | 0.34 |
| MnO$_2$ | 0 | 0 | 0 | 0 | 0 | 0 | 0.25 | 0.1 | 0.05 |
| CuO | 0 | 0 | 0 | 0 | 0 | 0 | 0 | 0 | 0 |
| Co$_3$O$_4$/Fe$_2$O$_3$ | 2.50 | 3.57 | 0.06 | 0.06 | 0.06 | 0.06 | 0.06 | 0.06 | 0.06 |
| (SiO$_2$ + Al$_2$O$_3$ + B$_2$O$_3$)/ (ΣR'$_2$O + CaO + SrO + BaO + Co$_3$O$_4$ + Fe$_2$O$_3$) | 4.36 | 4.37 | 4.11 | 4.11 | 4.10 | 4.11 | 4.10 | 4.11 | 4.11 |
| Absorption coefficient [mm$^{-1}$] (Minimum value at wavelengths of 380 nm to 780 nm) | 0.115 | 0.120 | 0.347 | 0.348 | 0.346 | 0.356 | 0.340 | 0.339 | 0.342 |
| Relative value of absorption coefficient (@550 nm/@600 nm) | 0.825 | 0.819 | 0.735 | 0.690 | 0.707 | 0.716 | 0.746 | 0.744 | 0.722 |
| Relative value of absorption coefficient (@450 nm/@600 nm) | 1.005 | 0.985 | 0.850 | 0.810 | 0.825 | 0.822 | 0.849 | 0.831 | 0.827 |
| Plate thickness (mm) | 6.3 | 6.7 | 2.4 | 2.4 | 2.3 | 2.2 | 2.1 | 2.7 | 2.7 |
| Absorbance (Minimum value at wavelengths of 380 nm to 780 nm) | 0.73 | 0.80 | 0.83 | 0.84 | 0.78 | 0.80 | 0.73 | 0.90 | 0.94 |
| CIL value (gf) | — | — | — | — | — | — | — | — | — |
| Potassium ion dispersion depth (μm) | — | — | — | — | — | — | — | — | — |

TABLE 7

| [mol %] | Example 55 | Example 56 | Example 57 | Example 58 | Example 59 | Example 60 | Example 61 | Example 62 | Example 63 |
|---|---|---|---|---|---|---|---|---|---|
| $SiO_2$ | 63.3 | 63.0 | 63.1 | 63.7 | 63.3 | 63.2 | 63.2 | 63.3 | 63.3 |
| $B_2O_3$ | 0 | 0 | 0 | 0 | 0 | 0 | 0 | 0 | 0 |
| $Na_2O$ | 12.3 | 12.3 | 12.3 | 12.4 | 13.8 | 14.8 | 14.3 | 10.3 | 8.3 |
| $K_2O$ | 3.9 | 3.9 | 3.9 | 4.0 | 3.9 | 3.9 | 3.9 | 5.7 | 7.8 |
| MgO | 10.3 | 10.3 | 10.3 | 10.4 | 8.9 | 7.9 | 8.4 | 10.3 | 10.3 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.9 | 7.8 | 7.9 | 7.9 | 7.9 | 7.9 | 7.9 | 7.8 | 7.8 |
| $TiO_2$ | 0.25 | 0 | 0 | 0.25 | 0.25 | 0.25 | 0.25 | 0.24 | 0.24 |
| $ZrO_2$ | 0.5 | 0.5 | 0.5 | 0.5 | 0.4 | 0.4 | 0.4 | 0.4 | 0.4 |
| $CeO_2$ | 0 | 0 | 0 | 0 | 0 | 0 | 0 | 0 | 0 |
| $Co_3O_4$ | 0.06 | 0.07 | 0.07 | 0.04 | 0.05 | 0.05 | 0.06 | 0.05 | 0.05 |
| $Fe_2O_3$ | 1.03 | 1.67 | 1.67 | 0.25 | 0.98 | 0.98 | 0.98 | 0.01 | 0.021 |
| $Er_2O_3$ | 0 | 0.39 | 0.2 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.34 | 0 | 0 | 0.46 | 0.46 | 0.46 | 0.54 | 0.64 | 0.64 |
| $MnO_2$ | 0.01 | 0 | 0 | 0 | 0 | 0 | 0 | 0 | 0 |
| CuO | 0 | 0 | 0 | 0 | 0 | 0 | 0 | 0.98 | 0.98 |
| $Co_3O_4/Fe_2O_3$ | 0.06 | 0.04 | 0.04 | 0.16 | 0.05 | 0.05 | 0.06 | 5.00 | 2.38 |
| $(SiO_2 + Al_2O_3 + B_2O_3)/(\Sigma R'_2O + CaO + SrO + BaO + Co_3O_4 + Fe_2O_3)$ | 4.11 | 3.95 | 3.96 | 4.31 | 3.80 | 3.61 | 3.70 | 4.39 | 4.39 |
| Absorption coefficient $[mm^{-1}]$ (Minimum value at wavelengths of 380 nm to 780 nm) | 0.349 | 0.419 | 0.420 | 0.164 | 0.329 | 0.335 | 0.339 | 0.346 | 0.342 |
| Relative value of absorption coefficient (@550 nm/@600 nm) | 0.734 | 0.638 | 0.635 | 0.791 | 0.790 | 0.799 | 0.804 | 0.783 | 0.792 |
| Relative value of absorption coefficient (@450 nm/@600 nm) | 0.830 | 0.632 | 0.620 | 0.920 | 0.862 | 0.774 | 0.873 | 0.916 | 0.894 |
| Plate thickness (mm) | 2.3 | 2.0 | 2.4 | 4.5 | — | — | — | — | — |
| Absorbance (Minimum value at wavelengths of 380 nm to 780 nm) | 0.82 | 0.84 | 0.99 | 0.74 | — | — | — | — | — |
| CIL value (gf) | — | — | — | — | — | — | — | — | — |
| Potassium ion dispersion depth (μm) | — | — | — | — | — | — | — | — | — |

TABLE 8

| [mol %] | Example 64 | Example 65 | Example 66 | Example 67 | Example 68 | Example 69 | Example 70 | Example 71 | Example 72 |
|---|---|---|---|---|---|---|---|---|---|
| $SiO_2$ | 63.3 | 63.4 | 66.9 | 66.8 | 62.9 | 58.9 | 62.9 | 64.8 | 70.7 |
| $B_2O_3$ | 0 | 0 | 0 | 0 | 0 | 0 | 0 | 0 | 0 |
| $Na_2O$ | 6.4 | 5.4 | 14.8 | 13.8 | 15.7 | 17.7 | 14.8 | 14.7 | 12.4 |
| $K_2O$ | 9.8 | 11.3 | 0.01 | 0 | 0 | 0 | 1.0 | 2.0 | 0.2 |
| MgO | 10.3 | 10.3 | 5.7 | 7.9 | 7.9 | 7.9 | 8.8 | 7.9 | 5.4 |
| CaO | 0 | 0 | 0.1 | 0 | 0 | 0 | 0 | 0 | 8.5 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.8 | 7.8 | 10.7 | 9.8 | 11.8 | 13.8 | 10.8 | 8.8 | 1.1 |
| $TiO_2$ | 0.24 | 0 | 0 | 0 | 0 | 0 | 0 | 0 | 0 |
| $ZrO_2$ | 0.4 | 0 | 0 | 0 | 0 | 0 | 0 | 0 | 0 |
| $CeO_2$ | 0 | 0 | 0 | 0 | 0 | 0 | 0 | 0 | 0 |
| $Co_3O_4$ | 0.05 | 0.05 | 0.05 | 0.05 | 0.05 | 0.05 | 0.05 | 0.05 | 0.05 |
| $Fe_2O_3$ | 0.015 | 0.022 | 0.011 | 0.013 | 0.02 | 0.02 | 0.014 | 0.01 | 0.01 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.64 | 0.64 | 0.64 | 0.65 | 0.65 | 0.65 | 0.65 | 0.65 | 0.65 |
| $MnO_2$ | 0 | 0 | 0 | 0 | 0 | 0 | 0 | 0 | 0 |
| CuO | 0.98 | 0.98 | 0.98 | 0.98 | 0.98 | 0.98 | 0.98 | 0.98 | 0.98 |
| $Co_3O_4/Fe_2O_3$ | 3.33 | 2.27 | 4.55 | 3.85 | 2.50 | 2.50 | 3.57 | 5.00 | 5.00 |
| $(\Sigma R'_2O + CaO + SrO + BaO + Co_3O_4 + Fe_2O_3)$ | 4.39 | 4.24 | 5.18 | 5.55 | 4.73 | 4.10 | 4.66 | 4.40 | 3.39 |

TABLE 8-continued

| [mol %] | Example 64 | Example 65 | Example 66 | Example 67 | Example 68 | Example 69 | Example 70 | Example 71 | Example 72 |
|---|---|---|---|---|---|---|---|---|---|
| Absorption coefficient [mm$^{-1}$] (Minimum value at wavelengths of 380 nm to 780 nm) | 0.347 | 0.258 | 0.402 | — | — | — | — | — | — |
| Relative value of absorption coefficient (@550 nm/@600 nm) | 0.806 | 0.780 | 0.776 | — | — | — | — | — | — |
| Relative value of absorption coefficient (@450 nm/@600 nm) | 0.856 | 0.787 | 0.962 | — | — | — | — | — | — |
| Plate thickness (mm) | — | — | — | — | — | — | — | — | — |
| Absorbance (Minimum value at wavelengths of 380 nm to 780 nm) | — | — | — | — | — | — | — | — | — |
| CIL value (gf) | — | — | — | — | — | — | — | — | — |
| Potassium ion dispersion depth (μm) | — | — | — | — | — | — | — | — | — |

TABLE 9

| [mol %] | Example 73 | Example 74 | Example 75 | Example 76 | Example 77 | Example 78 | Example 79 | Example 80 | Example 81 |
|---|---|---|---|---|---|---|---|---|---|
| $SiO_2$ | 70.7 | 70.7 | 70.6 | 70.6 | 70.6 | 70.6 | 67.0 | 71.7 | 71.7 |
| $B_2O_3$ | 0 | 0 | 0 | 0 | 0 | 0 | 0 | 0 | 0 |
| $Na_2O$ | 14.3 | 12.4 | 12.4 | 12.4 | 12.4 | 12.4 | 15.3 | 12.5 | 12.5 |
| $K_2O$ | 0.2 | 0.2 | 0.2 | 0.2 | 0.2 | 0.2 | 0 | 0.2 | 0.2 |
| MgO | 5.4 | 5.4 | 5.4 | 5.4 | 5.4 | 5.4 | 5.1 | 5.5 | 5.5 |
| CaO | 2.6 | 8.4 | 8.4 | 8.4 | 8.1 | 8.1 | 0.1 | 8.6 | 8.6 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 5 | 1.1 | 1.1 | 1.1 | 1.4 | 1.4 | 10.7 | 1.1 | 1.1 |
| $TiO_2$ | 0 | 0 | 0 | 0 | 0 | 0 | 0 | 0 | 0 |
| $ZrO_2$ | 0 | 0 | 0 | 0 | 0 | 0 | 0 | 0 | 0 |
| $CeO_2$ | 0 | 0 | 0 | 0 | 0 | 0 | 0 | 0 | 0 |
| $Co_3O_4$ | 0.05 | 0.05 | 0.05 | 0.05 | 0.05 | 0.05 | 0.05 | 0.021 | 0.021 |
| $Fe_2O_3$ | 0.016 | 0.025 | 0.012 | 0.02 | 0.01 | 0.015 | 0.010 | 0.12 | 0.001 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.62 | 0.72 | 0.8 | 0.87 | 0.8 | 0.79 | 0.64 | 0.22 | 0.34 |
| $MnO_2$ | 0 | 0 | 0 | 0 | 0 | 0 | 0 | 0 | 0 |
| CuO | 0.98 | 0.98 | 0.98 | 0.98 | 0.98 | 0.98 | 0.98 | 0 | 0 |
| $Co_3O_4/Fe_2O_3$ | 3.13 | 2.00 | 4.17 | 2.50 | 5.00 | 3.33 | 5.00 | 0.175 | 21 |
| ($\Sigma R'_2O$ + CaO + SrO + BaO + $Co_3O_4$ + $Fe_2O_3$) | 4.41 | 3.41 | 3.41 | 3.41 | 3.47 | 3.47 | 5.03 | 3.40 | 3.41 |
| Absorption coefficient [mm$^{-1}$] (Minimum value at wavelengths of 380 nm to 780 nm) | — | — | — | — | — | — | — | 0.090 | 0.066 |
| Relative value of absorption coefficient (@550 nm/@600 nm) | — | — | — | — | — | — | — | 0.785 | 0.863 |
| Relative value of absorption coefficient (@450 nm/@600 nm) | — | — | — | — | — | — | — | 0.787 | 0.987 |
| Plate thickness (mm) | — | — | — | — | — | — | — | — | — |
| Absorbance (Minimum value at wavelengths of 380 nm to 780 nm) | — | — | — | — | — | — | — | — | — |
| CIL value (gf) | — | — | — | — | — | — | — | — | — |
| Potassium ion dispersion depth (μm) | — | — | — | — | — | — | — | — | — |

TABLE 10

| [mol %] | Example 82 | Example 83 | Example 84 | Example 85 | Example 86 | Example 87 | Example 88 | Example 89 | Example 90 |
|---|---|---|---|---|---|---|---|---|---|
| $SiO_2$ | 71.3 | 71.3 | 70.6 | 70.6 | 65.6 | 65.5 | 57.8 | 72.0 | 64.3 |
| $B_2O_3$ | 0 | 0 | 0 | 0 | 0 | 0 | 0 | 0 | 0 |
| $Na_2O$ | 12.5 | 12.5 | 14.3 | 14.3 | 14.5 | 13.5 | 17.3 | 12.6 | 12.0 |
| $K_2O$ | 0.2 | 0.2 | 0.2 | 0.2 | 0 | 0 | 0 | 0.2 | 4.0 |
| MgO | 5.5 | 5.4 | 5.9 | 5.9 | 5.6 | 7.7 | 7.7 | 5.5 | 11.0 |
| CaO | 8.5 | 8.2 | 6.2 | 6.2 | 0 | 0 | 0 | 8.6 | 0.1 |
| BaO | 0 | 0 | 0 | 0 | 0 | 0 | 0 | 0 | 0 |
| SrO | 0 | 0 | 0 | 0 | 0 | 0 | 0 | 0 | 0.1 |
| $Al_2O_3$ | 1.1 | 1.1 | 1.4 | 1.4 | 10.5 | 9.6 | 13.5 | 1.1 | 6.0 |
| $TiO_2$ | 0 | 0 | 0 | 0 | 0 | 0 | 0 | 0 | 0 |
| $ZrO_2$ | 0 | 0 | 0 | 0 | 0 | 0 | 0 | 0 | 2.5 |
| $CeO_2$ | 0 | 0 | 0 | 0 | 0 | 0 | 0 | 0 | 0 |
| $Co_3O_4$ | 0.021 | 0.03 | 0 | 0 | 0.38 | 0.38 | 0.38 | 0 | 0 |
| $Fe_2O_3$ | 0.001 | 0.001 | 0.83 | 0.83 | 3.27 | 3.27 | 3.27 | 0 | 0.01 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0 | 0.09 |
| NiO | 0.34 | 0.40 | 0 | 0 | 0 | 0 | 0 | 0 | 0 |
| $MnO_2$ | 0 | 0 | 0.49 | 0 | 0 | 0 | 0 | 0 | 0 |
| $Cr_2O_3$ | 0 | 0 | 0 | 0.49 | 0 | 0 | 0 | | |
| CuO | 0.5 | 0.49 | 0 | 0 | 0 | 0 | 0 | 0 | 0 |
| $Co_3O_4/Fe_2O_3$ | 21 | 30 | — | — | 0.116 | 0.116 | 0.116 | — | — |
| ($\Sigma R'_2O$ + CaO + SrO + BaO + $Co_3O_4$ + $Fe_2O_3$) | 3.41 | 3.46 | 3.34 | 3.34 | 4.19 | 4.38 | 3.40 | 3.42 | 4.34 |
| Absorption coefficient [$mm^{-1}$] (Minimum value at wavelengths of 380 nm to 780 nm) | 0.101 | 0.098 | — | — | — | — | — | — | 0 |
| Relative value of absorption coefficient (@550 nm/@600 nm) | 0.797 | 0.802 | — | — | — | — | — | — | 0 |
| Relative value of absorption coefficient (@450 nm/@600 nm) | 0.884 | 0.888 | — | — | — | — | — | — | 0 |
| Plate thickness (mm) | — | — | — | — | — | — | — | — | — |
| Absorbance (Minimum value at wavelengths of 380 nm to 780 nm) | — | — | — | — | — | — | — | — | — |
| CIL value (gf) | — | — | — | — | — | — | — | — | 300 |
| Potassium ion dispersion depth (μm) | — | — | — | — | — | — | — | — | 45 |

TABLE 11

| [mol %] | Example 91 | Example 92 | Example 93 | Example 94 | Example 95 | Example 96 | Example 97 |
|---|---|---|---|---|---|---|---|
| $SiO_2$ | 66.8 | 65.2 | 66.6 | 69.3 | 64.2 | 63.3 | 68.3 |
| $B_2O_3$ | 3.6 | 5.2 | 2.6 | 1.0 | 5.1 | 5.0 | 1.0 |
| $Na_2O$ | 13.7 | 13.8 | 14.2 | 12.5 | 13.6 | 13.4 | 11.5 |
| $K_2O$ | 0.1 | 0 | 0 | 0 | 0 | 0 | 0 |
| MgO | 4.3 | 2.3 | 2.4 | 5.8 | 2.3 | 2.3 | 9.6 |
| CaO | 0 | 0 | 0 | 0 | 0 | 0 | 0 |
| BaO | 0 | 0 | 0 | 0 | 0 | 0 | 0 |
| SrO | 0 | 0 | 0 | 0 | 0 | 0 | 0 |
| $Al_2O_3$ | 7.7 | 9.6 | 11.4 | 7.7 | 11.0 | 14.1 | 5.8 |
| $Co_3O_4$ | 0.40 | 0.40 | 0.41 | 0.38 | 0.40 | 0.39 | 0.38 |
| $Fe_2O_3$ | 3.39 | 3.43 | 2.43 | 3.27 | 3.38 | 1.37 | 3.27 |
| $SO_3$ | 0.1 | 0.1 | 0.1 | 0.1 | 0.1 | 0.1 | 0.1 |
| $Co_3O_4/Fe_2O_3$ | 0.12 | 0.12 | 0.17 | 0.12 | 0.12 | 0.29 | 0.12 |
| ($\Sigma R'_2O$ + CaO + SrO + BaO + $Co_3O_4$ + $Fe_2O_3$) | 4.45 | 4.52 | 4.74 | 4.82 | 4.61 | 5.42 | 4.94 |
| Absorption coefficient [$mm^{-1}$] (Minimum value at wavelengths of 380 nm to 780 nm) | 1.753 | 2.538 | 1.382 | 1.633 | 4.239 | 0.655 | — |
| Relative value of absorption coefficient (@550 nm/@600 nm) | 0.952 | 1.027 | 0.924 | 0.960 | 1.000 | 0.709 | — |
| Relative value of absorption coefficient (@450 nm/@600 nm) | 0.966 | 1.174 | 0.901 | 1.017 | 1.143 | 0.560 | — |

TABLE 11-continued

| [mol %] | Example 91 | Example 92 | Example 93 | Example 94 | Example 95 | Example 96 | Example 97 |
|---|---|---|---|---|---|---|---|
| Plate thickness (mm) | — | — | — | — | — | — | — |
| Absorbance (Minimum value at wavelengths of 380 nm to 780 nm) | — | — | — | — | — | — | — |
| CIL value (gf) | — | — | — | 900 | 1491 | 800 | 475 |
| Potassium ion dispersion depth (μm) | — | — | — | — | — | — | — |

TABLE 12

| [mol %] | Example 98 | Example 99 | Example 100 | Example 101 | Example 102 | Example 103 |
|---|---|---|---|---|---|---|
| $SiO_2$ | 72.3 | 70.3 | 69.5 | 70.3 | 70.3 | 69.3 |
| $B_2O_3$ | 0 | 0 | 0 | 0 | 0 | 0 |
| $Na_2O$ | 11.5 | 13.5 | 11.6 | 12.5 | 13.5 | 11.5 |
| $K_2O$ | 0 | 0 | 0 | 0 | 0 | 0 |
| MgO | 2.9 | 1.9 | 9.7 | 5.8 | 3.8 | 9.6 |
| CaO | 0 | 0 | 0 | 0 | 0 | 0 |
| BaO | 0 | 0 | 0 | 0 | 0 | 0 |
| SrO | 0 | 0 | 0 | 0 | 0 | 0 |
| $Al_2O_3$ | 9.7 | 10.7 | 5.8 | 7.7 | 8.7 | 5.8 |
| $Co_3O_4$ | 0.38 | 0.38 | 0.39 | 0.38 | 0.38 | 0.38 |
| $Fe_2O_3$ | 3.27 | 3.27 | 2.95 | 3.27 | 3.27 | 3.27 |
| $SO_3$ | 0.1 | 0.1 | 0.1 | 0.1 | 0.1 | 0.1 |
| $Co_3O_4/Fe_2O_3$ | 0.12 | 0.12 | 0.13 | 0.12 | 0.12 | 0.12 |
| ($\Sigma R'_2O$ + CaO + SrO + BaO + $Co_3O_4$ + $Fe_2O_3$) | 5.42 | 4.72 | 5.05 | 4.82 | 4.61 | 4.94 |
| Absorption coefficient $[mm^{-1}]$ (Minimum value at wavelengths of 380 nm to 780 nm) | 4.209 | 4.214 | 1.300 | 1.660 | 1.546 | 1.665 |
| Relative value of absorption coefficient (@550 nm/@600 nm) | 1.000 | 1.000 | 0.841 | 0.898 | 0.974 | 0.924 |
| Relative value of absorption coefficient (@450 nm/@600 nm) | 1.104 | 1.103 | 0.781 | 0.920 | 0.989 | 1.022 |
| Plate thickness (mm) | — | — | — | — | — | — |
| Absorbance (Minimum value at wavelengths of 380 nm to 780 nm) | — | — | — | — | — | — |
| CIL value (gf) | 744 | 482 | 488 | 499 | 683 | 544 |
| Potassium ion dispersion depth (μm) | — | — | — | — | — | — |

TABLE 13

| [mol %] | Example 104 | Example 105 | Example 106 | Example 107 | Example 108 | Example 109 | Example 110 |
|---|---|---|---|---|---|---|---|
| $SiO_2$ | 71.3 | 71.2 | 70.1 | 63.3 | 70.2 | 70.9 | 70.2 |
| $B_2O_3$ | 0 | 0 | 0 | 5.0 | 0 | 0 | 0 |
| $Na_2O$ | 15.7 | 16.6 | 14.6 | 14.7 | 13.6 | 14.6 | 13.6 |
| $K_2O$ | 0.2 | 0.2 | 0.2 | 0 | 0.2 | 0.2 | 0.2 |
| MgO | 8.5 | 8.5 | 5.5 | 1.5 | 8.2 | 8.5 | 8.2 |
| $AL_2O_3$ | 4.1 | 3.1 | 8.1 | 13.7 | 6 | 5.1 | 6 |
| $Co_3O_4$ | 0.002 | 0.0008 | 0.006 | 0.056 | 0.065 | 0.003 | 0.064 |
| $Fe_2O_3$ | 0.01 | 0.005 | 0.15 | 0.015 | 0.99 | 0.02 | 0.99 |
| $SO_3$ | 0.1 | 0.1 | 0.1 | 0.1 | 0.1 | 0.1 | 0.1 |
| $NiO_4$ | 0.07 | 0.14 | 0.13 | 0.69 | 0.575 | 0.275 | 0.58 |
| CuO | 0.04 | 0.13 | 0.3 | 0.98 | 0 | 0.37 | 0 |
| $Co_3O_4/Fe_2O_3$ | 0.20 | 0.16 | 0.04 | 3.73 | 0.07 | 0.15 | 0.06 |
| ($\Sigma R'_2O$ + CaO + SrO + BaO + $Co_3O_4$ + $Fe_2O_3$) | 4.74 | 4.42 | 5.23 | 5.55 | 5.13 | 5.13 | 5.13 |

TABLE 13-continued

| [mol %] | Example 104 | Example 105 | Example 106 | Example 107 | Example 108 | Example 109 | Example 110 |
|---|---|---|---|---|---|---|---|
| Absorption coefficient [mm$^{-1}$] (Minimum value at wavelengths of 380 nm to 780 nm) | 0.035 | — | — | — | 0.354 | — | — |
| Relative value of absorption coefficient (@550 nm/@600 nm) | 0.945 | — | — | — | 0.758 | — | — |
| Relative value of absorption coefficient (@450 nm/@600 nm) | 1.027 | — | — | — | 0.874 | — | — |
| Plate thickness (mm) | — | — | — | — | — | — | — |
| Absorbance (Minimum value at wavelengths of 380 nm to 780 nm) | — | — | — | — | — | — | — |
| CIL value (gf) | — | — | — | — | — | — | — |
| Potassium ion dispersion depth (μm) | — | — | — | — | — | — | — |

TABLE 14

| Example 111 | Example 112 | Example 113 | Example 114 | Example 115 | Example 116 |
|---|---|---|---|---|---|
| 63.3 | 71.2 | 71.4 | 69.4 | 70.4 | 64.1 |
| 5.0 | 0 | 0 | 0 | 0 | 5.1 |
| 16.7 | 16.6 | 14.5 | 16.5 | 16.5 | 13.9 |
| 0 | 0.2 | 0.2 | 0.2 | 0.2 | 0 |
| 0 | 8.5 | 9.4 | 9.4 | 8.4 | 2.3 |
| 13.2 | 3.1 | 3.1 | 3.1 | 3.1 | 14.3 |
| 0.062 | 0.0018 | 0.01 | 0.007 | 0.007 | 0.007 |
| 0.012 | 0.01 | 0.005 | 0.02 | 0 | 0 |
| 0.1 | 0.1 | 0.1 | 0.1 | 0.1 | 0.1 |
| 0.69 | 0.14 | 0.55 | 0.55 | 0.6 | 0.14 |
| 0.98 | 0.13 | 0.74 | 0.74 | 0.7 | 0.13 |

TABLE 14-continued

| Example 111 | Example 112 | Example 113 | Example 114 | Example 115 | Example 116 |
|---|---|---|---|---|---|
| 5.17 | 0.18 | 2.00 | 0.35 | — | — |
| 4.86 | 4.42 | 5.06 | 4.33 | 4.40 | 6.00 |
| — | 0.040 | — | 0.472 | — | — |
| — | 0.991 | — | 0.797 | — | — |
| — | 1.203 | — | 0.912 | — | — |
| — | — | — | — | — | — |
| — | — | — | — | — | — |
| — | — | — | — | — | — |
| — | — | — | — | — | — |

TABLE 15

| [mol %] | Example 117 | Example 118 | Example 119 | Example 120 | Example 121 | Example 122 | Example 123 | Example 124 | Example 125 | Example 126 |
|---|---|---|---|---|---|---|---|---|---|---|
| SiO$_2$ | 71.28 | 71.27 | 71.22 | 70.93 | 70.90 | 70.62 | 70.62 | 71.58 | 71.58 | 71.61 |
| B$_2$O$_3$ | 0 | 0 | 0 | 0 | 0 | 0 | 0 | 0 | 0 | 0 |
| Na$_2$O | 12.5 | 14.5 | 14.4 | 14.4 | 14.4 | 14.3 | 14.3 | 12.5 | 12.5 | 16.5 |
| K$_2$O | 0.2 | 0.2 | 0.2 | 0.2 | 0.2 | 0.2 | 0.2 | 0.2 | 0.2 | 0.2 |
| MgO | 5.4 | 5.4 | 5.4 | 5.4 | 5.9 | 5.9 | 5.9 | 5.5 | 5.5 | 5.5 |
| CaO | 8.2 | 6.2 | 6.2 | 6.2 | 6.2 | 6.2 | 6.2 | 8.5 | 8.5 | 0.6 |
| BaO | 0 | 0 | 0 | 0 | 0 | 0 | 0 | 0 | 0 | 0 |
| SrO | 0 | 0 | 0 | 0 | 0 | 0 | 0 | 0 | 0 | 0 |
| Al$_2$O$_3$ | 1.4 | 1.4 | 1.4 | 1.9 | 1.4 | 1.4 | 1.4 | 1.1 | 1.1 | 5.1 |
| V$_2$O$_5$ | 0 | 0 | 0 | 0 | 0 | 0 | 0 | 0 | 0.25 | 0 |
| Co$_3$O$_4$ | 0.06 | 0.05 | 0.05 | 0.05 | 0.10 | 0 | 0 | 0.02 | 0.02 | 0.02 |
| Fe$_2$O$_3$ | 0.84 | 0.86 | 0.84 | 0.84 | 0.84 | 1.32 | 0.83 | 0.25 | 0 | 0 |
| SO$_3$ | 0.1 | 0.1 | 0.1 | 0.1 | 0.1 | 0.1 | 0.1 | 0.1 | 0.1 | 0.1 |
| NiO | 0 | 0 | 0 | 0 | 0 | 0 | 0.49 | 0.22 | 0.22 | 0.22 |
| MnO$_2$ | 0 | 0 | 0.1 | 0 | 0 | 0 | 0 | 0 | 0 | 0 |
| CuO | 0 | 0 | 0 | 0 | 0 | 0 | 0 | 0 | 0 | 0.2 |
| Co$_3$O$_4$/Fe$_2$O$_3$ | 0.07 | 0.06 | 0.06 | 0.06 | 0.12 | — | — | 0.08 | — | — |
| (ΣR'$_2$O + CaO + SrO + BaO + Co$_3$O$_4$ + Fe$_2$O$_3$) | 3.33 | 3.33 | 3.34 | 3.36 | 3.33 | 3.27 | 3.34 | 3.37 | 3.41 | 4.43 |
| Absorption coefficient [mm$^{-1}$] (Minimum value at wavelengths of 380 nm to 780 nm) | — | — | — | — | — | — | — | — | — | — |
| Relative value of absorption coefficient (@550 nm/@600 nm) | — | — | — | — | — | — | — | — | — | — |
| Relative value of absorption coefficient (@450 nm/@600 nm) | — | — | — | — | — | — | — | — | — | — |
| Plate thickness (mm) | — | — | — | — | — | — | — | — | — | — |
| Absorbance (Minimum value at wavelengths of 380 nm to 780 nm) | — | — | — | — | — | — | — | — | — | — |

TABLE 15-continued

| [mol %] | Example 117 | Example 118 | Example 119 | Example 120 | Example 121 | Example 122 | Example 123 | Example 124 | Example 125 | Example 126 |
|---|---|---|---|---|---|---|---|---|---|---|
| CIL value (gf) | — | — | — | — | — | — | — | — | — | — |
| Potassium ion dispersion depth (μm) | — | — | — | — | — | — | — | — | — | — |

TABLE 16

| [mol %] | Example 127 | Example 128 | Example 129 | Example 130 | Example 131 | Example 132 |
|---|---|---|---|---|---|---|
| $SiO_2$ | 71.5 | 71.5 | 71.1 | 71.2 | 69.4 | 70.8 |
| $B_2O_3$ | 0 | 0 | 0 | 0 | 0 | 0 |
| $Na_2O$ | 12.5 | 12.5 | 15.4 | 17.4 | 13.5 | 14.6 |
| $K_2O$ | 0.2 | 0.2 | 0.2 | 0.2 | 0.2 | 0.2 |
| MgO | 5.5 | 5.5 | 5.4 | 4.4 | 11.4 | 8.5 |
| CaO | 8.5 | 8.5 | 2.6 | 0.6 | 0 | 0 |
| BaO | 0 | 0 | 0 | 0 | 0 | 0 |
| SrO | 0 | 0 | 0 | 0 | 0 | 0 |
| $Al_2O_3$ | 1.1 | 1.1 | 4.1 | 5.0 | 4.1 | 5.1 |
| $V_2O_5$ | 0 | 0 | 0 | 0 | 0 | 0 |
| $Co_3O_4$ | 0.021 | 0.021 | 0.021 | 0.008 | 0.012 | 0.003 |
| $Fe_2O_3$ | 0 | 0 | 0 | 0.49 | 0 | 0.20 |
| $Er_2O_3$ | 0 | 0.2 | 0 | 0 | 0 | 0 |
| $SO_3$ | 0.1 | 0.1 | 0.1 | 0.1 | 0.1 | 0.1 |
| NiO | 0.22 | 0.22 | 0.35 | 0.54 | 0.55 | 0.17 |
| $MnO_2$ | 0.1 | 0 | 0 | 0 | 0 | 0 |
| CuO | 0.20 | 0.20 | 0.74 | 0 | 0.74 | 0.37 |
| $Co_3O_4/Fe_2O_3$ | — | — | — | 0.02 | — | 0.02 |
| ($\Sigma R'_2O$ + CaO + SrO + BaO + $Co_3O_4$ + $Fe_2O_3$) | 3.41 | 3.41 | 4.13 | 4.08 | 5.36 | 5.07 |
| Absorption coefficient [$mm^{-1}$] (Minimum value at wavelengths of 380 nm to 780 nm) | 0.070 | 0.086 | 0.119 | 0.170 | 0.186 | 0.115 |
| Relative value of absorption coefficient (@550 nm/@600 nm) | 0.751 | 0.753 | 0.779 | 1.037 | 0.925 | 0.993 |
| Relative value of absorption coefficient (@450 nm/@600 nm) | 0.747 | 0.762 | 0.735 | 1.233 | 1.403 | 1.358 |
| Plate thickness (mm) | — | — | — | — | — | — |
| Absorbance (Minimum value at wavelengths of 380 nm to 780 nm) | — | — | — | — | — | — |
| CIL value (gf) | — | — | — | — | — | — |
| Potassium ion dispersion depth (μm) | — | — | — | — | — | — |

TABLE 17

| [mol %] | Example 133 | Example 134 | Example 135 | Example 136 | Example 137 | Example 138 |
|---|---|---|---|---|---|---|
| $SiO_2$ | 70.9 | 64.0 | 71.3 | 71.0 | 68.8 | 68.3 |
| $B_2O_3$ | 0 | 5.1 | 0 | 0 | 0 | 0 |
| $Na_2O$ | 14.6 | 13.9 | 15.7 | 11.5 | 11.46 | 11.38 |
| $K_2O$ | 0.2 | 0 | 0.2 | 0 | 0 | 0 |
| MgO | 8.5 | 2.3 | 8.5 | 7.67 | 9.55 | 9.46 |
| CaO | 0 | 0 | 0 | 0 | 0 | 0 |
| BaO | 0 | 0 | 0 | 0 | 0 | 0 |
| SrO | 0 | 0 | 0 | 0 | 0 | 0 |
| $Al_2O_3$ | 5.1 | 14.3 | 4.1 | 5.8 | 5.7 | 5.7 |
| $V_2O_5$ | 0 | 0 | 0 | 0 | 0 | 0 |
| $Co_3O_4$ | 0.003 | 0.002 | 0.003 | 0.39 | 0.39 | 0.41 |
| $Fe_2O_3$ | 0.15 | 0 | 0 | 3.64 | 4.01 | 4.68 |
| $Er_2O_3$ | 0 | 0 | 0 | 0 | 0 | 0 |
| $SO_3$ | 0.1 | 0.1 | 0.1 | 0.1 | 0.1 | 0.1 |
| NiO | 0.07 | 0.14 | 0.07 | 0 | 0 | 0 |
| $MnO_2$ | 0 | 0 | 0 | 0 | 0 | 0 |

TABLE 17-continued

| [mol %] | Example 133 | Example 134 | Example 135 | Example 136 | Example 137 | Example 138 |
|---|---|---|---|---|---|---|
| CuO | 0.35 | 0.13 | 0.04 | 0 | 0 | 0 |
| $Co_3O_4/Fe_2O_3$ | 0.02 | — | — | 0.11 | 0.10 | 0.09 |
| ($\Sigma R'_2O$ + CaO + SrO + BaO + $Co_3O_4$ + $Fe_2O_3$) | 5.09 | 5.99 | 4.75 | 4.94 | 4.70 | 4.49 |
| Absorption coefficient [$mm^{-1}$] (Minimum value at wavelengths of 380 nm to 780 nm) | 0.097 | — | 0.049 | — | 2.240 | 3.048 |
| Relative value of absorption coefficient (@550 nm/@600 nm) | 0.841 | — | 0.918 | — | 0.948 | 1.035 |
| Relative value of absorption coefficient (@450 nm/@600 nm) | 0.973 | — | 0.960 | — | 0.987 | 1.144 |
| Plate thickness (mm) | — | — | — | — | — | — |
| Absorbance (Minimum value at wavelengths of 380 nm to 780 nm) | — | — | — | — | — | — |
| CIL value (gf) | — | — | — | — | — | — |
| Potassium ion dispersion depth (μm) | — | — | — | — | — | — |

In Tables 1 to 17, $\Sigma R'_2O$ represents "$Na_2O+K_2O+Li_2O$". The absorption coefficient was obtained by the following method. The thickness t of the plate-shaped glass, whose both surfaces were mirror polished, was measured with a vernier caliper. The spectral transmittance T of this glass was measured using an ultraviolet-visible-near-infrared spectrophotometer (V-570 made by JASCO Corporation). Then, the absorption coefficient 13 was calculated using a relational expression $T=10^{-\beta t}$. Subsequently, the minimum value of the absorption coefficient at wavelengths of 380 nm to 780 nm was obtained. Further, from the obtained absorption coefficient, the relative values of absorption coefficients (an absorption coefficient at a wavelength of 550 nm/an absorption coefficient at a wavelength of 600 nm and an absorption coefficient at a wavelength of 450 nm/an absorption coefficient at a wavelength of 600 nm) were calculated. Further, the absorbance A was calculated using a relational expression $A=-\log_{10} T$.

The CIL (crack initiation load) value was obtained by the following method. A plate-shaped glass having a thickness of 1 mm, whose both surfaces were mirror polished, was prepared. In a Vickers hardness tester, a Vickers indenter was pushed in for 15 seconds and then removed, and the vicinity of the indentation was observed after 15 seconds passed. In the observation, the number of cracks occurred was checked from a corner of the indentation. The measurement was performed on ten glasses for each of loads of the Vickers indenter of 50 gf, 100 gf, 200 gf, 300 gf, 500 gf, 1 kgf. The average value of the number of cracks occurred was calculated for each load. The relation between the load and the number of cracks was regression calculated using a sigmoid function.

Note that the Vickers indenter has four corners, and there are four cracks at most occurring from the indentation. Therefore, from the above regression calculation result, the load by which the number of cracks becomes two was taken as a load of the Vickers indenter that causes the crack occurrence rate of 50%, that is, the CIL value (gf) of the glass.

From the evaluation result of the absorption coefficient, in the glasses of Examples 1 to 58, Examples 91 to 95, Examples 98 to 103, and Examples 137 and 138 as working examples, the minimum value of the absorption coefficient at wavelengths of 380 nm to 780 nm is 1 $mm^{-1}$ or more, or the minimum value of the absorbance at wavelengths of 380 nm to 780 nm is 0.7 or more, from which it can be seen that a certain degree or more of light of a wavelength in the visible range is absorbed. By using these glasses for the housing of an electronic device, a high light blocking effect can be obtained.

Further, from the above evaluation result of the absorption coefficient, in part of glasses of Examples 1 to 88 and Examples 91 to 138 containing 0.1% to 7% in total of $Co_3O_4$, $Fe_2O_3$, NiO, $MnO_2$, $Cr_2O_3$, $Cu_2O$, CuO as coloring components, each relative value of the absorption coefficients (the absorption coefficient at a wavelength of 450 nm/the absorption coefficient at a wavelength of 600 nm and the absorption coefficient at a wavelength of 550 nm/the absorption coefficient at a wavelength of 600 nm) is within the range of 0.7 to 1.2, from which it can be seen that it is a glass which averagely absorbs light in the visible range. Accordingly, for example, a black glass whose color tone is jet black can be obtained, which is different from brownish black and bluish black.

From the evaluation result of the above CIL value, it can be seen that the glasses of Examples 1 to 17 are glasses with high strength which is hard to be scratched. The glass before chemical strengthening is scratched through manufacturing processes or during shipping, and the scratch becomes an origin of breakage after chemical strengthening and becomes a factor of decreasing the strength of the glass. The CIL value of a typical soda lime glass is about 150 gf as an example, whereas the CIL value of each glass of Examples 1 to 8, Example 10, Examples 12 to 14, Examples 16 and 17, and Examples 94 to 103 as working examples is larger than that of the soda lime glass, from which it is presumed that a glass having high strength can be obtained after chemical strengthening.

Regarding part of glasses of Examples 1 to 138 shown in Table 1 to Table 17, the difference (Δa*) between chromaticity a* of reflected light by a D65 light source and chromaticity a* of reflected light by an F2 light source in an L*a*b* color system standardized by CIE and the difference (Δb*) between chromaticity b* of reflected light by the D65 light source and chromaticity b* of reflected light by the F2 light source in the L*a*b* color system were measured. Further, also regarding glasses after chemical strengthening of part of glasses of Examples 1 to 138, Δa*, Δb* were measured similarly to the above. Results are shown in Tables 18 to 34. Note that in Tables 18 to 34, ones described with "-" and ones with no data indicate that these were not measured.

TABLE 18

|  |  |  | Example 18 | Example 24 | Example 25 | Example 26 | Example 27 | Example 28 |
|---|---|---|---|---|---|---|---|---|
| Before chemical strengthening | Reflection measurement using D65 light source . . . (1) | L* | 26.28 | 32.42 | 36.28 | 28.30 | 27.04 | 27.53 |
|  |  | a* | −0.63 | −3.57 | 1.23 | 3.11 | 2.39 | −1.56 |
|  |  | b* | −4.23 | 9.53 | 12.38 | −9.14 | −4.62 | 0.89 |
|  | Reflection measurement using F2 light source . . . (2) | L* | 26.12 | 33.04 | 27.34 | 28.18 | 27.05 | 27.62 |
|  |  | a* | −1.09 | −2.53 | 0.72 | 0.55 | 0.33 | −2.06 |
|  |  | b* | −4.63 | 10.82 | 14.53 | −9.71 | −4.55 | 1.06 |
|  | (1) − (2) | ΔL* | 0.16 | −0.61 | −1.06 | 0.12 | 0.00 | −0.09 |
|  |  | Δa* | 0.47 | −1.03 | 0.51 | 2.56 | 2.06 | 0.50 |
|  |  | Δb* | 0.40 | −1.29 | −2.15 | 0.57 | −0.07 | −0.17 |

TABLE 19

|  |  |  | Example 29 | Example 30 | Example 31 | Example 32 | Example 33 | Example 34 |
|---|---|---|---|---|---|---|---|---|
| Before chemical strengthening | Reflection measurement using D65 light source . . . (1) | L* | 29.52 | 30.01 | 26.54 | 28.87 | 26.14 | 26.47 |
|  |  | a* | −2.95 | −2.81 | 1.43 | −2.00 | 0.52 | 0.92 |
|  |  | b* | −0.21 | −2.73 | −7.24 | −2.59 | −3.58 | −3.02 |
|  | Reflection measurement using F2 light source . . . (2) | L* | 29.56 | 29.95 | 26.31 | 28.82 | 26.11 | 26.51 |
|  |  | a* | −3.42 | −3.46 | 0.36 | −2.68 | −0.34 | −0.40 |
|  |  | b* | −0.20 | −3.00 | −8.18 | −2.88 | −3.60 | −2.81 |
|  | (1) − (2) | ΔL* | −0.04 | 0.06 | 0.23 | 0.05 | 0.03 | −0.04 |
|  |  | Δa* | 0.47 | 0.65 | 1.07 | 0.69 | 0.86 | 1.32 |
|  |  | Δb* | −0.02 | 0.27 | 0.93 | 0.28 | 0.02 | −0.21 |

TABLE 20

|  |  |  | Example 35 | Example 36 | Example 39 | Example 40 | Example 41 | Example 42 |
|---|---|---|---|---|---|---|---|---|
| Before chemical strengthening | Reflection measurement using D65 light source . . . (1) | L* | 25.21 | 25.62 | 25.98 | 25.42 | 25.12 | 26.25 |
|  |  | a* | 1.32 | 2.21 | −0.23 | 3.39 | 1.05 | 0.27 |
|  |  | b* | −5.92 | −7.81 | −2.16 | −8.09 | −5.16 | −3.05 |
|  | Reflection measurement using F2 light source . . . (2) | L* | 25.04 | 25.43 | 25.97 | 25.30 | 24.97 | 26.65 |
|  |  | a* | 0.59 | 1.06 | −0.82 | 1.72 | 0.47 | −0.58 |
|  |  | b* | −6.53 | −8.54 | −0.29 | −8.54 | −5.71 | −3.03 |
|  | (1) − (2) | ΔL* | 0.17 | 0.19 | 0.01 | 0.12 | 0.15 | 0.00 |
|  |  | Δa* | 0.73 | 1.15 | 0.59 | 1.67 | 0.58 | 0.84 |
|  |  | Δb* | 0.61 | 0.72 | −0.07 | 0.45 | 0.55 | −0.02 |

TABLE 21

|  |  |  | Example 43 | Example 44 | Example 45 | Example 46 | Example 47 | Example 48 |
|---|---|---|---|---|---|---|---|---|
| Before chemical strengthening | Reflection measurement using D65 light source . . . (1) | L* | 26.53 | 29.03 | 27.72 | 26.66 | 26.76 | 29.21 |
|  |  | a* | 0.54 | −0.01 | 1.12 | 1.59 | 1.78 | −0.26 |
|  |  | b* | −3.47 | 0.18 | −1.91 | −2.70 | −3.20 | −0.41 |

TABLE 21-continued

|  |  |  | Example 43 | Example 44 | Example 45 | Example 46 | Example 47 | Example 48 |
|---|---|---|---|---|---|---|---|---|
|  | Reflection measurement using F2 light source ... (2) | L* | 26.53 | 29.17 | 27.80 | 26.69 | 26.79 | 29.32 |
|  |  | a* | −0.41 | −1.51 | −0.63 | −0.14 | −0.05 | −2.77 |
|  |  | b* | −3.47 | 0.50 | −1.66 | −2.48 | −3.00 | −0.28 |
|  | (1) − (2) | ⊿L* | 0.00 | −0.14 | −0.08 | −0.03 | −0.03 | −0.11 |
|  |  | ⊿a* | 0.95 | 1.50 | 1.75 | 1.73 | 1.83 | 0.71 |
|  |  | ⊿b* | 0.00 | −0.32 | −0.25 | −0.22 | −0.20 | −0.13 |

TABLE 22

|  |  |  | Example 49 | Example 50 | Example 51 | Example 52 | Example 53 | Example 54 |
|---|---|---|---|---|---|---|---|---|
| Before chemical strengthening | Reflection measurement using D65 light source ... (1) | L* | 28.79 | 28.80 | 28.83 | 28.96 | 28.68 | 27.99 |
|  |  | a* | −2.42 | −2.31 | −2.14 | −2.35 | −2.01 | −1.80 |
|  |  | b* | −1.39 | −1.35 | −1.57 | −0.18 | −0.83 | −1.15 |
|  | Reflection measurement using F2 light source ... (2) | L* | 28.65 | 28.72 | 28.79 | 29.02 | 28.72 | 28.00 |
|  |  | a* | −0.39 | −2.95 | −2.78 | −2.88 | 2.63 | −2.39 |
|  |  | b* | −1.68 | −1.58 | −1.78 | −0.14 | −0.88 | −1.25 |
|  | (1) − (2) | ⊿L* | 0.14 | 0.08 | 0.05 | −0.05 | −0.04 | −0.01 |
|  |  | ⊿a* | 0.67 | 0.63 | 0.64 | 0.53 | 0.61 | 0.59 |
|  |  | ⊿b* | 0.28 | 0.23 | 0.21 | −0.05 | 0.05 | 0.10 |

TABLE 23

|  |  |  | Example 55 | Example 58 | Example 59 | Example 60 | Example 61 | Example 62 |
|---|---|---|---|---|---|---|---|---|
| Before chemical strengthening | Reflection measurement using D65 light source ... (1) | L* | 28.04 | 29.65 | — | — | — | — |
|  |  | a* | −1.85 | 0.92 | −0.20 | 0.63 | 0.36 | 0.32 |
|  |  | b* | −1.11 | −4.00 | −2.29 | −3.59 | −2.17 | −2.71 |
|  | Reflection measurement using F2 light source ... (2) | L* | 28.05 | 29.71 | 27.17 | 26.25 | 26.33 | 26.45 |
|  |  | a* | −2.46 | −0.98 | −0.90 | −0.11 | −0.37 | −0.49 |
|  |  | b* | −1.19 | 4.07 | −2.47 | −3.99 | −2.33 | −2.62 |
|  | (1) − (2) | ⊿L* | −0.01 | −0.06 | — | — | — | — |
|  |  | ⊿a* | 0.61 | 1.90 | 0.70 | 0.74 | 0.73 | 0.81 |
|  |  | ⊿b* | 0.08 | 0.07 | 0.18 | 0.40 | 0.16 | −0.09 |
| After chemical strengthening | Reflection measurement using D65 light source ... (1) | L* | — | — | — | — | — | — |
|  |  | a* | — | — | −0.02 | 1.6 | 0.24 | 0.5 |
|  |  | b* | — | — | −2.41 | −5.46 | −2 | −3.02 |
|  | Reflection measurement using F2 light source ... (2) | L* | — | — | 26.85 | 25.64 | 26.55 | 26.4 |
|  |  | a* | — | — | −0.8 | 0.43 | −0.49 | −0.3 |
|  |  | b* | — | — | −2.59 | −6.06 | −2.15 | −3.02 |
|  | (1) − (2) | ⊿L* | — | — | — | — | — | — |
|  |  | ⊿a* | — | — | 0.78 | 1.17 | 0.73 | 0.80 |
|  |  | ⊿b* | — | — | 0.18 | 0.60 | 0.15 | 0.00 |

TABLE 24

|  |  |  | Example 63 | Example 64 | Example 65 | Example 66 | Example 67 | Example 68 |
|---|---|---|---|---|---|---|---|---|
| Before chemical strengthening | Reflection measurement using D65 light source . . . (1) | L* | — | — | — | — | — | — |
|  |  | a* | 0.77 | 1.47 | 1.73 | −0.25 | −1.76 | −1.66 |
|  |  | b* | −3.31 | −4.32 | −5.55 | −1.81 | 0.74 | 0.71 |
|  | Reflection measurement using F2 light source . . . (2) | L* | 26.29 | 26.04 | 25.75 | 26.74 | 27.79 | 27.58 |
|  |  | a* | −0.14 | 0.38 | 0.61 | −1.05 | −2.28 | −2.07 |
|  |  | b* | −3.27 | −4.35 | −5.69 | −1.68 | 1.08 | 1.01 |
|  | (1) − (2) | ⊿L* | — | — | — | — | — | — |
|  |  | ⊿a* | 0.91 | 1.09 | 1.12 | 0.80 | 0.52 | 0.41 |
|  |  | ⊿b* | −0.04 | 0.03 | 0.14 | −0.13 | −0.34 | −0.30 |
| After chemical strengthening | Reflection measurement using D65 light source . . . (1) | L* | — | — | — | — | — | — |
|  |  | a* | 0.91 | 1.56 | — | −0.15 | −1.67 | −1.39 |
|  |  | b* | −3.61 | −4.48 | — | −2.12 | 0.40 | 1.91 |
|  | Reflection measurement using F2 light source . . . (2) | L* | 26.25 | 25.93 | — | 27.03 | 28.23 | 26.64 |
|  |  | a* | 0.01 | 0.49 | — | −0.97 | −2.19 | −1.95 |
|  |  | b* | −3.63 | −4.58 | — | −2.06 | 0.69 | 2.43 |
|  | (1) − (2) | ⊿L* | — | — | — | — | — | — |
|  |  | ⊿a* | 0.90 | 1.07 | — | 0.82 | 0.52 | 0.56 |
|  |  | ⊿b* | 0.02 | 0.10 | — | −0.06 | −0.29 | −0.52 |

TABLE 25

|  |  |  | Example 69 | Example 70 | Example 71 | Example 72 | Example 73 | Example 74 |
|---|---|---|---|---|---|---|---|---|
| Before chemical strengthening | Reflection measurement using D65 light source . . . (1) | L* | — | — | — | — | — | — |
|  |  | a* | −1.65 | −1.39 | 1.52 | −0.08 | 2.23 | 0.04 |
|  |  | b* | 0.19 | −0.10 | −5.09 | −4.70 | −7.19 | −3.28 |
|  | Reflection measurement using F2 light source . . . (2) | L* | 28.06 | 27.35 | 25.72 | 26.20 | 25.22 | 25.88 |
|  |  | a* | −0.25 | −1.85 | 0.42 | −0.49 | 0.99 | −0.47 |
|  |  | b* | 0.46 | 0.13 | −5.23 | −4.50 | −7.52 | −3.28 |
|  | (1) − (2) | ⊿L* | — | — | — | — | — | — |
|  |  | ⊿a* | 0.40 | 0.46 | 1.10 | 0.41 | 1.24 | 0.51 |
|  |  | ⊿b* | −0.27 | −0.23 | 0.14 | −0.20 | 0.33 | 0.00 |
| After chemical strengthening | Reflection measurement using D65 light source . . . (1) | L* | — | — | — | — | — | — |
|  |  | a* | −1.31 | −0.96 | 1.57 | 0.17 | 2.30 | 0.14 |
|  |  | b* | −0.27 | 1.35 | −5.52 | −4.69 | −7.45 | −3.64 |
|  | Reflection measurement using F2 light source . . . (2) | L* | 28.48 | 23.39 | 25.96 | 27.12 | 25.66 | 26.14 |
|  |  | a* | −1.84 | −1.79 | 0.43 | −0.38 | 1.09 | −0.36 |
|  |  | b* | −0.07 | 1.93 | −5.73 | −4.86 | −7.85 | −3.71 |
|  | (1) − (2) | ⊿L* | — | — | — | — | — | — |
|  |  | ⊿a* | 0.53 | 0.83 | 1.14 | 0.55 | 1.21 | 0.50 |
|  |  | ⊿b* | −0.20 | −0.58 | 0.21 | 0.17 | 0.40 | 0.07 |

TABLE 26

|  |  |  | Example 75 | Example 76 | Example 77 | Example 78 | Example 79 | Example 80 | Example 85 |
|---|---|---|---|---|---|---|---|---|---|
| Before chemical strengthening | Reflection measurement using D65 light | L* | — | — | — | — | 25.10 | 50.27 | 59.08 |
|  |  | a* | −0.08 | −0.01 | −0.20 | −0.19 | −0.39 | −1.80 | −27.98 |
|  |  | b* | −2.08 | −1.69 | −2.08 | −2.15 | −0.35 | −9.04 | 49.38 |

TABLE 26-continued

|  |  |  | Example 75 | Example 76 | Example 77 | Example 78 | Example 79 | Example 80 | Example 85 |
|---|---|---|---|---|---|---|---|---|---|
|  | source . . . (1) Reflection measurement using F2 light source . . . (2) | L* a* b* | 25.46 −0.44 −2.04 | 25.32 −0.31 −1.65 | 25.44 −0.53 −2.03 | 25.67 −0.54 −2.09 | 25.09 −0.47 −0.41 | 49.80 −3.20 −10.26 | 60.98 −23.46 53.74 |
|  | (1) − (2) | ⊿L* ⊿a* ⊿b* | — 0.36 −0.04 | — 0.30 −0.04 | — 0.33 −0.05 | — 0.35 −0.06 | 0.01 0.08 0.06 | 0.47 1.40 1.22 | −1.90 −4.52 −4.36 |
| After chemical strengthening | Reflection measurement using D65 light source . . . (1) | L* a* b* | — 0.10 −2.34 | — 0.14 −1.84 | — 0.00 −2.28 | — 1.6 −5.46 | — — — | — — — | 58.55 −27.59 48.95 |
|  | Reflection measurement using F2 light source . . . (2) | L* a* b* | 25.87 −0.31 −2.30 | 25.64 −0.20 −1.81 | 25.88 −0.38 −2.55 | 25.64 0.43 −6.06 | — — — | — — — | 60.48 −23.22 53.31 |
|  | (1) − (2) | ⊿L* ⊿a* ⊿b* | — 0.41 −0.04 | — 0.34 −0.03 | — 0.38 0.27 | — 1.17 0.60 | — — — | — — — | −1.93 −4.37 −4.36 |

TABLE 27

|  |  |  | Example 81 | Example 82 | Example 83 | Example 84 | Example 86 | Example 87 | Example 88 |
|---|---|---|---|---|---|---|---|---|---|
| Before chemical strengthening | Reflection measurement using D65 light source . . . (1) | L* a* b* | 43.23 −0.47 −2.56 | 41.71 −5.44 −4.79 | 37.04 −3.81 −4.77 | 85.64 −6.13 12.52 | 25.03 0.06 −0.63 | 25.25 0.12 −0.62 | 25.61 0.09 −0.60 |
|  | Reflection measurement using F2 light source . . . (2) | L* a* b* | 43.14 −2.30 −2.75 | 41.35 −5.26 −5.37 | 36.75 −4.12 −5.14 | 85.93 −4.12 14.14 | 24.99 0.06 −0.72 | 25.23 0.11 −0.72 | 25.58 0.07 −0.67 |
|  | (1) − (2) | ⊿L* ⊿a* ⊿b* | 0.09 1.83 0.19 | 0.36 −0.18 0.58 | 0.29 0.31 0.37 | −0.29 −2.01 −1.62 | 0.04 0.00 0.09 | 0.02 0.01 0.10 | 0.03 0.02 0.07 |

TABLE 28

|  |  |  | Example 91 | Example 92 | Example 93 | Example 94 | Example 95 | Example 96 | Example 97 | Example 98 |
|---|---|---|---|---|---|---|---|---|---|---|
| Before chemical strengthening | Reflection measurement using D65 light source . . . (1) | L* a* b* | 25 0.01 −0.69 | 25.1 0.01 −0.78 | 24.68 0.03 −0.63 | 25.01 −0.03 −0.67 | 25.51 0.01 −0.71 | 24.48 0.05 −0.42 | 27.24 0.56 0.00 | 24.91 0.07 −0.51 |
|  | Reflection measurement using F2 light source . . . (2) | L* a* b* | 24.96 0 −0.81 | 25.05 0.02 −0.92 | 24.64 0.03 −0.74 | 24.98 −0.01 −0.78 | 25.47 0.00 −0.82 | 24.46 0.04 −0.51 | 27.25 0.39 −0.01 | 24.88 0.07 −0.61 |
|  | (1) − (2) | ⊿L* ⊿a* ⊿b* | 0.04 0.01 0.12 | 0.05 −0.01 0.14 | 0.04 0.00 0.11 | 0.03 −0.02 0.11 | 0.04 0.01 0.11 | 0.02 0.01 0.09 | −0.01 0.17 0.01 | 0.03 0.00 0.10 |

TABLE 29

|  |  |  | Example 99 | Example 100 | Example 101 | Example 102 | Example 103 |
|---|---|---|---|---|---|---|---|
| Before chemical strengthening | Reflection measurement using D65 light source ... (1) | L* | 24.86 | 25.05 | 25.01 | 24.9 | 25.13 |
|  |  | a* | 0.13 | 0.01 | 0.04 | 0.06 | 0.08 |
|  |  | b* | −0.51 | −0.56 | −0.50 | −0.59 | −0.58 |
|  | Reflection measurement using F2 light source ... (2) | L* | 24.84 | 25.01 | 24.99 | 24.88 | 25.10 |
|  |  | a* | 0.11 | 0.02 | 0.03 | 0.05 | 0.07 |
|  |  | b* | −0.59 | −0.66 | −0.59 | −0.69 | −0.66 |
|  | (1) − (2) | ⊿L* | 0.02 | 0.04 | 0.02 | 0.02 | 0.03 |
|  |  | ⊿a* | 0.02 | −0.01 | 0.01 | 0.01 | 0.01 |
|  |  | ⊿b* | 0.08 | 0.10 | 0.09 | 0.10 | 0.08 |

TABLE 30

|  |  |  | Example 104 | Example 105 | Example 106 | Example 107 | Example 108 | Example 109 | Example 110 |
|---|---|---|---|---|---|---|---|---|---|
| Before chemical strengthening | Reflection measurement using D65 light source ... (1) | L* | 73.34 | 62.23 | 56.57 | 26.60 | 25.83 | 41.77 | 25.82 |
|  |  | a* | 0.10 | 0.63 | 1.49 | −0.15 | 0.29 | 0.63 | 0.33 |
|  |  | b* | −4.00 | 2.70 | −2.21 | −1.19 | −1.86 | 1.40 | −1.82 |
|  | Reflection measurement using F2 light source ... (2) | L* | 73.29 | 61.72 | 56.87 | 26.66 | 25.83 | 42.33 | 25.82 |
|  |  | a* | 0.72 | 1.38 | −0.17 | −0.87 | −0.51 | −0.34 | −0.51 |
|  |  | b* | −2.78 | 2.97 | −3.14 | −1.14 | −1.90 | 1.73 | −1.84 |
|  | (1) − (2) | ⊿L* | 0.05 | 0.51 | −0.30 | −0.06 | 0.00 | −0.56 | 0.00 |
|  |  | ⊿a* | −0.62 | −0.75 | 1.66 | 0.72 | 0.80 | 0.97 | 0.84 |
|  |  | ⊿b* | −1.22 | −0.27 | 0.93 | −0.05 | 0.04 | −0.33 | 0.02 |
| After chemical strengthening | Reflection measurement using D65 light source ... (1) | L* | — | — | 56.32 | 28.47 | 26.16 | 41.65 | 26.04 |
|  |  | a* | — | — | 1.42 | −0.64 | 0.40 | 0.82 | 0.31 |
|  |  | b* | — | — | −2.73 | −1.87 | −2.02 | 0.73 | −1.94 |
|  | Reflection measurement using F2 light source ... (2) | L* | — | — | 56.60 | 28.44 | 26.15 | 42.18 | 26.05 |
|  |  | a* | — | — | −0.20 | −1.04 | −0.41 | −0.18 | −0.49 |
|  |  | b* | — | — | −3.72 | −2.00 | −2.10 | 0.98 | −1.98 |
|  | (1) − (2) | ⊿L* | — | — | −0.28 | 0.03 | 0.01 | −0.53 | −0.01 |
|  |  | ⊿a* | — | — | 1.62 | 0.40 | 0.81 | 1.00 | 0.80 |
|  |  | ⊿b* | — | — | 0.99 | 0.13 | 0.08 | −0.25 | 0.04 |

TABLE 31

|  |  |  | Example 111 | Example 112 | Example 113 | Example 114 | Example 115 | Example 116 | Example 117 |
|---|---|---|---|---|---|---|---|---|---|
| Before chemical strengthening | Reflection measurement using D65 light source ... (1) | L* | 24.95 | 60.39 | 32.30 | 33.21 | 32.65 | 65.75 | 32.33 |
|  |  | a* | 5.52 | 1.13 | 0.34 | 0.14 | 0.82 | −0.43 | 20.74 |
|  |  | b* | −10.67 | 1.06 | −0.98 | −0.34 | −1.82 | 9.37 | −45.82 |
|  | Reflection measurement using F2 light source ... (2) | L* | 24.79 | 60.79 | 32.58 | 33.51 | 32.90 | 66.42 | 30.46 |
|  |  | a* | 3.32 | 0.35 | −0.67 | −0.68 | −0.23 | −1.38 | 15.14 |
|  |  | b* | −11.57 | 0.54 | −0.51 | 0.20 | −1.43 | 10.25 | −51.40 |
|  | (1) − (2) | ⊿L* | 0.16 | −0.40 | −0.28 | −0.30 | −0.25 | −0.67 | 1.87 |
|  |  | ⊿a* | 2.20 | 0.78 | 1.01 | 0.82 | 1.05 | 0.95 | 5.60 |
|  |  | ⊿b* | 0.90 | 0.52 | −0.47 | −0.54 | −0.39 | −0.88 | 5.58 |
| After chemical strengthening | Reflection measurement using D65 light | L* | 25.61 | 60.37 | 32.07 | 32.88 | — | — | — |
|  |  | a* | 5.20 | 1.05 | 1.01 | 0.53 | — | — | — |
|  |  | b* | −10.11 | 0.98 | −2.23 | −1.38 | — | — | — |

TABLE 31-continued

|  |  |  | Example 111 | Example 112 | Example 113 | Example 114 | Example 115 | Example 116 | Example 117 |
|---|---|---|---|---|---|---|---|---|---|
|  | source . . . (1) |  |  |  |  |  |  |  |  |
|  | Reflection | L* | 25.47 | 60.76 | 32.32 | 33.13 | — | — | — |
|  | measurement | a* | 3.10 | 0.30 | −0.13 | −0.35 | — | — | — |
|  | using F2 | b* | −10.97 | 0.50 | −1.92 | −0.97 | — | — | — |
|  | light |  |  |  |  |  |  |  |  |
|  | source . . . (2) |  |  |  |  |  |  |  |  |
|  | (1) − (2) | ⊿L* | 0.14 | −0.39 | −0.25 | −0.25 | — | — | — |
|  |  | ⊿a* | 2.10 | 0.75 | 1.14 | 0.88 | — | — | — |
|  |  | ⊿b* | 0.86 | 0.48 | −0.31 | −0.41 | — | — | — |

TABLE 32

|  |  |  | Example 118 | Example 119 | Example 120 | Example 121 | Example 122 | Example 123 | Example 124 |
|---|---|---|---|---|---|---|---|---|---|
| Before chemical strengthening | Reflection measurement using D65 light source . . . (1) | L* a* b* | 42.01 13.13 −48.63 | 42.07 12.72 −48.19 | 42.74 12.64 −48.42 | 31.82 30.23 −55.22 | 77.04 −7.14 15.33 | 46.34 5.80 22.98 | 48.85 −2.41 −8.52 |
|  | Reflection measurement using F2 light source . . . (2) | L* a* b* | 39.31 8.86 −55.04 | 39.38 8.51 −54.51 | 40.06 8.39 −54.82 | 29.63 23.18 −62.16 | 77.44 −4.85 17.43 | 47.71 3.66 26.01 | 48.38 −3.60 −9.64 |
|  | (1) − (2) | ⊿L* ⊿a* ⊿b* | 2.70 4.27 6.41 | 2.69 4.21 6.32 | 2.68 4.25 6.40 | 2.19 7.05 6.94 | −0.40 −2.29 −2.10 | −1.37 2.14 −3.03 | 0.47 1.19 1.12 |
| After chemical strengthening | Reflection measurement using D65 light source . . . (1) | L* a* b* | — — — | — — — | — — — | — — — | — — — | 45.49 5.99 21.15 | — — — |
|  | Reflection measurement using F2 light source . . . (2) | L* a* b* | — — — | — — — | — — — | — — — | — — — | 46.79 3.81 23.99 | — — — |
|  | (1) − (2) | ⊿L* ⊿a* ⊿b* | — — — | — — — | — — — | — — — | — — — | −1.30 2.18 −2.84 | — — — |

TABLE 33

|  |  |  | Example 125 | Example 126 | Example 127 | Example 128 | Example 129 | Example 130 | Example 131 |
|---|---|---|---|---|---|---|---|---|---|
| Before chemical strengthening | Reflection measurement using D65 light source . . . (1) | L* a* b* | 48.29 −2.80 −6.54 | 43.11 4.28 −23.94 | 48.10 −3.39 −11.36 | 48.21 −2.73 −11.17 | 38.98 −2.39 −13.36 | 33.78 5.20 −2.00 | 35.21 −2.20 6.06 |
|  | Reflection measurement using F2 light source . . . (2) | L* a* b* | 47.88 −3.94 −7.48 | 42.09 1.82 −27.65 | 47.48 4.16 −12.93 | 47.73 −3.85 −12.47 | 38.30 −2.80 −15.34 | 34.07 2.43 −1.74 | 35.77 −2.51 7.32 |
|  | (1) − (2) | ⊿L* ⊿a* ⊿b* | 0.41 1.14 0.94 | 1.02 2.46 3.71 | 0.62 0.77 1.57 | 0.48 1.12 1.30 | 0.68 0.41 1.98 | −0.29 2.77 −0.26 | −0.56 0.31 −1.26 |
| After chemical strengthening | Reflection measurement using D65 light source . . . (1) | L* a* b* | — — — | — — — | — — — | — — — | — — — | — — — | — — — |
|  | Reflection measurement using F2 | L* a* b* | — — — | — — — | — — — | — — — | — — — | — — — | — — — |

TABLE 33-continued

|  |  |  | Example 125 | Example 126 | Example 127 | Example 128 | Example 129 | Example 130 | Example 131 |
|---|---|---|---|---|---|---|---|---|---|
|  | light source ... (2) |  |  |  |  |  |  |  |  |
|  | (1) − (2) | ΔL* | — | — | — | — | — | — | — |
|  |  | Δa* | — | — | — | — | — | — | — |
|  |  | Δb* | — | — | — | — | — | — | — |

TABLE 34

|  |  |  | Example 132 | Example 133 | Example 134 | Example 135 | Example 136 | Example 137 | Example 138 |
|---|---|---|---|---|---|---|---|---|---|
| Before chemical strengthening | Reflection measurement using D65 light source ... (1) | L* | 53.09 | 67.02 | 70.84 | 82.54 | 25.05 | 25.22 | 25.53 |
|  |  | a* | 0.54 | −4.69 | 2.18 | −0.16 | −0.04 | −0.01 | −0.12 |
|  |  | b* | 7.91 | −0.70 | 16.72 | −2.36 | −0.79 | 0.86 | −0.80 |
|  | Reflection measurement using F2 light source ... (2) | L* | 53.83 | 66.99 | 71.87 | 82.48 | 25.02 | 25.20 | 25.49 |
|  |  | a* | −0.42 | −3.90 | 1.03 | −0.26 | −0.04 | −0.01 | −0.08 |
|  |  | b* | 8.54 | −1.56 | 18.56 | −3.49 | −0.91 | −1.01 | −0.97 |
|  | (1) − (2) | ΔL* | −0.74 | 0.03 | −1.03 | 0.06 | 0.03 | 0.02 | 0.04 |
|  |  | Δa* | 0.96 | −0.79 | 1.15 | 0.10 | 0.00 | 0.00 | −0.04 |
|  |  | Δb* | −0.63 | 0.86 | −1.84 | 1.13 | 0.12 | 1.87 | 0.17 |
| After chemical strengthening | Reflection measurement using D65 light source ... (1) | L* | — | — | — | — | — | — | — |
|  |  | a* | — | — | — | — | — | — | — |
|  |  | b* | — | — | — | — | — | — | — |
|  | Reflection measurement using F2 light source ... (2) | L* | — | — | — | — | — | — | — |
|  |  | a* | — | — | — | — | — | — | — |
|  |  | b* | — | — | — | — | — | — | — |
|  | (1) − (2) | ΔL* | — | — | — | — | — | — | — |
|  |  | Δa* | — | — | — | — | — | — | — |
|  |  | Δb* | — | — | — | — | — | — | — |

Δa* and Δb* were obtained by the following method. A spectro-colorimeter (Colori7 made by X-Rite, Inc.) was used to measure reflected chromaticity of each of the D65 light source and the F2 light source of each glass, and Δa* and Δb* were calculated using measurement results. Note that on a rear face side (the rear face of a face irradiated with light from the light source) of the glass, a white resin plate was placed to perform measurement.

For example, chemical strengthening is carried out as follows. Specifically, these glasses are each immersed for six hours in a molten salt constituted of $KNO_3$ (99%) and $NaNO_3$ (1%) at approximately 425° C. to chemically strengthen it. When a potassium concentration analysis in a depth direction is performed on each glass, it can be seen that ion exchange occurs at the depth of 5 μm to 100 μm from the surface, and a compressive stress layer is generated.

Concretely, the chemical strengthening was performed as follows. Specifically, glasses were prepared in such a manner that 4 mm×4 mm surfaces of part of glasses of Examples 1 to 138 in a shape of 4 mm×4 mm×0.8 mm were mirror finished and other surfaces were #1000 finished. These glasses were immersed for six hours in a molten salt constituted of $KNO_3$ (99%) and $NaNO_3$ (1%) at 425° C. to chemically strengthen them.

However, the glass of Example 111 was immersed for six hours in a molten salt constituted of $KNO_3$ (99%) and $NaNO_3$ (1%) at 400° C. to chemically strengthen it, and the glass of Example 123 was immersed for two hours in a molten salt constituted of $KNO_3$ (100%) at 450° C. to chemically strengthen it.

As shown in Tables 18 to 34, in the glasses of Examples 18, 24, 28 to 36, 39 to 55, 58 to 83, 86 to 88, 91 to 110, 112 to 116, 124, 127 to 129, and 131 to 138 containing CuO or $Fe_2O_3$, both Δa* and Δb* are less than 2 in absolute value, and it can be seen that a glass having low metamerism can be obtained.

On the other hand, in the glasses of Examples 25, 26, 27, Example 111, Examples 117 to 123, Example 126, and Example 130 having a relatively small content of CuO or $Fe_2O_3$, the absolute value of Δa* is more than 2, and the effect of suppressing metamerism could not be obtained sufficiently.

Further, as shown in Tables 18 to 34, in the glasses of Examples 59 to 64, Examples 66 to 78, Examples 106 to 110, and Examples 112 to 114 containing CuO or $Fe_2O_3$, both Δa* and Δb* of glasses after chemical strengthening are less than 2 in absolute value, and it can be seen that a chemical strengthened glass having low metamerism can be obtained.

Regarding the number of bubbles, to confirm the effect of $Fe_2O_3$ and $Co_3O_4$, the glass components and contents other than $Fe_2O_3$ and $Co_3O_4$ were assumed to be the same, and the number of bubbles was checked for each one containing both $Fe_2O_3$ and $Co_3O_4$, each one containing only $Fe_2O_3$, and each one containing only $Co_3O_4$.

Regarding the number of bubbles, the number of bubbles of an area of 0.6 $cm^3$ was measured at four positions on the aforementioned plate-shaped glass under a high-intensity light source (LA-100T made by Hayashi Watch-works), and a value converted from the average value of measurement values therefrom in unit volume ($cm^3$) was presented.

The number of bubbles is largely affected by a parent composition and a melting temperature of the glass, and hence, as described above, the components and contents other than $Fe_2O_3$ and $Co_3O_4$ were assumed to be the same, and comparison of ones at the same melting temperatures was performed. Results are shown in Table 35.

TABLE 35

|  | Contain $Fe_2O_3$, $Co_3O_4$ | Contain only $Fe_2O_3$ | Contain only $Co_3O_4$ |
|---|---|---|---|
| The number of bubbles [bubbles/$cm^3$] Melting temperature: 1500° C. | Example 1<br>42 | Example 10<br>65 | Example 14<br>59 |
| The number of bubbles [bubbles/$cm^3$] Melting temperature: 1500° C. | Example 9<br>5 | Example 11<br>22 | Example 15<br>8 |
| The number of bubbles [bubbles/$cm^3$] Melting temperature: 1550° C. | Example 6<br>26 | Example 12<br>40 | Example 16<br>78 |
| The number of bubbles [bubbles/$cm^3$] Melting temperature: 1550° C. | Example 4<br>27 | Example 13<br>32 | Example 17<br>70 |

From these results, in any one of the glass compositions, one containing both $Fe_2O_3$ and $Co_3O_4$ had a smaller number of bubbles than one containing only $Fe_2O_3$ and one containing only $Co_3O_4$. This supports that coexisting $Co_3O_4$ and $Fe_2O_3$ exhibit a defoaming effect at the time of melting of the glass. Specifically, it is conceivable that, since $O_2$ bubbles released when trivalent Fe turns to bivalent Fe in a high temperature state are absorbed when cobalt oxidizes, the $O_2$ bubbles are reduced as a result, thereby obtaining the defoaming effect.

To evaluate press-formability of the glass, a glass containing coloring component (here, $Fe_2O_3$ and $Co_3O_4$) in the glass and a glass containing no coloring component were prepared, and Tg (glass transition point temperature) of the glasses was measured. Tg of the glass was 597° C. in Example 9 (working example), whereas it was 620° C. in Example 90 (comparative example, a glass omitting $Fe_2O_3$ and $Co_3O_4$ from Example 9). Further, it was 596° C. in Example 1 (working example), whereas it was 604° C. in Example 139 (comparative example, a glass omitting $Fe_2O_3$ and $Co_3O_4$ from Example 1). Further, it was 606° C. in Example 4 (working example), whereas it was 617° C. in Example 140 (comparative example, a glass omitting $Fe_2O_3$ and $Co_3O_4$ from Example 4).

From the above, the glasses of the working examples are capable of decreasing Tg of the glass by containing a predetermined content of coloring components in the glass and lowering the formation temperature of the glass during press formation. Thus, a glass excelling in press formability can be made, which is preferred for a glass for the purpose of being press formed into an appropriate shape such as a concave or convex shape, like a glass for housing for example.

Chemical strengthening was performed as follows on part of the glasses of Examples 1 to 90. Specifically, glasses were prepared in such a manner that 4 mm×4 mm surfaces of these glasses in a shape of 4 mm×4 mm×0.8 mm were mirror finished and other surfaces were #1000 finished. These glasses were immersed for six hours in a $KNO_3$ molten salt (100%) at 425° C. to chemically strengthen them.

A potassium concentration analysis in a depth direction was performed using an EPMA on each glass after the chemical strengthening. Evaluation results are shown in Tables 1 and 2 and Table 10 as potassium ion dispersion depths (unit: μm). Note that estimated values are shown for Examples 12 to 14 and Examples 16, 17 to which * is added.

As shown in the tables, in the glasses of Examples 1 to 17, sufficient potassium ion dispersion depths were obtained under the chemical strengthening condition, from which it is presumed that also the depths of surface compressive stress layers are corresponding depths. As a result, it is conceivable that the glasses of the working examples can obtain a necessary and sufficient strength improving effect by the chemical strengthening.

Chemical strengthening was performed on the glasses of Example 1, Example 27, Example 33, Examples 39 to 43, Examples 62 to 64, Examples 66 to 67, Example 79, Example 94, Example 96, and Examples 100 to 103 similarly to the chemical strengthening performed on the glasses used for measuring reflected chromaticity of the D65 light source and the F2 light source described above. Surface compressive stress (CS) and the depth of surface compressive stress layer (DOL) of each glass after the chemical strengthening were measured using a surface stress measurement apparatus. Evaluation results are shown in Tables 36 to 38. Note that the surface stress measurement apparatus is an apparatus utilizing the fact that the surface compressive stress layer formed on a glass surface differs in refractive index from other glass portions where the surface compressive stress layer does not exist, thereby exhibiting an optical waveguide effect. Further, in the surface stress measurement apparatus, an LED whose central wavelength is 795 nm was used as a light source to perform the measurement.

TABLE 36

| | Example 1 | Example 27 | Example 33 | Example 39 | Example 40 | Example 41 | Example 42 | Example 43 | Example 62 | Example 63 | Example 64 | Example 66 |
|---|---|---|---|---|---|---|---|---|---|---|---|---|
| Surface compressive stress CS [MPa] | 885 | 794 | 784 | 853 | 817 | 797 | 767 | 774 | 692 | 535 | 396 | 1115 |
| Depth of surface compressive stress layer DOL [µm] | 28 | 42 | 36 | 33 | 41 | 34 | 36 | 39 | 46 | 54 | 44 | 34.5 |

TABLE 37

| | Example 67 | Example 68 | Example 69 | Example 70 | Example 71 | Example 72 | Example 73 | Example 74 | Example 75 | Example 76 | Example 77 | Example 79 |
|---|---|---|---|---|---|---|---|---|---|---|---|---|
| Surface compressive stress CS [MPa] | 1085 | 1202 | 1293 | 1107 | 940 | 720 | 700 | 745 | 757 | 742 | 772 | 1113 |
| Depth of surface compressive stress layer DOL [µm] | 28.7 | 29 | 31 | 30.5 | 36.9 | 7.8 | 23.5 | 8 | 7.4 | 7 | 7.3 | 35 |

TABLE 38

| | Example 94 | Example 96 | Example 100 | Example 101 | Example 102 | Example 103 |
|---|---|---|---|---|---|---|
| Surface compressive stress CS [MPa] | 982 | 1075 | 901 | 1003 | 1084 | 900 |
| Depth of surface compressive stress layer DOL [µm] | 21.1 | 32 | 15 | 22 | 26 | 16.4 |

As shown in Tables 36 to 38, in glasses of Example 1, Example 27, Example 33, Examples 39 to 43, Examples 66 to 71, Example 77, Example 79, Example 94, Example 96, and Examples 100 to 103, under the chemical strengthening condition, surface compressive stress as high as 767 MPa or more was obtained. As a result, it is conceivable that the glasses of the working examples can obtain a necessary and sufficient strength improving effect by the chemical strengthening. Further, as shown in Tables 36 to 38, in glasses of Examples 66 to 71, Example 79, Example 94, Example 96, and Examples 101 and 102 as working examples, surface compressive stress as high as 940 MPa or more was obtained. Further, the depth of the surface compressive stress layer of each glass of Example 27, Example 33, Examples 39 to 43, Examples 62 to 64, Examples 66 to 71, Example 79, and Example 96 were 28.7 µm or more, from which it is presumed that a glass having high strength can be obtained by the chemical strengthening.

In order to confirm color change characteristics due to long term use of the glasses, the following evaluation test was performed. Samples obtained in such a manner that the glass samples of Example 1 and Example 58 were cut into 30 mm square plate shape and both surfaces thereof were optically polished to a predetermined thickness, were disposed at a position of 15 cm from a mercury lamp (H-400P) and irradiated with ultraviolet rays for 100 hours. The spectral transmittance of each sample before and after this light irradiation was measured using an ultraviolet-visible-near-infrared spectrophotometer (V-570 made by JASCO Corporation), and the absorption coefficient was calculated by using the above-described relational expression.

Then, from the absorption coefficient of each sample before and after the light irradiation, variation amounts ΔT (550/600) and ΔT (450/600) of relative values of absorption coefficients represented by following expressions (1) and (2) were calculated. Evaluation results are shown in Table 39.

$$\Delta T(550/600)(\%) = [\{A(550/600) - B(550/600)\}/A(550/600)] \times 100 \quad (1)$$

$$\Delta T(450/600)(\%) = [\{A(450/600) - B(450/600)\}/A(450/600)] \times 100 \quad (2)$$

(In the above expression (1), A(550/600) is a relative value of an absorption coefficient at a wavelength of 550 nm to an absorption coefficient at a wavelength of 600 nm, as calculated from a spectral transmittance curve of the glass after being irradiated with light of a 400 W high-pressure mercury lamp for 100 hours, and B(550/600) is a relative value of an absorption coefficient at a wavelength of 550 nm to an absorption coefficient at a wavelength of 600 nm, as calculated from a spectral transmittance curve of the glass before the light irradiation. In the above expression (2), A(450/600) is a relative value of an absorption coefficient at a wavelength of 450 nm to an absorption coefficient at a wavelength of 600 nm, as calculated from a spectral transmittance curve of the glass after irradiation with light of a 400 W high-pressure mercury lamp for 100 hours, and B(450/600) is a relative value of an absorption coefficient at a wavelength of 450 nm to an absorption coefficient at a wavelength of 600 nm, as calculated from a spectral transmittance curve of the glass before the light irradiation.)

TABLE 39

|  | Example 1<br>Plate thickness: 0.714 mm | | Example 58<br>Plate thickness: 0.780 mm | |
|---|---|---|---|---|
|  | Before light irradiation | After light irradiation | Before light irradiation | After light irradiation |
| (1): Absorption coefficient at wavelength of 600 nm | 5.347 | 5.375 | 1.100 | 1.108 |
| (2): Absorption coefficient at wavelength of 550 nm | 4.208 | 4.243 | 0.873 | 0.877 |
| (3): Absorption coefficient at wavelength of 450 nm | 4.138 | 4.117 | 1.007 | 1.014 |
| Relative value of absorption coefficient (@550 nm/@600 nm)*1 | 0.787 | 0.789 | 0.793 | 0.791 |
| Relative value of absorption coefficient (@450 nm/@600 nm)*2 | 0.774 | 0.766 | 0.916 | 0.915 |
| ΔT(550/600) [%] | 0.30 | | −0.30 | |
| ΔT(450/600) [%] | −1.04 | | −0.07 | |

*1Calculated from calculating expression of (2)/(1) based on absorption coefficient at each wavelength
*2Calculated from calculating expression of (3)/(1) based on absorption coefficient at each wavelength As shown in Table 39, in the glasses of Example 1 and Example 58, variations ΔT (550/600) and ΔT (450/600) of relative values of absorption coefficients before and after the ultraviolet irradiation are both 5% or less in absolute value, from which it can be seen that there will be no color change in glass due to long term use, and an initial appearance color can be maintained for a long period.

Further, the absorption coefficient at wavelengths of 380 nm to 780 nm was also obtained similarly to the above for the glasses after the chemical strengthening, and it was recognized that there was no change from the value before the chemical strengthening in either of them. It was also recognized that there was no change in color tone by visual observation. Thus, the glass for chemical strengthening of the present invention can be used for purposes that require strength by chemical strengthening without impairing a desired color tone. Therefore, the range of application can be extended to purposes which are required to have a decorating function.

In order to confirm radio wave transparency of the glasses, the following evaluation test was performed. First, glasses of Example 1 and Example 27 were cut out and processed to have a size 50 mm×50 mm×0.8 mm, and their main surface was polished to be in a mirror state. Then, each glass was measured for a dielectric loss tangent at frequencies of 50 MHz, 500 MHz, 900 MHz, 1.0 GHz by a volumetric method (parallel flat plate method) using an LCR meter and electrodes. Measurement results are shown in Table 11.

Note that the dielectric constants (∈) of the glasses at the frequency of 50 MHz were 7.6.

TABLE 40

| Frequency | Example 1<br>tanδ | Example 27<br>tanδ |
|---|---|---|
| 50 MHz | 0.007 | 0.006 |
| 500 MHz | 0.007 | 0.006 |
| 900 MHz | 0.007 | 0.005 |
| 1.0 GHz | 0.007 | 0.004 |

As shown in Table 40, in these glasses the dielectric loss tangent at frequencies in the range of 50 MHz to 1.0 GHz is less than 0.01, and it can be seen that they have favorable radio wave transparency.

The glass of the present invention can be used for decorations of an operating panel of an audiovisual apparatus, office automation apparatus, or the like, an opening/closing door, an operating button/knob of the same product, or the like, or a decorative panel disposed around a rectangular display surface of an image display panel of a digital photo frame, TV, or the like, and for a glass housing for an electronic device, and the like. It can also be used for an automobile interior member, a member of furniture or the like, a building material used outdoors or indoors, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A glass for chemical strengthening comprising, in mole percentage based on following oxides,
   55% to 80% of $SiO_2$,
   1.1% to 16% of $Al_2O_3$,
   0% to 12% of $B_2O_3$,
   5% to 20% of $Na_2O$,
   0% to 15% of $K_2O$,
   0% to 15% of MgO,
   0% to 15% of CaO,
   0% to 25% of ΣRO (where R represents Mg, Ca, Sr, Ba, or Zn), and
   0.1% to 7% of a coloring component comprising at least two metal oxides selected from the group consisting of oxides of Co, Mn, Fe, Ni, Cu, Cr, V, and Bi, said coloring component comprising $Co_3O_4$ and $Fe_2O_3$,
   wherein:
   a content of $Fe_2O_3$ is 0.005% or more and less than 1.5%; and
   a content ratio of $Co_3O_4/Fe_2O_3$ is 0.01 to 0.5.

2. The glass for chemical strengthening according to claim 1, comprising, in mole percentage based on following oxides,
   55% to 80% of $SiO_2$,
   3% to 16% of $Al_2O_3$,
   0% to 12% of $B_2O_3$, 5% to 20% of Na$_2$O,
0% to 15% of K$_2$O,
0% to 15% of MgO,
0% to 3% of CaO,
0% to 18% of ΣRO (where R represents Mg, Ca, Sr, Ba, or Zn), and
0.1% to 7% of the coloring component.

3. The glass for chemical strengthening according to claim 1, comprising, in mole percentage based on following oxides,
55% to 80% of SiO$_2$,
1.1% to 5% of Al$_2$O$_3$,
0% to 12% of B$_2$O$_3$,
5% to 20% of Na$_2$O,
0% to 8% of K$_2$O,
0% to 15% of MgO,
5% to 15% of CaO,
5% to 25% of ΣRO (where R represents Mg, Ca, Sr, Ba, or Zn), and
0.1% to 7% of the coloring component.

4. The glass for chemical strengthening according to claim 1, wherein the coloring component comprises, in mole percentage based on oxides,
0.01% to less than 1.5% of Fe$_2$O$_3$,
0.05% to less than 0.75% of Co$_3$O$_4$,
0% to 6% of NiO,
0% to 6% of MnO,
0% to 6% of Cr$_2$O$_3$, and
0% to 6% of V$_2$O$_5$.

5. The glass for chemical strengthening according to claim 1, wherein the coloring component in the glass comprises, in mole percentage based on oxides,
0.1% to less than 0.75% of Co$_3$O$_4$.

6. The glass for chemical strengthening according to claim 1, wherein a content of Fe$_2$O$_3$ is 0.005% or more and 1.2% or less.

7. The glass for chemical strengthening according to claim 1, wherein a content of NiO is less than 0.05%.

8. The glass for chemical strengthening according to claim 1, wherein the content ratio of Co$_3$O$_4$/Fe$_2$O$_3$ is 0.05 to 0.5.

9. The glass for chemical strengthening according to claim comprising 0.05% to 3% of CuO.

10. The glass for chemical strengthening according to claim 1, comprising 0.005% to 2% of a color correcting component comprising at least one metal oxide selected from the group consisting of oxides of Ti, Ce, Er, Nd, and Se.

11. The glass for chemical strengthening according to claim 1, further comprising 0.005% to 1% of SnO$_2$.

12. The glass for chemical strengthening according to claim 1, wherein a minimum value of an absorption coefficient at wavelengths of 380 nm to 780 nm is 1 mm$^{-1}$ or more.

13. The glass for chemical strengthening according to claim 1, wherein a relative value of an absorption coefficient at a wavelength of 550 nm to an absorption coefficient at a wavelength of 600 nm, as calculated from a spectral transmittance curve of the glass, and a relative value of an absorption coefficient at a wavelength of 450 nm to an absorption coefficient at a wavelength of 600 nm calculated from a spectral transmittance curve of the glass, are both in a range of 0.7 to 1.2.

14. The glass for chemical strengthening according to claim 1, wherein variation amounts ΔT (550/600) and ΔT (450/600) of relative values of absorption coefficients represented by following expressions (1) and (2) are 5% or less in absolute value:

$$\Delta T(550/600)(\%)=[\{A(550/600)-B(550/600)\}/A(550/600)]\times 100 \quad (1)$$

$$\Delta T(450/600)(\%)=[\{A(450/600)-B(450/600)\}/A(450/600)]\times 100 \quad (2)$$

wherein:
A(550/600) is a relative value of an absorption coefficient at a wavelength of 550 nm to an absorption coefficient at a wavelength of 600 nm, as calculated from a spectral transmittance curve of the glass after irradiation with light of a 400 W high-pressure mercury lamp for 100 hours;
B(550/600) is a relative value of an absorption coefficient at a wavelength of 550 nm to an absorption coefficient at a wavelength of 600 nm, as calculated from a spectral transmittance curve of the glass before the light irradiation;
A(450/600) is a relative value of an absorption coefficient at a wavelength of 450 nm to an absorption coefficient at a wavelength of 600 nm, as calculated from a spectral transmittance curve of the glass after irradiation with light of a 400 W high-pressure mercury lamp for 100 hours; and
B(450/600) is a relative value of an absorption coefficient at a wavelength of 450 nm to an absorption coefficient at a wavelength of 600 nm, as calculated from a spectral transmittance curve of the glass before the light irradiation.

15. The glass for chemical strengthening according to claim 1, wherein an absolute value of a difference Δa* between chromaticity a* of reflected light by a D65 light source and chromaticity a* of reflected light by an F2 light source in an L*a*b* color system, which difference is expressed by following expression (1), and an absolute value of a difference Δb* between chromaticity b* of reflected light by the D65 light source and chromaticity b* of reflected light by the F2 light source in the L*a*b* color system, which difference is expressed by following expression (II), are both 2 or less:

$$\Delta a^*=a^* \text{ value } (D65 \text{ light source})-a^* \text{ value } (F2 \text{ light source}) \quad (I)$$

$$\Delta b^*=b^* \text{ value } (D65 \text{ light source})-b^* \text{ value } (F2 \text{ light source}) \quad (II).$$

16. The glass for chemical strengthening according to claim 1, wherein, when an indentation is formed by using a Vickers indenter in a mirror-finished surface of a glass plate having a thickness of 1 mm made of the glass for chemical strengthening, a load of the Vickers indenter that causes a crack occurrence rate of 50% is 150 gf or more.

17. A chemical strengthened glass obtained by chemical strengthening the glass for chemical strengthening according to claim 1, wherein a depth of a surface compressive stress layer formed in a surface of the chemical strengthened glass by the chemical strengthening is 5 μm or more, and a surface compressive stress of the surface compressive stress layer is 300 MPa or more.

18. The chemical strengthened glass according to claim 17, wherein an absolute value of a difference Δa* between chromaticity a* of reflected light by a D65 light source and chromaticity a* of reflected light by an F2 light source in an L*a*b* color system, which difference is expressed by following expression (I), and an absolute value of a difference Δb* between chromaticity b* of reflected light by the D65 light source and chromaticity b* of reflected light by the F2 light source in the L*a*b* color system, which difference is expressed by following expression (II), are both 2 or less:

$$\Delta a^* = a^* \text{ value } (D65 \text{ light source}) - a^* \text{ value } (F2 \text{ light source}) \quad (I)$$

$$\Delta b^* = b^* \text{ value } (D65 \text{ light source}) - b^* \text{ value } (F2 \text{ light source}) \quad (II).$$

* * * * *